(12) United States Patent  (10) Patent No.: US 8,961,823 B2
Gotoh et al.  (45) Date of Patent: Feb. 24, 2015

(54) POLYMERIZABLE COMPOUND, LIQUID CRYSTAL COMPOSITION AND LIQUID CRYSTAL DISPLAY DEVICE

(71) Applicants: JNC Corporation, Tokyo (JP); JNC Petrochemical Corporation, Tokyo (JP)

(72) Inventors: Yasuyuki Gotoh, Tokyo (JP); Mayumi Goto, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

(21) Appl. No.: 13/721,024

(22) Filed: Dec. 20, 2012

(65) Prior Publication Data

US 2014/0008572 A1 Jan. 9, 2014

(30) Foreign Application Priority Data

Jul. 5, 2012 (JP) .................................. 2012-151718
Nov. 26, 2012 (JP) .................................. 2012-257245

(51) Int. Cl.
| | |
|---|---|
| C09K 19/32 | (2006.01) |
| C09K 19/30 | (2006.01) |
| C09K 19/12 | (2006.01) |
| C09K 19/00 | (2006.01) |
| C09K 19/02 | (2006.01) |
| G02F 1/1333 | (2006.01) |
| C08F 2/00 | (2006.01) |
| C08F 4/00 | (2006.01) |
| C08F 116/12 | (2006.01) |
| C08F 216/12 | (2006.01) |
| C08F 122/26 | (2006.01) |
| C08F 218/16 | (2006.01) |
| C08F 120/10 | (2006.01) |
| C09K 19/38 | (2006.01) |
| C09K 19/04 | (2006.01) |

(52) U.S. Cl.
CPC ............. *C09K 19/3838* (2013.01); *C09K 19/12* (2013.01); *C09K 19/322* (2013.01); *C09K 19/3852* (2013.01); *C09K 2019/0448* (2013.01); *C09K 2019/122* (2013.01); *C09K 2019/123* (2013.01)
USPC ............ 252/299.62; 252/299.63; 252/299.66; 428/1.1; 428/1.3; 349/86; 349/182; 526/194; 526/247; 526/322; 526/323.1

(58) Field of Classification Search
USPC ............... 252/299.01, 299.6–299.66; 349/86, 349/182; 428/1.1, 1.3; 526/194, 247, 322, 526/323.1
See application file for complete search history.

(56) References Cited

U.S. PATENT DOCUMENTS

2012/0182516 A1\* 7/2012 Taugerbeck et al. .......... 349/183

\* cited by examiner

*Primary Examiner* — Geraldina Visconti

(74) *Attorney, Agent, or Firm* — Jianq Chyun IP Office

(57) ABSTRACT

The compound represented by formula (1).

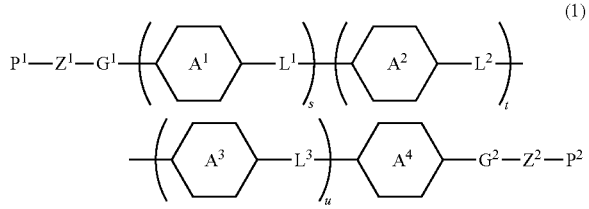

For example, the rings $A^1$, $A^2$, $A^3$ and $A^4$ are 1,4-phenylene, $Z^1$ and $Z^2$ are alkylene having 1 to 10 carbons in which at least one —$CH_2$— may be replaced by —O— or —CH=CH—; $L^1$, $L^2$ and $L^3$ are a single bond, —COO— or —CH=CH—; $G^1$ and $G^2$ are —O—; s, t and u are 0 or 1; and $P^1$ and $P^2$ is the group (P-1), the group (P-2) or the group (P-3).

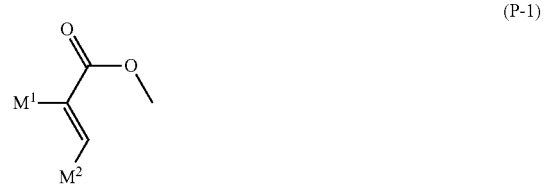

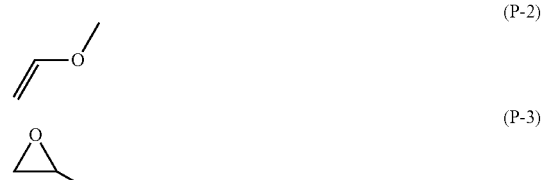

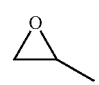

$M^1$ and $M^2$ are hydrogen or methyl.

20 Claims, No Drawings

POLYMERIZABLE COMPOUND, LIQUID CRYSTAL COMPOSITION AND LIQUID CRYSTAL DISPLAY DEVICE

CROSS-REFERENCE TO RELATED APPLICATION

This application claims the priority benefit of Japan Patent Application No. 2012-151718, filed on Jul. 5, 2012 and the priority benefit of Japan Patent Application No. 2012-257245, filed on Nov. 26, 2012. The entirety of each of the above-mentioned patent applications is hereby incorporated by reference herein and made a part of this specification.

BACKGROUND OF THE INVENTION

1. Technical Field

The invention relates to a polymerizable compound having two groups, a polymer obtained from the polymerizable compound, a liquid crystal composition including the polymerizable compound or the polymer, and a liquid crystal display device containing the composition. It also relates to a liquid crystal display device in which the liquid crystal composition is sealed between the substrates of a device, a polymerizable compound is polymerized while a voltage is applied to the device, and the orientation of liquid crystal molecules is adjusted by the effect of the resulting polymer. The invention also relates mainly to a liquid crystal composition suitable for an AM (active matrix) device and so forth, and to the AM device containing the composition.

2. Technical Background

A liquid crystal display device utilizes optical anisotropy, dielectric anisotropy and so forth possessed by liquid crystal molecules in a liquid crystal composition. A classification based on an operating mode for the liquid crystal molecules includes a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a fringe field switching (FFS) mode and a vertical alignment (VA) mode.

A liquid crystal display device having a mode in which a polymer is used in combination with a liquid crystal composition. This is, for example, a polymer sustained alignment (PSA) mode or a polymer stabilized (PS) mode. In a liquid crystal display device having this mode, a liquid crystal composition to which a polymerizable compound is added is poured into a display device. A polymer is formed in the liquid crystal composition by the irradiation with ultraviolet light under the conditions of applied voltage between electrodes and by the polymerization of the polymerizable compound. According to this method, a liquid crystal display device is obtained in which the response time is decreased and the image burn-in is improved.

This method can be applied to a variety of operating modes of a liquid crystal display device, and modes such as PS-TN, PS-IPS, PS-FFS, PSA-VA and PSA-OCB are known. A polymerizable compound used for these kinds of modes seems to have a high ability to orient liquid crystal molecules, however, it is not said that the solubility in a liquid crystal composition is high. An improvement of the solubility in a liquid crystal composition has been tried until now, and there is a tendency that as the solubility increases, the polymerization reactivity is decreased. Thus, the development of a polymerizable compound having a suitable balance between the solubility and the polymerization reactivity has been expected.

REFERENCES LIST PATENT DOCUMENT

Patent document No. 1: JP 2003-307720 A.
Patent document No. 2: JP 2004-131704 A.
Patent document No. 3: CN 101,671,252 A.
Patent document No. 4: EP 1,498,468 B.
Patent document No. 5: U.S. Pat. No. 5,622,648 B.
Patent document No. 6: JP H10-186330 A (1998).

SUMMARY OF THE INVENTION

Subject to be Solved by the Invention

The first subject of the invention is to provide a polymerizable compound having a suitable polymerization reactivity, a high conversion yield and a high solubility in a liquid crystal composition. The second subject is to provide a liquid crystal composition including the polymerizable compound or a polymer obtained from the polymerizable compound and having physical properties such as a high maximum temperature of a nematic phase, a low minimum temperature of a nematic phase, a small viscosity, a suitable optical anisotropy, a large dielectric anisotropy, a suitable elastic constant, a large specific resistance and a suitable pretilt. The subject is to provide a liquid crystal composition having a suitable balance between at least two of the physical properties. The third subject is to provide a liquid crystal display device containing the composition and having a wide temperature range in which the device can be used, a short response time, a large voltage holding ratio, a low threshold voltage, a large contrast ratio and a long service life.

Means for Solving the Subject

The invention concerns a compound represented by formula (1), a polymer obtained from the compound, a liquid crystal composition including the compound or the polymer, and a liquid crystal display device containing the composition:

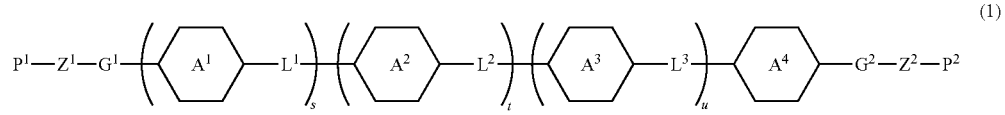

(1)

Wherein the ring $A^1$, the ring $A^2$, the ring $A^3$ and the ring $A^4$ are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine- 2,5-diyl or pyridine-2,5-diyl, and in these groups at least one hydrogen may be replaced by halogen, alkyl having 1 to 12 carbons or alkyl having 1 to 12 carbons in which at least one hydrogen has been replaced by halogen;

$Z^1$ and $Z^2$ are independently alkylene having 1 to 10 carbons, and in the alkylene at least one —$CH_2$— may be replaced by —O—, —COO— or —OCOO— and at least one —$CH_2$—$CH_2$— may be replaced by —CH=CH— or —C≡C—;

$G^1$ and $G^2$ are independently a single bond or —O—;

$L^1$, $L^2$ and $L^3$ are independently a single bond, —COO— or —CH=CH—;

s, t and u are independently 0 or 1; and $P^1$ and $P^2$ are independently a group selected from groups represented by formulas (P-1), (P-2) and (P-3):

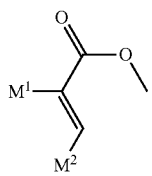

(P-1)

(P-2)

(P-3)

wherein in formula (P-1), $M^1$ and $M^2$ are independently hydrogen, fluorine, methyl or trifluoromethyl.

Effect of the Invention

The first advantage of the invention is that the polymerizable compound of the invention has a suitable polymerization reactivity, a high conversion yield and a high solubility in a liquid crystal composition. The second advantage is that the liquid crystal composition including the polymerizable compound or the polymer obtained from the polymerizable compound has physical properties such as a high maximum temperature of a nematic phase, a low minimum temperature of a nematic phase, a small viscosity, a suitable optical anisotropy, a large dielectric anisotropy, a suitable elastic constant, a large specific resistance and a suitable pretilt. The advantage is that the composition has a suitable balance between at least two of the physical properties. The third advantage is that the liquid crystal display device containing the composition has a wide temperature range in which the device can be used, a short response time, a large voltage holding ratio, a low threshold voltage, a large contrast ratio and a long service life.

DESCRIPTION OF THE EMBODIMENTS

Usage of the terms in this specification is as follows. A liquid crystal compound is a generic teen for a compound having a liquid crystal phase such as a nematic phase or a smectic phase, and also for a compound having no liquid crystal phases but useful as a component of a liquid crystal composition. A polymerizable compound is a compound that gives a polymer by polymerization. A liquid crystal compound, a polymerizable compound, a liquid crystal composition and a liquid crystal display device may be abbreviated to a compound, a compound, a composition and a device, respectively. A liquid crystal display device is a generic term for a liquid crystal display panel and a liquid crystal display module. A clearing point is the transition temperature between a liquid crystal phase and an isotropic phase in a liquid crystal compound. The minimum temperature of a liquid crystal phase is the transition temperature between solids and a liquid crystal phase (a smectic phase, a nematic phase or the like) in a liquid crystal compound. The maximum temperature of a nematic phase is the transition temperature between a nematic phase and an isotropic phase in a liquid crystal composition, and may be abbreviated to the maximum temperature. The minimum temperature of a nematic phase may be abbreviated to the minimum temperature.

A compound represented by formula (1) may be abbreviated to the compound (1). The same abbreviation applies to a compound represented by formula (2) or the like. The compound (1) means one compound or at least two compounds represented by formula (1). In formulas (1) to (8), the symbol $A^1$, $B^1$, $C^1$ or the like surrounded by a hexagonal shape corresponds to the ring $A^1$, the ring $B^1$, the ring $C^1$ or the like, respectively. The symbol $R^3$ is used in a plurality of formulas such as formula (2) and formula (3). Two terminal groups represented by arbitrary two of $R^3$ may be the same or different in these compounds. Two of the ring $C^2$ are present in one formula when q is 2 in formula (5). Two rings represented by two of the ring $C^2$ may be the same or different in this compound. The same rule applies to symbols such as $R^7$ and $W^4$. The content of a liquid crystal compound in a liquid crystal composition is expressed as a weight percentage (% by weight) based on the total weight of the liquid crystal compounds (namely, the weight of the liquid crystal composition in which a polymerizable compound and an additive are excluded).

The expression "at least one 'A' may be replaced by 'B'" means that the position of 'A' is arbitrary when the number of 'A' is one, and that the positions of 'A' can be selected without any restriction also when the numbers of 'A' are two or more. The expression "at least one A may be replaced by B, C or D" includes cases where arbitrary A has been replaced by B, and arbitrary A has been replaced by C, and arbitrary A has been replaced by D, and also cases where a plurality of A are replaced by at least two of B, C and/or D. For example, "alkyl in which at least one —$CH_2$— may be replaced by —O— or —CH=CH—" includes alkyl, alkenyl, alkoxy, alkoxyalkyl, alkoxyalkenyl and alkenyloxyalkyl. Incidentally, it is undesirable that two successive —$CH_2$— should be replaced by —O— to give —O—O—. It is also undesirable that —$CH_2$— in a methyl moiety (—$CH_2$—H) of alkyl or the like should be replaced by —O— to give —O—H.

2-Fluoro-1,4-phenylene means the following two divalent groups. Fluorine may be facing left or facing right in a structural formula. The same rule applies to an asymmetric divalent group such as tetrahydropyran-2,5-diyl.

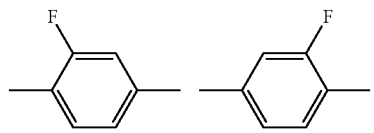

In the compound (1) or its sub-formulas, the bonding groups $Z^1$, $Z^2$, $L^1$, $L^2$ and $L^3$ are not limited to the direction of the definition described and include its mirror image. For example, in the case of —COO—, the bonding group may be —COO— or may be —OCO—. In the case of —CH=CH—O—, the bonding group may be —CH=CH—O— or may be —O—CH=CH—.

An unsaturated bond means a group including —CH=CH—, or —C(=O)—.

The invention includes the contents described in the following items 1 to 20.

Item 1. A compound represented by formula (1):

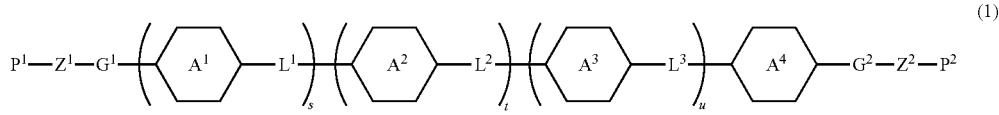

Wherein the ring $A^1$, the ring $A^2$, the ring $A^3$ and the ring $A^4$ are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these groups at least one hydrogen may be replaced by halogen, alkyl having 1 to 12 carbons or alkyl having 1 to 12 carbons in which at least one hydrogen has been replaced by halogen;

$Z^1$ and $Z^2$ are independently alkylene having 1 to 10 carbons, and in the alkylene at least one —CH$_2$— may be replaced by —O—, —COO— or —OCOO— and at least one —CH$_2$—CH$_2$— may be replaced by —CH=CH— or —C≡C—;

$G^1$ and $G^2$ are independently a single bond or —O—;

$L^1$, $L^2$ and $L^3$ are independently a single bond, —COO— or —CH=CH—;

s, t and u are independently 0 or 1;

$P^1$ and $P^2$ are independently a group selected from groups represented by formulas (P-1), (P-2) and (P-3):

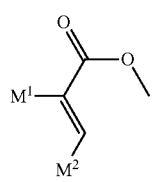

in formula (P-1), $M^1$ and $M^2$ are independently hydrogen, fluorine, methyl or trifluoromethyl;

at least one of $Z^1$ and $Z^2$ has an unsaturated bond when $G^1$ and $G^2$ are —O—, and $P^1$ and $P^2$ are a group represented by formula (P-1);

at least one of $Z^1$ and $Z^2$ has the unsaturated bond when s and t are 1, u is 0, $G^1$ and $G^2$ are —O—, the ring $A^1$ and the ring $A^4$ are 1,4-phenylene, the ring $A^2$ is 1,4-phenylene in which at least one hydrogen has been replaced by chlorine, methyl or trifluoromethyl, and $P^1$ and $P^2$ a group represented by formula (P-2);

at least one of $Z^1$ and $Z^2$ has the unsaturated bond when $L^1$, $L^2$ and $L^3$ are —COO—; and at least one of $Z^1$ and $Z^2$ has the unsaturated bond when s is 1, t and u are 0, the ring $A^1$ and the ring $A^4$ are 1,4-phenylene, $G^1$ and $G^2$ are a single bond, and $P^1$ and $P^2$ are a group represented by formula (P-1).

Item 2. The compound according to item 1, wherein at least one of $Z^1$ and $Z^2$ has an unsaturated bond.

Item 3. The compound according to item 1 or 2, the compound is represented by formula (1-1) or (1-2):

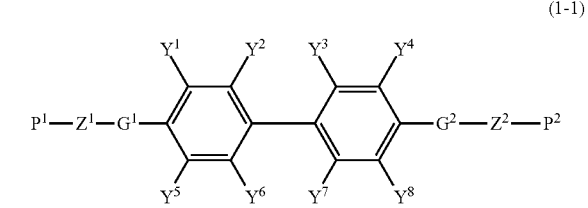

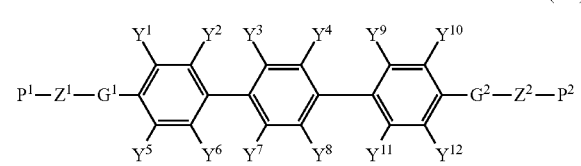

in formulas (1-1) and (1-2), $Z^1$ and $Z^2$ are independently alkylene having 1 to 10 carbons, and in the alkylene at least one —CH$_2$— may be replaced by —O—, —COO— or —OCOO— and at least one —CH$_2$—CH$_2$— may be replaced by —CH=CH— or —C≡C—;

$G^1$ and $G^2$ are independently a single bond or —O—;

$Y^1$ to $Y^{12}$ are independently hydrogen, fluorine, methyl or trifluoromethyl;

$P^1$ and $P^2$ are independently a group selected from groups represented by formulas (P-1), (P-2) and (P-3):

in formula (P-1), $M^1$ and $M^2$ are independently hydrogen, fluorine, methyl or trifluoromethyl;

in formulas (1-1) and (1-2), at least one of $Z^1$ and $Z^2$ has an unsaturated bond when $G^1$ and $G^2$ are —O—, and $P^1$ and $P^2$ are a group represented by formula (P-1);

in formula (1-1), at least one of $Z^1$ and $Z^2$ has the unsaturated bond when all of $Y^1$ to $Y^8$ is hydrogen, $G^1$ and $G^2$ are a single bond, and $P^1$ and $P^2$ are a group represented by formula (P-1); and in formula (1-2), at least one of $Z^1$ and $Z^2$ has the unsaturated bond when $G^1$ and $G^2$ are —O—, all of $Y^1$, $Y^2$ and $Y^5$ to $Y^{12}$ are hydrogen, at least one of $Y^3$ or $Y^4$ is methyl or trifluoromethyl, and $P^1$ and $P^2$ is a group represented by formula (P-2).

Item 4. The compound according to item 3, wherein at least one of $Z^1$ and $Z^2$ has an unsaturated bond.

Item 5. The compound according to item 3, wherein both $Z^1$ and $Z^2$ have an unsaturated bond.

Item 6. The compound according to item 4 or 5, wherein $P^1$ and $P^2$ are a group represented by formula (P-1), $M^1$ is hydrogen or methyl, and $M^2$ is hydrogen.

Item 7. The compound according to item 1, wherein the compound is represented by formula (1-1-1), formula (1-2-1) or formula (1-3):

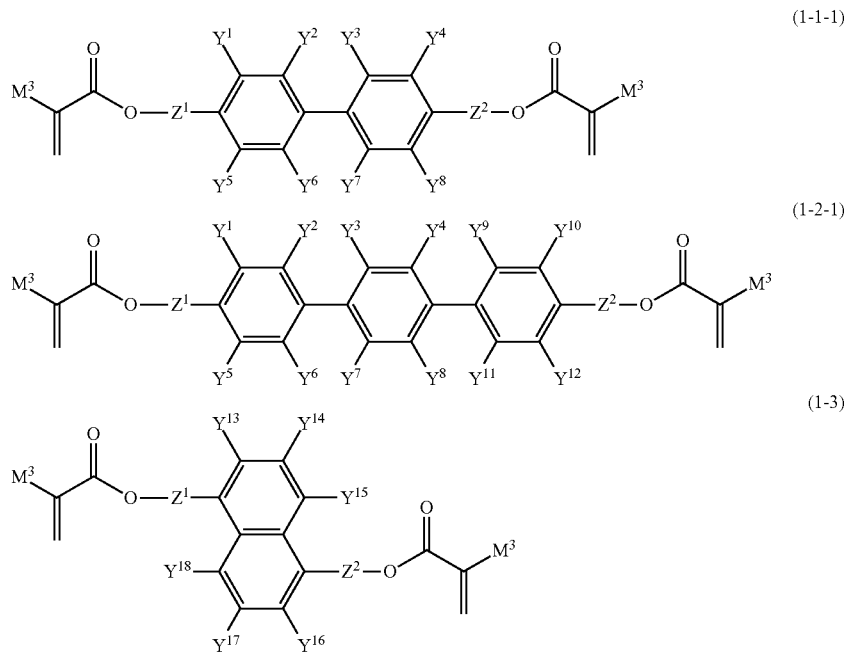

in formula (1-1-1), formula (1-2-1) and formula (1-3), $Z^1$ and $Z^2$ are independently alkylene having 1 to 10 carbons, and in the alkylene at least one —CH$_2$— may be replaced by —O—, —COO— or —OCOO—, and one —CH$_2$—CH$_2$— has been replaced by —CH=CH— or —C≡C—; $Y^1$ to $Y^{12}$ or $Y^{13}$ to $Y^{18}$ are independently hydrogen, fluorine, methyl or trifluoromethyl; and $M^3$ is hydrogen or methyl.

Item 8. The compound according to item 1, wherein the compound is represented by formula (1-1-2), formula (1-2-2) or formula (1-3-1):

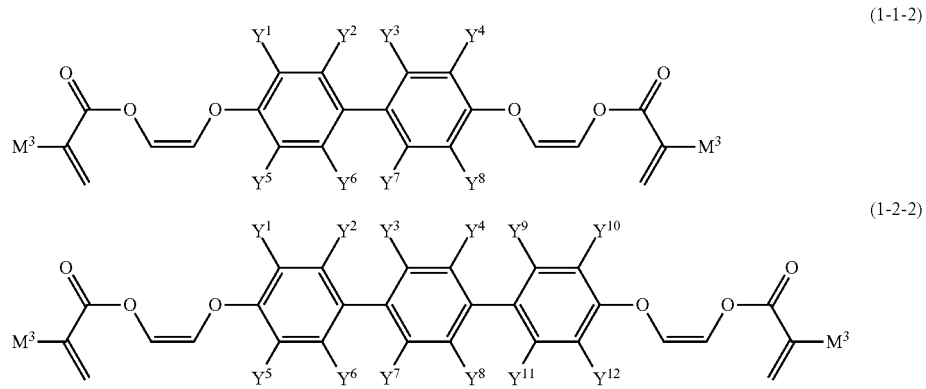

(1-3-1)

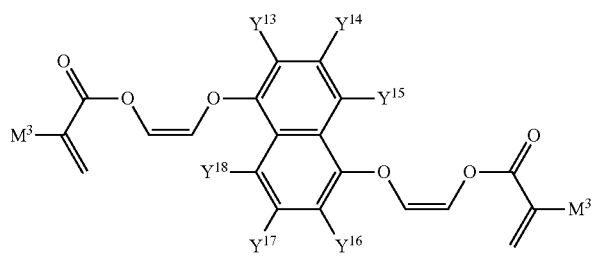

in formula (1-1-2), formula (1-2-2) and formula (1-3-1), $Y^1$ to $Y^{12}$ or $Y^{13}$ to $Y^{18}$ are independently hydrogen, fluorine, methyl or trifluoromethyl; and $M^3$ is hydrogen or methyl.

Item 9. A polymer obtained by the polymerization of a compound according to any one of items 1 to 8.

Item 10. A liquid crystal composition including at least one selected from the group of compounds according to any one of items 1 to 8 and polymers according to item 9.

Item 11. A liquid crystal composition including at least two selected from the group of compounds according to any one of items 1 to 8 and polymers according to item 9.

Item 12. A liquid crystal composition, wherein a first component is at least one compound selected from the group of compounds represented by formula (1) according to item 1, and the composition further includes a polymerizable compound excluding formula (1) according to item 1.

Item 13. The liquid crystal composition according to any one of items 10 to 12, further including at least one compound selected from the group of compounds represented by formulas (2), (3) and (4):

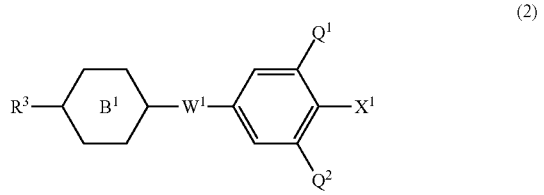
(2)

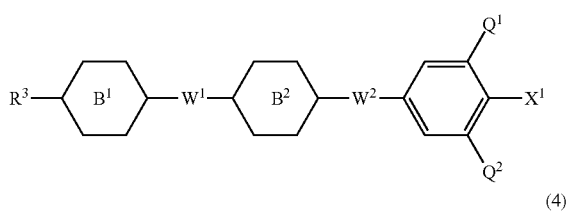
(3)

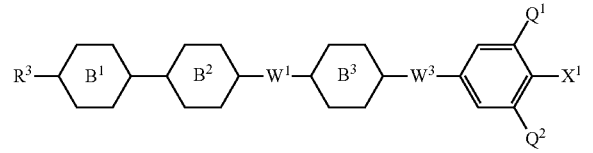
(4)

wherein $R^3$ is alkyl having 1 to 10 carbons or alkenyl having 2 to 10 carbons, and in these groups at least one hydrogen may be replaced by fluorine and at least one —$CH_2$— may be replaced by —O—;

$X^1$ is fluorine, chlorine, —$OCF_3$, —$OCHF_2$, —$CF_3$, —$CHF_2$, —$CH_2F$, —$OCF_2CHF_2$ or —$OCF_2CHFCF_3$;

the ring $B^1$, the ring $B^2$ and the ring $B^3$ are independently 1,4-cyclohexenylene, 1,3-dioxane-2,5-diyl, pyrimidine-2,5-diyl, tetrahydropyran-2,5-diyl or 1,4-phenylene in which at least one hydrogen may be replaced by fluorine;

$W^1$ and $W^2$ are independently —$(CH_2)_2$—, —$(CH_2)_4$—, —COO—, —$CF_2O$—, —$OCF_2$—, —CH=CH—, —C≡C—, —$CH_2O$— or a single bond; and $Q^1$ and $Q^2$ are independently hydrogen or fluorine.

Item 14. The liquid crystal composition according to any one of items 10 to 12, further including at least one compound selected from the group of compounds represented by formula (5):

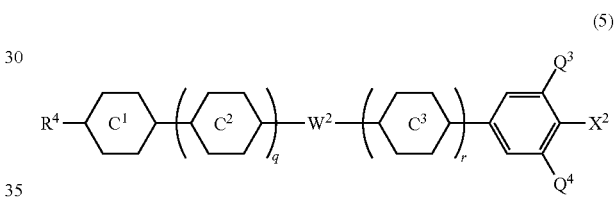
(5)

wherein $R^4$ is alkyl having 1 to 10 carbons or alkenyl having 2 to 10 carbons, and in these groups at least one hydrogen may be replaced by fluorine and at least one —$CH_2$— may be replaced by —O—;

$X^2$ is —C≡N or —C≡C—C≡N;

the ring $C^1$, the ring $C^2$ and the ring $C^3$ are independently 1,4-cyclohexenylene, 1,4-phenylene in which at least one hydrogen may be replaced by fluorine, 1,3-dioxane-2,5-diyl, tetrahydropyran-2,5-diyl or pyrimidine-2,5-diyl;

$W^3$ is —$(CH_2)_2$—, —COO—, —$CF_2O$—, —$OCF_2$—, —$CH_2O$— or a single bond;

$Q^3$ and $Q^4$ are independently hydrogen or fluorine; and q is 0, 1 or 2, and r is 0 or 1.

Item 15. The liquid crystal composition according to any one of items 10 to 12, further including at least one compound selected from the group of compounds represented by formulas (6), (7) and (8):

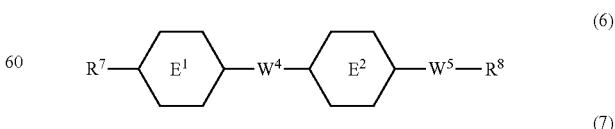
(6)

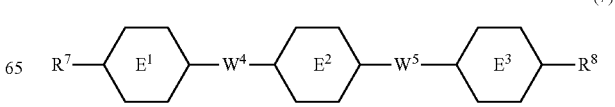
(7)

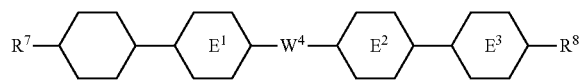

(8)

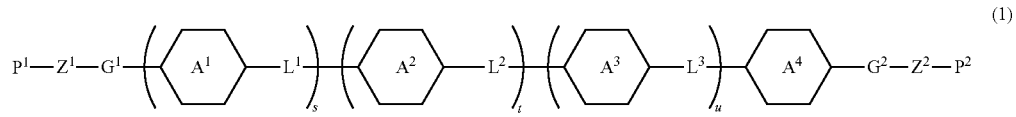

(1)

wherein $R^7$ and $R^8$ are independently alkyl having 1 to 10 carbons or alkenyl having 2 to 10 carbons, and in these groups at least one hydrogen may be replaced by fluorine and at least one —$CH_2$— may be replaced by —O—;

the ring $E^1$, the ring $E^2$ and the ring $E^3$ are independently 1,4-cyclohexenylene, pyrimidine-2,5-diyl, 1,4-phenylene, 2-fluoro-1,4-phenylene or 2,5-difluoro-1,4-phenylene; and $W^4$ and $W^5$ are independently —C≡C—, —COO—, —$(CH_2)_2$—, —CH=CH— or a single bond.

Item 16. The liquid crystal composition according to item 13, further including at least one compound selected from the group of compounds represented by formulas (6), (7) and (8) according to item 15.

Item 17. The liquid crystal composition according to item 14, further including at least one compound selected from the group of compounds represented by formulas (6), (7) and (8) according to item 15.

Item 18. A liquid crystal display device containing at least one selected from the group of compounds according to any one of items 1 to 8 and polymers according to item 9.

Item 19. A liquid crystal display device containing the liquid crystal composition according to any one of items 10 to 17.

Item 20. Use of at least one selected from the group of compounds according to any one of items 1 to 8, polymers according to item 9 and liquid crystal compositions according to any one of items 10 to 17, in a liquid crystal display device.

The invention includes the following items (1) to (7): (1) The composition described above, further including an optically active compound. (2) The composition described above, further including an additive such as an antioxidant, an ultraviolet light absorber, a light stabilizer, a thermal stabilizer and/or an antifoaming agent. (3) An AM device containing the composition described above. (4) A device containing the composition described above and having a mode of PS-TN, PS-IPS, PS-FFS, PSA-VA or PSA-OCB. (5) A transmission type device containing the composition described above. (6) Use of the composition described above as a composition having a nematic phase. (7) Use as an optically active composition by the addition of an optically active compound to the composition described above.

Compounds, synthetic methods, liquid crystal compositions, polymerization and liquid crystal display devices in the invention will be explained in this order.

1. The Compound (1)

Desirable examples of the compound (1) of the invention will be explained. Desirable examples of the terminal group, the ring structure, the bonding group and the substituent in the compound (1) can be applied to the sub-formulas of the compound (1). Physical properties such as a clearing point, optical anisotropy and dielectric anisotropy can be arbitrarily adjusted by a suitable combination of the kinds of the ring $A^1$, the ring $A^2$, the ring $A^3$, the ring $A^4$, $Z^1$, $Z^2$, $L^2$, $L^3$, $G^1$, $G^2$, $P^1$ and $P^2$ in the compound (1). The compound (1) may include isotopes such as $^2H$ (deuterium) and $^{13}C$ in a larger amount than the amount of the natural abundance, since there are no major differences in physical properties of the compound. Main effects of the kinds of $Z^1$ and so forth on the physical properties of the compound (1) will be explained below.

In formula (1), the ring $A^1$, the ring $A^2$, the ring $A^3$ and the ring $A^4$ are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these groups at least one hydrogen may be replaced by halogen, alkyl having 1 to 12 carbons or alkyl having 1 to 12 carbons in which at least one hydrogen has been replaced by halogen.

Desirable ring $A^1$ to ring $A^4$ are 1,4-phenylene, naphthalene-2,6-diyl, naphthalene-1,4-diyl or naphthalene-1,5-diyl, and in these groups at least one hydrogen may be replaced by fluorine, chlorine, alkyl having 1 to 4 carbons or alkyl having 1 to 4 carbons in which at least one hydrogen has been replaced by fluorine. More desirable ring $A^1$ to ring $A^4$ are 1,4-phenylene, 2-fluoro-1,4-phenylene, naphthalene-2,6-diyl or naphthalene-1,5-diyl, the most desirable ring $A^1$ to ring $A^4$ is 1,4-phenylene.

In formula (1), $Z^1$ and $Z^2$ are independently alkylene having 1 to 10 carbons, and in the alkylene at least one —$CH_2$— may be replaced by —O—, —COO— or —OCOO— and at least one —$CH_2$—$CH_2$— may be replaced by —CH=CH— or —C≡C—.

A desirable examples of $Z^1$ or $Z^2$ is —CH=CH—, —COO— or —CH=CH—O—. A more desirable example of $Z^1$ or $Z^2$ is —CH=CH— or —CH=CH—O—, and the most desirable example of $Z^1$ or $Z^2$ is —CH=CH—O—.

The viscosity is small when $Z^1$ and $Z^2$ are a single bond, —$CH_2$—, —$(CH_2)_2$—, —$(CH_2)_4$—, —CH=CH—, —CH=CH—O—, —$CH_2O$—, —$(CH_2)_2O$—, —$(CH_2)_3O$— or —$(CH_2)_4O$—. The viscosity is smaller when $Z^1$ or $Z^2$ is a single bond, —$(CH_2)_2$—, —$(CH_2)_2O$—, —CH=CH— or —CH=CH—O—. The temperature range of a liquid crystal phase is wide and the elastic constant (K) is large when the bonding group is —CH=CH— or —CH=CH—O—. The optical anisotropy is large when the bonding group is —CH=CH—, —CH=CH—O— or —C≡C—. The chemical stability is high when $Z^1$ or $Z^2$ is a single bond, —$CH_2$—, —$(CH_2)_2$—, —$(CH_2)_2O$—, —$(CH_2)_4$— or —$(CH_2)_3O$—. When $Z^1$ or $Z^2$ is a group having a double bond such as —CH=CH—, the configuration may be a cis-form or may be a trans-form.

In formula (1), $G^1$ and $G^2$ are independently a single bond or —O—.

The viscosity is small and the chemical stability is high when $G^1$ or $G^2$ is a single bond. The temperature range of a liquid crystal phase is wide and the solubility in a liquid crystal composition is high when $G^1$ or $G^2$ is —O—.

In formula (1), $L^1$, $L^2$ and $L^3$ are independently a single bond, —COO— or —CH=CH—.

Desirable $L^1$, $L^2$ or $L^3$ is a single bond or —CH=CH—. The most desirable $L^1$, $L^2$ or $L^3$ is a single bond.

The viscosity is small and the chemical stability is high when $L^1$, $L^2$ or $L^3$ is a single bond. The temperature range of a liquid crystal phase is wide and the elastic constant (K) is large when $L^1$, $L^2$ or $L^3$ is —CH=CH—. The optical anisotropy is large when $L^1$, $L^2$ or $L^3$ is —CH=CH— or —COO—. When $L^1$, $L^2$ or $L^3$ has —CH=CH—, the configuration may be a cis-form or may be a trans-form.

In formula (1), $P^1$ and $P^2$ are independently the group (P-1), the group (P-2) or the group (P-3).

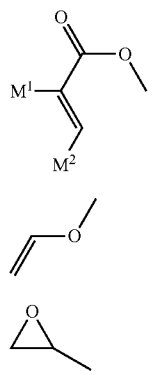

(P-1)

(P-2)

(P-3)

In the group (P-1), $M^1$ and $M^2$ are independently hydrogen, fluorine, methyl or trifluoromethyl. Desirable $P^1$ or $P^2$ is the group (P-1). More desirable $P^1$ or $P^2$ is the group (P-1) where $M^1$ is hydrogen or methyl. The most desirable $P^1$ or $P^2$ is the group (P-1) where $M^1$ is hydrogen or methyl and $M^2$ is hydrogen. The configuration of the double bond part in the group (P-1) may be a cis-form or may be a trans-form.

In formula (1), s, t and u are independently 0 or 1. The viscosity is small when the sum of s, t and u is 1. The maximum temperature is high when the sum of s, t and u is 2 or 3.

As described above, a compound having objective physical properties can be obtained by a suitable selection of the kinds of ring structures, terminal groups, bonding groups and so forth. Accordingly, the compound (1) is useful as the component of a liquid crystal composition for use in a liquid crystal display device having a mode such as PS-TN, PS-IPS, PS-FFS, PSA-VA or PSA-OCB.

Desirable examples of the compound (1) are compounds represented by sub-formulas that will be described below. The first example was described in item 3. That is to say, it is the compound according to item 1 wherein the compound is represented by formula (1-1) or (1-2). In these compounds, the compound (1-1) is preferable. In these compounds, the definitions of symbols such as $Z^1$ are just the same as described in item 3.

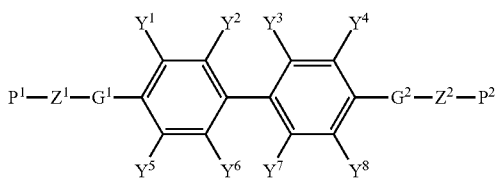

(1-1)

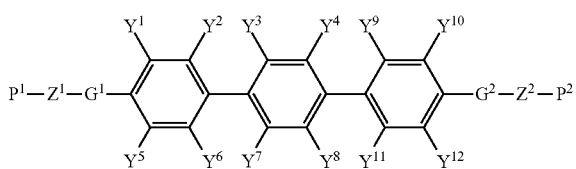

(1-2)

The second example is the compound according to item 1, wherein the compound is represented by formula (1-1-1), formula (1-2-1) or formula (1-3):

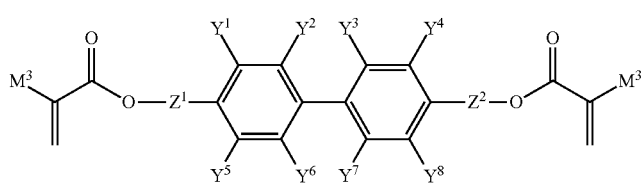

(1-1-1)

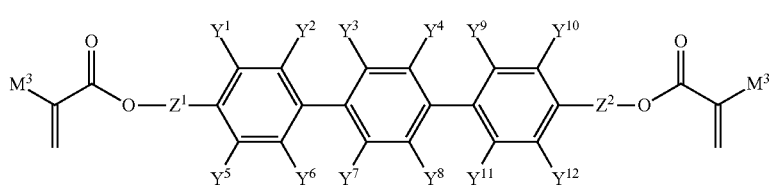

(1-2-1)

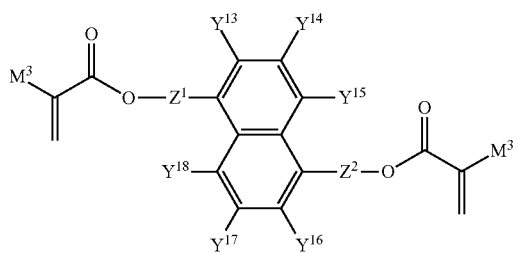

(1-3)

in formula (1-1-1), formula (1-2-1) and formula (1-3), $Z^1$ and $Z^2$ are independently alkylene having 1 to 10 carbons, and in the alkylene at least one —$CH_2$— may be replaced by —O—, —COO— or —OCOO—, and one —$CH_2$—$CH_2$— has been replaced by —CH=CH— or —C≡C—; $Y^1$ to $Y^{12}$ or $Y^{13}$ to $Y^{18}$ are independently hydrogen, fluorine, methyl or trifluoromethyl; and $M^3$ is hydrogen or methyl.

The third example is the compound according to item 1, wherein the compound is represented by formula (1-1-1), formula (1-2-1) or formula (1-3), and in these formulas, $Z^1$ and $Z^2$ are independently alkylene having 1 to 10 carbons, and in the alkylene at least one —$CH_2$— may be replaced by —O—, and one —$CH_2$—$CH_2$— has been replaced by —CH=CH—; $Y^1$ to $Y^{12}$ or $Y^{13}$ to $Y^{18}$ are independently hydrogen or fluorine; and $M^3$ is hydrogen or methyl.

The fourth example is the compound according to item 1, wherein the compound is represented by formula (1-1-2), formula (1-2-2) or formula (1-3-1):

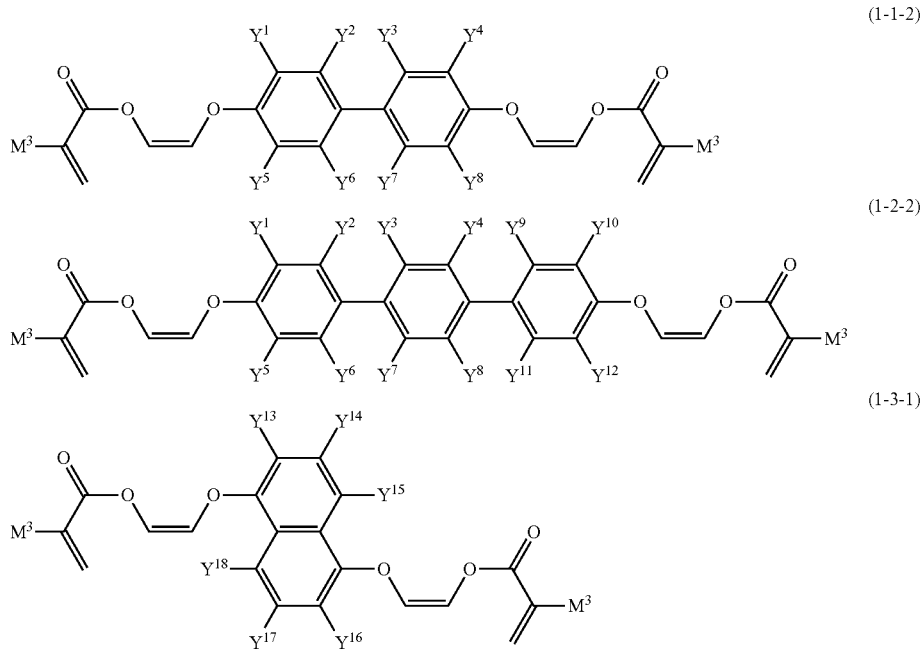

in formula (1-1-2), formula (1-2-2) and formula (1-3-1), $Y^1$ to $Y^{12}$ or $Y^{13}$ to $Y^{18}$ are independently hydrogen, fluorine, methyl or trifluoromethyl; and $M^3$ is hydrogen or methyl.

The fifth example is the compound according to item 1, wherein the compound is represented by formula (1-1-2), formula (1-2-2) or formula (1-3-1), and in these formulas, $Y^1$ to $Y^{12}$ or $Y^{13}$ to $Y^{18}$ are independently hydrogen or fluorine; and $M^3$ is hydrogen or methyl.

2. Synthetic Methods

The method for synthesizing the compound (1) will be explained. The compound (1) can be prepared by a suitable combination of methods in synthetic organic chemistry. Methods of introducing objective terminal groups, rings and bonding groups into starting materials are described in books as Houben-Wyle, Methoden der Organische Chemie (Georg-Thieme Verlag, Stuttgart), Organic Syntheses (John Wily & Sons, Inc.), Organic Reactions (John Wily & Sons Inc.), Comprehensive Organic Synthesis (Pergamon Press) and Shin Jikken Kagaku Kouza (New Experimental Chemistry Course, in English; Maruzen Co., Ltd., Japan).

2-1. Formation of the Bonding Group L

Examples of the formation of the bonding group $L^1$, $L^2$ and $L^3$ in the compound (1) are shown in the following schemes. In these schemes, $MSG^1$ (or $MSG^2$) is a monovalent organic group having at least one ring. Monovalent organic groups represented by a plurality of the $MSG^1$ (or $MSG^2$) may be the same or different. The compounds (1A) to (1K) correspond to the compound (1).

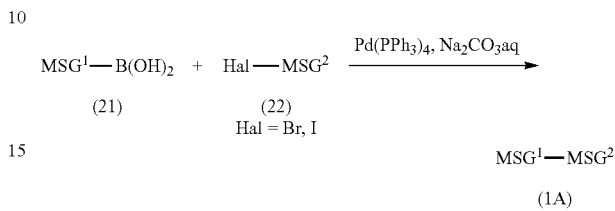

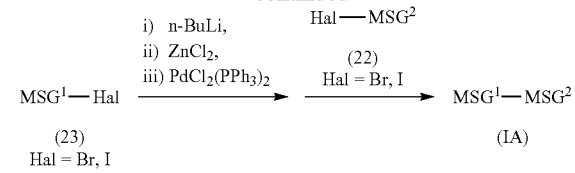

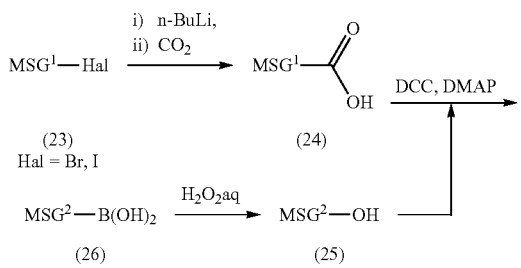

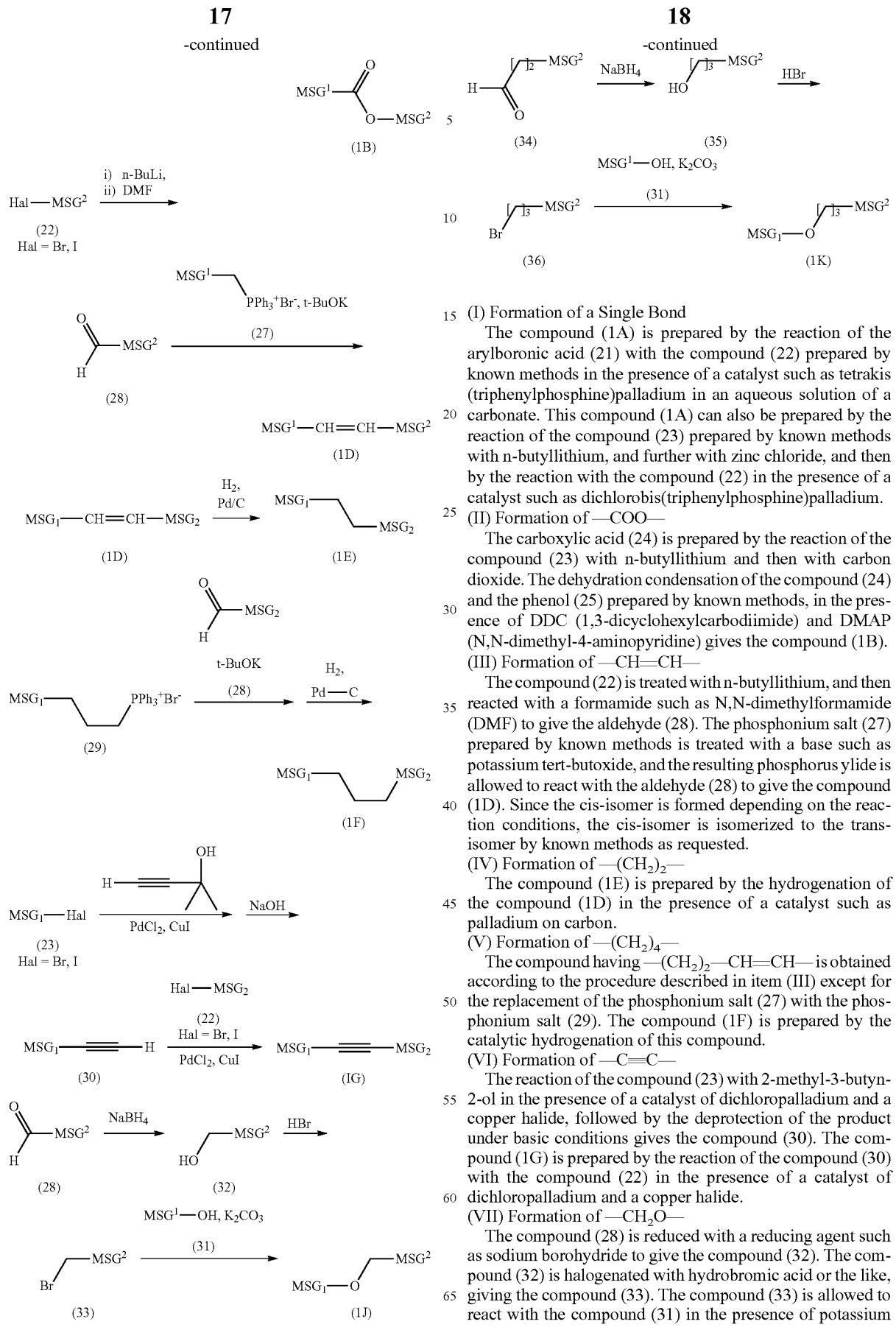

(I) Formation of a Single Bond

The compound (1A) is prepared by the reaction of the arylboronic acid (21) with the compound (22) prepared by known methods in the presence of a catalyst such as tetrakis(triphenylphosphine)palladium in an aqueous solution of a carbonate. This compound (1A) can also be prepared by the reaction of the compound (23) prepared by known methods with n-butyllithium, and further with zinc chloride, and then by the reaction with the compound (22) in the presence of a catalyst such as dichlorobis(triphenylphosphine)palladium.

(II) Formation of —COO—

The carboxylic acid (24) is prepared by the reaction of the compound (23) with n-butyllithium and then with carbon dioxide. The dehydration condensation of the compound (24) and the phenol (25) prepared by known methods, in the presence of DDC (1,3-dicyclohexylcarbodiimide) and DMAP (N,N-dimethyl-4-aminopyridine) gives the compound (1B).

(III) Formation of —CH═CH—

The compound (22) is treated with n-butyllithium, and then reacted with a formamide such as N,N-dimethylformamide (DMF) to give the aldehyde (28). The phosphonium salt (27) prepared by known methods is treated with a base such as potassium tert-butoxide, and the resulting phosphorus ylide is allowed to react with the aldehyde (28) to give the compound (1D). Since the cis-isomer is formed depending on the reaction conditions, the cis-isomer is isomerized to the trans-isomer by known methods as requested.

(IV) Formation of —(CH$_2$)$_2$—

The compound (1E) is prepared by the hydrogenation of the compound (1D) in the presence of a catalyst such as palladium on carbon.

(V) Formation of —(CH$_2$)$_4$—

The compound having —(CH$_2$)$_2$—CH═CH— is obtained according to the procedure described in item (III) except for the replacement of the phosphonium salt (27) with the phosphonium salt (29). The compound (1F) is prepared by the catalytic hydrogenation of this compound.

(VI) Formation of —C≡C—

The reaction of the compound (23) with 2-methyl-3-butyn-2-ol in the presence of a catalyst of dichloropalladium and a copper halide, followed by the deprotection of the product under basic conditions gives the compound (30). The compound (1G) is prepared by the reaction of the compound (30) with the compound (22) in the presence of a catalyst of dichloropalladium and a copper halide.

(VII) Formation of —CH$_2$O—

The compound (28) is reduced with a reducing agent such as sodium borohydride to give the compound (32). The compound (32) is halogenated with hydrobromic acid or the like, giving the compound (33). The compound (33) is allowed to react with the compound (31) in the presence of potassium carbonate or the like, giving the compound (1J).

(VIII) Formation of —(CH$_2$)$_3$O—

The compound (1K) is prepared according to the procedure described in item (VII) except for the replacement of the compound (28) with the compound (34).

2-2. Formation of the Polymerizable Group

Examples of the method for forming the polymerizable groups described below are shown in the schemes described below. In these schemes, MSG$^1$ is a monovalent organic group having at least one ring. The compounds (1S) to (1X) correspond to the compound (1).

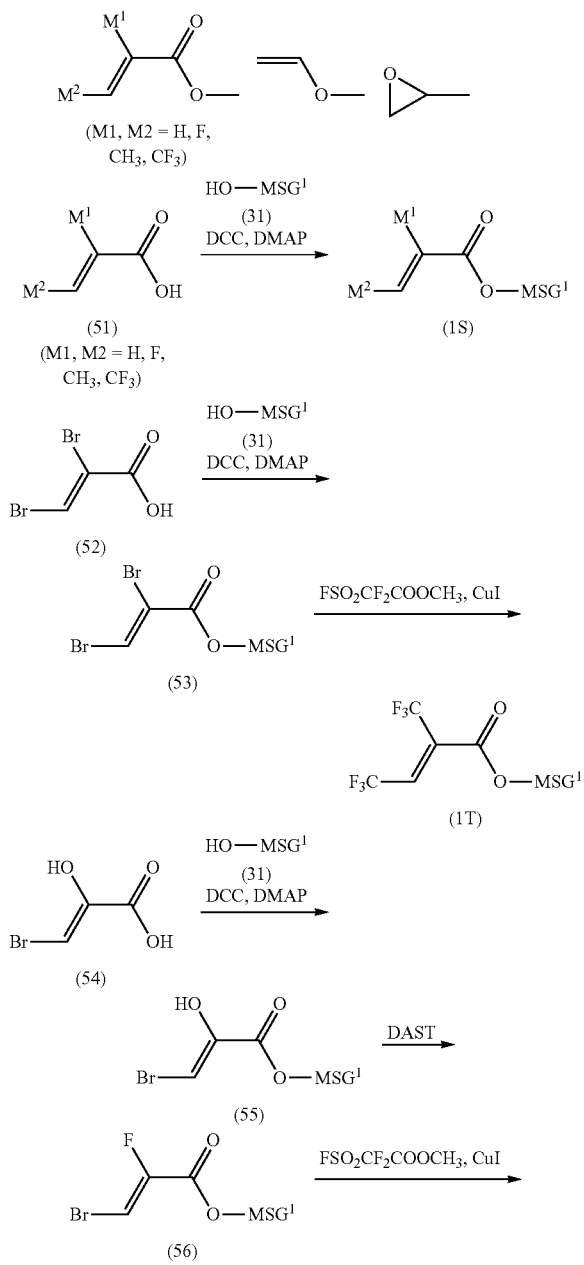

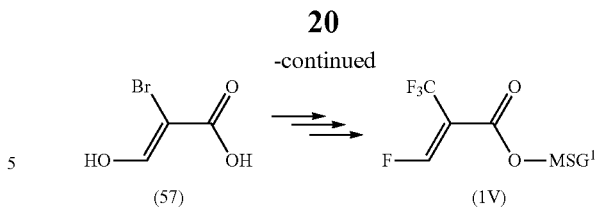

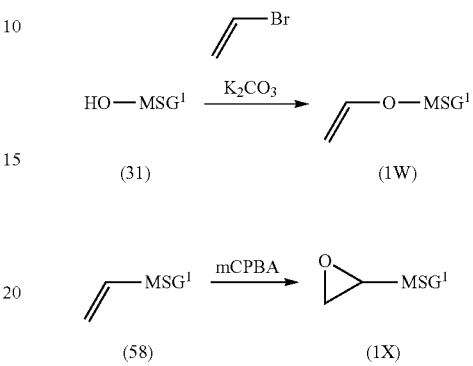

(I) Formation of M$^2$CH=CM$^1$-COO—

The carboxylic acid (51) shown in the above scheme, where both M$^1$ and M$^2$ are not —CF$_3$, where M$^1$ is fluorine and M$^2$ is not —CF$_3$, or where M$^1$ is —CF$_3$ and M$^2$ is not fluorine, is commercially available. The dehydration condensation of this carboxylic acid (51) and the compound (31) in the presence of DCC and DMAP gives the compound (1S).

When both M$^1$ and M$^2$ are —CF$_3$, the dehydration condensation of the carboxylic acid (52) and the compound (31) in the presence of DCC and DMAP gives the compound (53). The compound (53) is allowed to react with methyl 2,2-difluoro-2-(fluorosulfonyl)acetate in the presence of a catalyst of copper iodide to give the compound (1T).

When M$^1$ is fluorine and M$^2$ is —CF$_3$, the dehydration condensation of the carboxylic acid (54) and the compound (31) in the presence of DCC and DMAP gives the compound (55). The compound (55) is fluorinated with a fluorinating agent such as DAST to give the compound (56). The compound (1U) is prepared by the reaction of the compound (56) with methyl 2,2-difluoro-2-(fluorosulfonyl)acetate in the presence of a catalyst of copper iodide.

When M$^1$ is —CF$_3$ and M$^2$ is fluorine, the compound (1V) is prepared according to the method described above, using the carboxylic acid (57) as a starting material.

(II) Formation of a Vinyloxy Group

The compound (1W) is prepared by the reaction of the compound (31) with vinyl bromide in the presence of potassium carbonate or the like.

(III) Formation of an Epoxy Group

The compound (1X) is prepared by the oxidation of the vinyl compound (58) prepared by known methods with meta-chloroperbenzoic acid (mCPBA) or the like.

2-3. Formation of the Bonding Group Z

Examples of the method for forming the bonding groups Z$^1$ and Z$^2$ in the compound (1) are shown in the following schemes. In these schemes, MSG$^1$ is a monovalent organic group having at least one ring. The compound (1Y) corresponds to the compound (1).

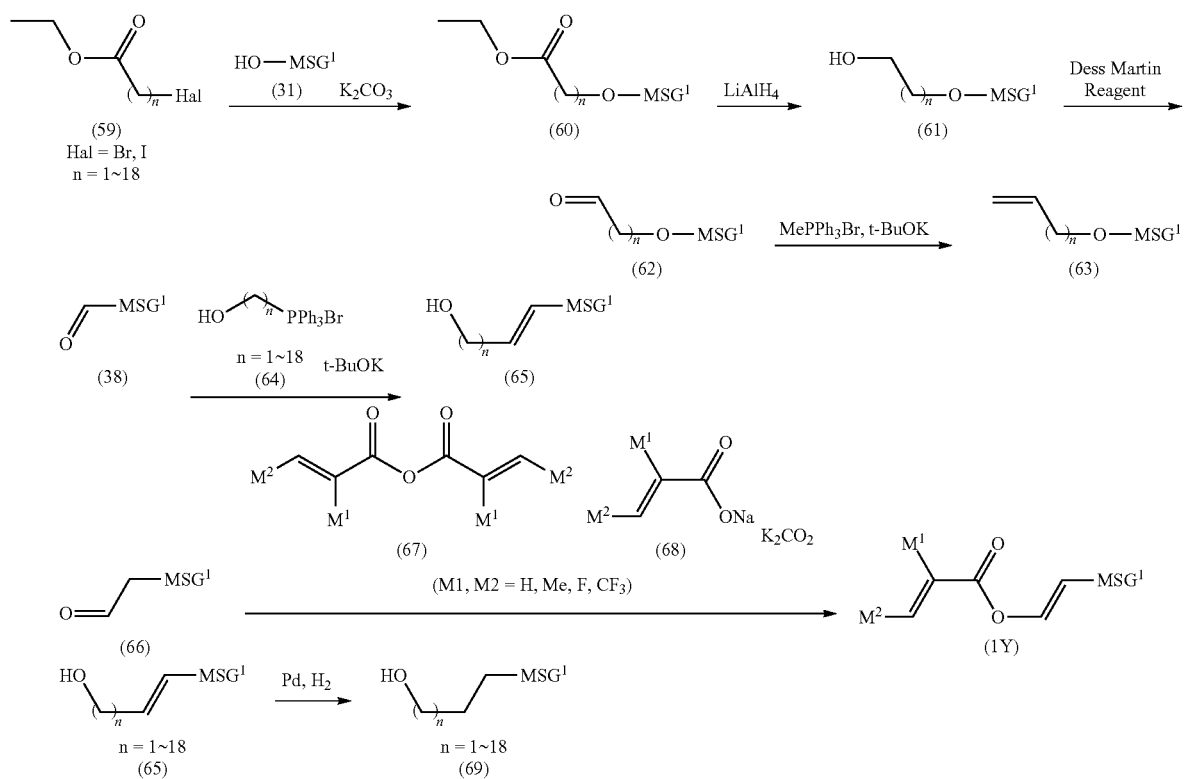

(I) Formation of —CH$_2$O—

The reaction of the compound (59) prepared by known methods with the compound (31) in the presence of potassium carbonate or the like gives the compound (60). The compound (60) is reduced with a reducing agent such as lithium aluminum hydride to give the compound (61). The compound (61) is oxidized with an oxidizing agent such as the Dess-Martin reagent to give the aldehyde (62). A phosphorus ylide generated by the treatment of methyltriphenylphosphonium bromide with a base such as potassium tert-butoxide is allowed to react with the aldehyde (62) to give the compound (63).

When M$^2$CH=CM$^1$-COO— is introduced to the compound (61), the dehydration condensation of the compound (61) and the compound (51) is carried out according to the method described above. When a vinyloxy group is introduced to the compound (61), the reaction of the compound (61) with vinyl bromide is carried out according to the method described above. When an epoxy group is introduced to the compound (63), the epoxidation of the compound (63) is carried out according to the method described above.

(II) Formation of —CH=CH—

A phosphorus ylide generated by the treatment of the phosphonium salt (64) prepared by known methods with a base such as potassium tert-butoxide is allowed to react with the aldehyde (38) to give the compound (65). When M$^2$CH=CM$^1$-COO— is introduced to the compound (65), the dehydration condensation of the compound (65) and the compound (51) is carried out according to the method described above. When a vinyloxy group is introduced to the compound (65), the reaction of the compound (65) with vinyl bromide is carried out according to the method described above. When an epoxy group is introduced to the compound (65), the conversion of —CH$_2$OH to —CH=CH$_2$ and then the epoxidation are carried out according to the method described above.

Introduction of M$^2$CH=CM$^1$-COO— may be carried out as follows: The compound (1Y) is prepared by the reaction of the aldehyde (66) prepared by known methods and the acid anhydride (67) and the sodium carboxylate (68) in the presence of potassium carbonate or the like.

(III) Formation of —CH$_2$CH$_2$—

The compound (69) is prepared by the hydrogenation of the compound (65) in the presence of a catalyst such as palladium on carbon. The method for introducing M$^2$CH=CM$^1$-COO—, a vinyloxy group or an epoxy group to this alcohol is described above.

The compound (1) has a suitable polymerization reactivity, a high conversion yield and a high solubility in a liquid crystal composition in comparison with a similar compound, and has a suitable balance regarding to these physical properties. The compound (1) is moderately stable physically and chemically under the conditions that a liquid crystal display device is usually used, and can suitably be used as a component of a liquid crystal composition for use in a PSA mode.

3. Liquid Crystal Compositions

The liquid crystal composition of the invention includes at least one of the compound (1) as a component. The composition may further include a polymerizable compound that is different from the compound (1) (namely, any other polymerizable compound). Desirable examples of any other polymerizable compound are acrylates, methacrylates, vinyl compounds, vinyloxy compounds, propenyl ethers, epoxy compounds (oxiranes, oxetanes) and vinyl ketones. More desirable examples are a compound having at least one acryloyloxy and a compound having at least one methacryloyloxy. More desirable examples also include a compound having both acryloyloxy and methacryloyloxy.

Additional examples of any other polymerizable compound are the compounds (M-1) to (M-12). In the compounds (M-1) to (M-12), $R^{20}$ is hydrogen or methyl; s is 0 or 1; and t and u are independently an integer from 1 to 10. The symbol F in parentheses means hydrogen or fluorine.

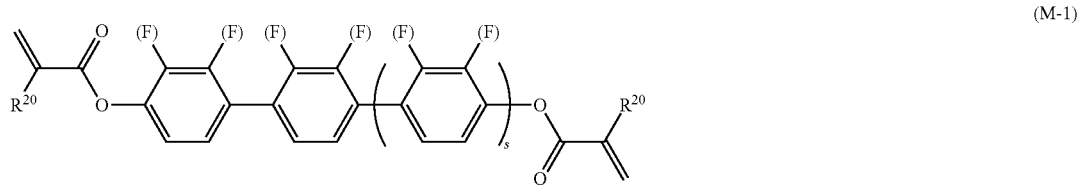
(M-1)

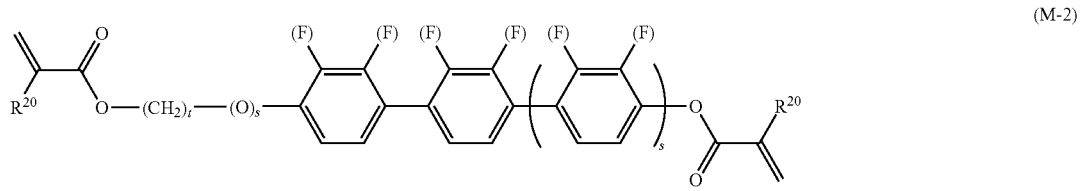
(M-2)

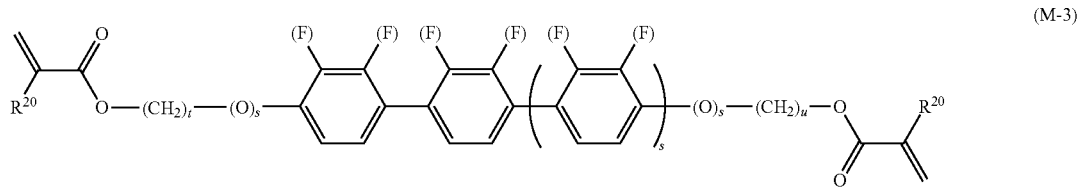
(M-3)

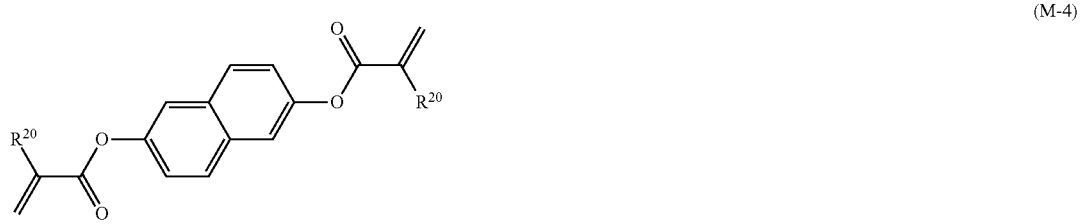
(M-4)

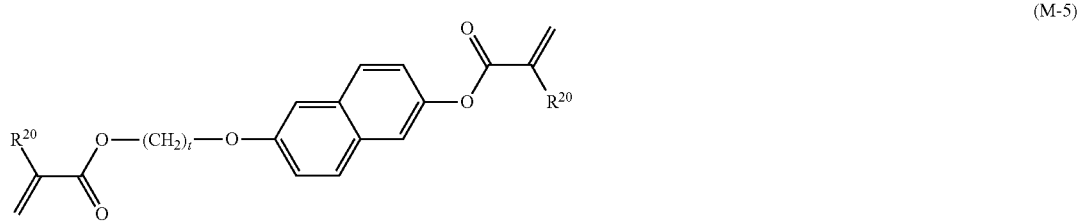
(M-5)

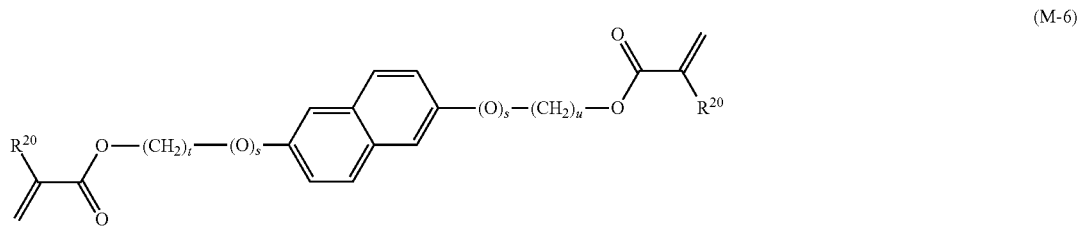
(M-6)

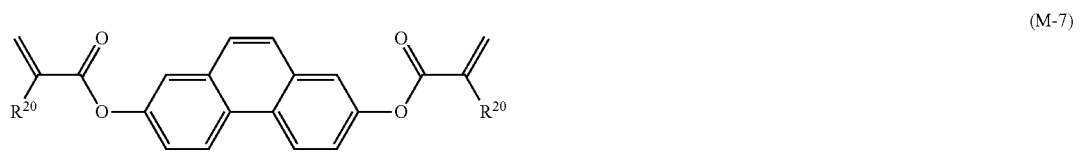
(M-7)

-continued

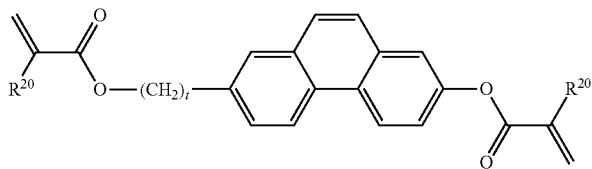
(M-8)

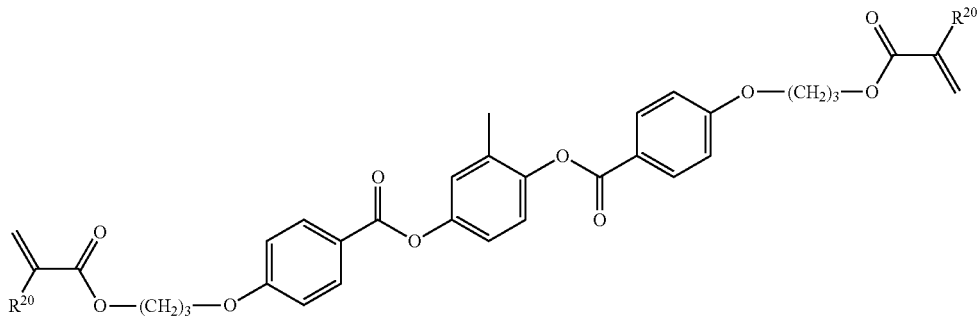
(M-9)

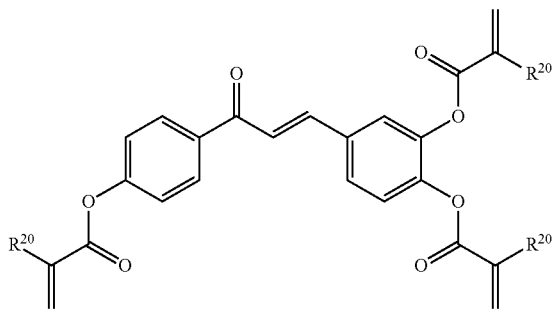
(M-10)

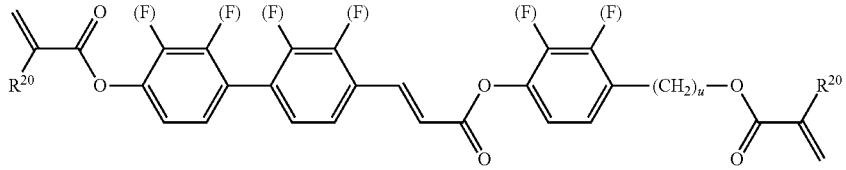
(M-11)

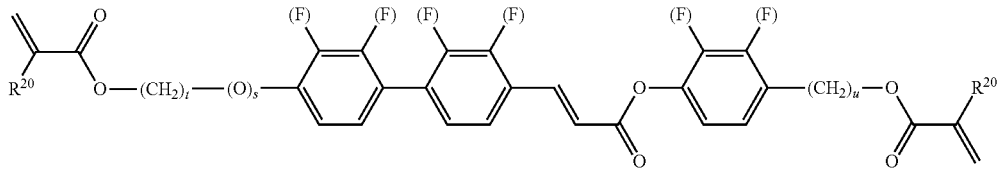
(M-12)

The liquid crystal composition includes at least one of the compound (1), and may further include a liquid crystal compound. When a liquid crystal display device for use in a mode such as PS-TN, PS-IPS, PS-FFS, PSA-VA or PSA-OCB is targeted, it is desirable that the composition should include the compound (1) as a component A, and should further include compounds selected from the components B, C and E that will be shown below. The component B is the compounds (2) to (4). The component C is the compound (5). The component E is the compounds (6) to (8). It is desirable that the components B, C and E should be selected in consideration of positive or negative dielectric anisotropy, the magnitude of dielectric anisotropy and so forth when this kind of composition is prepared. The composition in which the component is suitably selected has a high maximum temperature, a low minimum temperature, a small viscosity, a suitable (a large or a small) optical anisotropy, a large positive or negative dielectric anisotropy and a suitable (a large or a small) elastic constant.

In such a composition, the added amount of the compound (1) (namely, the component A) is in the range of 0.05% by weight to 20% by weight based on the total weight of the liquid crystal compounds. A more desirable added amount is in the range of 0.1% by weight to 10% by weight. The most desirable added amount is in the range of 0.2% by weight to 1% by weight. At least one of polymerizable compounds that are different from the compound (1) (namely, any other polymerizable compounds) may further be added. In this case, it is desirable that the total added amount of the compound (1) and any other polymerizable compound should be within the range described above. The physical properties of the resulting polymer can be adjusted by a suitable selection of any other polymerizable compound. Desirable examples of any other polymerizable compound are acrylates, methacrylates and so forth, as have been explained previously. The desirable examples also include the compounds (M-1) to (M-12).

The component B is a compound having halogen or a fluorine-containing group in the right terminal. Desirable examples of the component B include the compounds (2-1) to (2-16), the compounds (3-1) to (3-118) and the compounds (4-1) to (4-56).

(2-1)
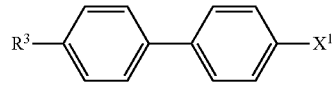

(2-2)
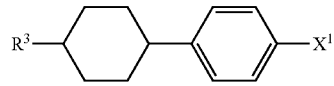

(2-3)
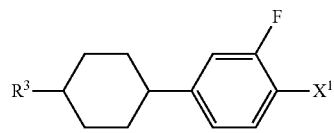

(2-4)
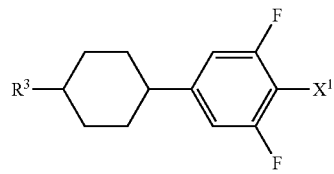

(2-5)
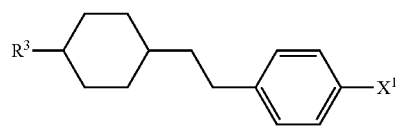

(2-6)
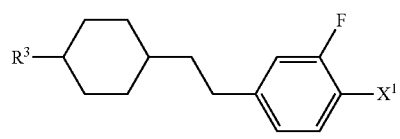

(2-7)
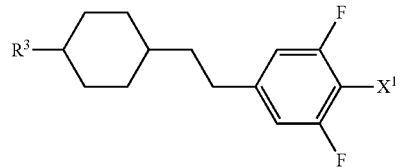

(2-8)
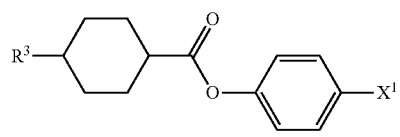

(2-9)
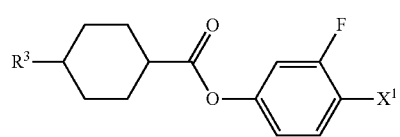

-continued (2-10)
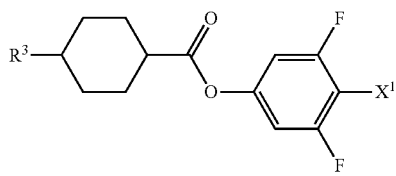

(2-11)
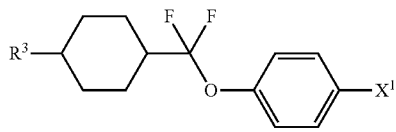

(2-12)
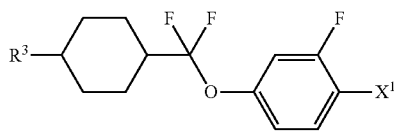

(2-13)
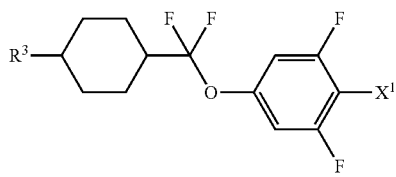

(2-14)
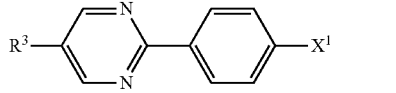

(2-15)
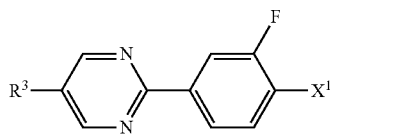

(2-16)
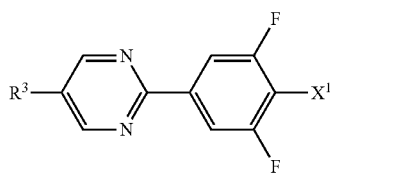

(3-1)
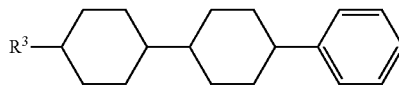

(3-2)
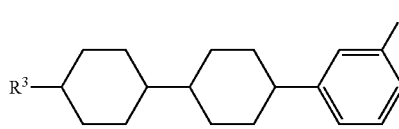

(3-3)
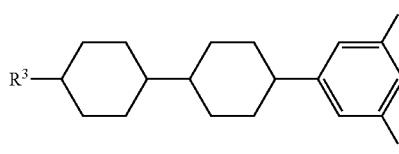

(3-4)
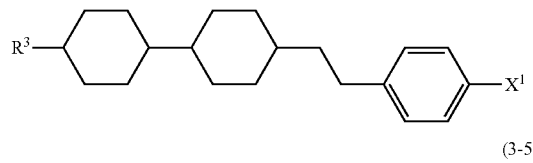
(3-5)
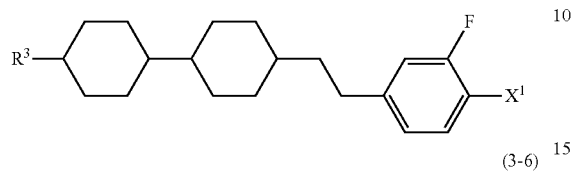
(3-6)
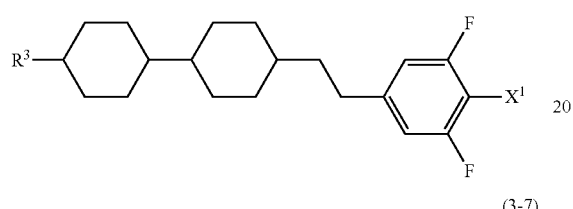
(3-7)
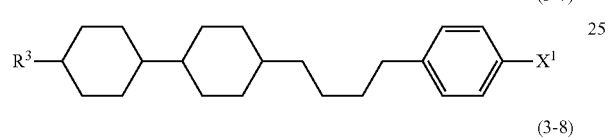
(3-8)
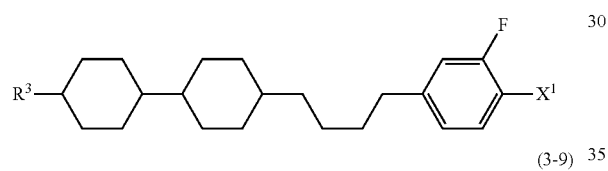
(3-9)
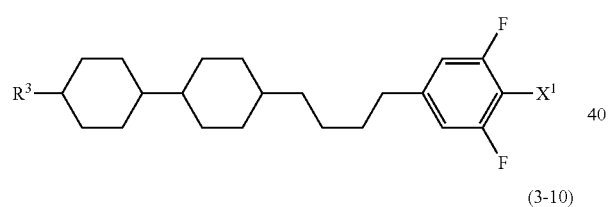
(3-10)
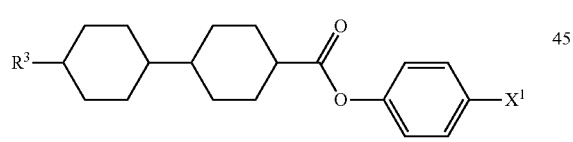
(3-11)
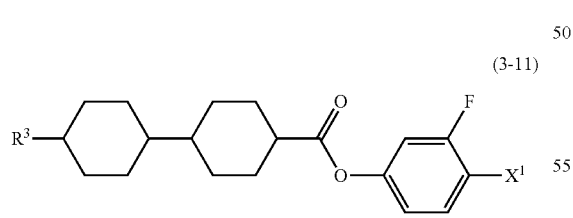
(3-12)
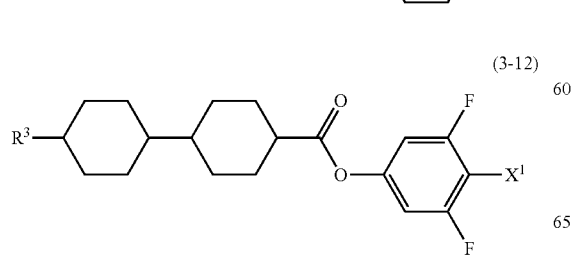
(3-13)
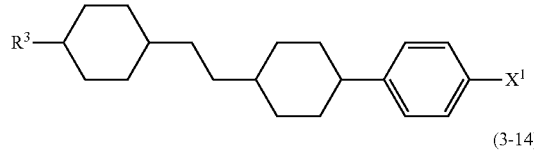
(3-14)
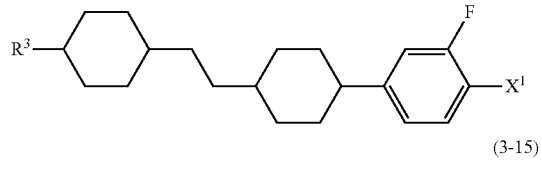
(3-15)
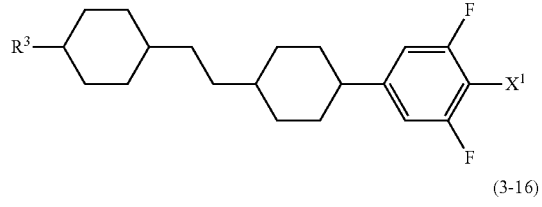
(3-16)
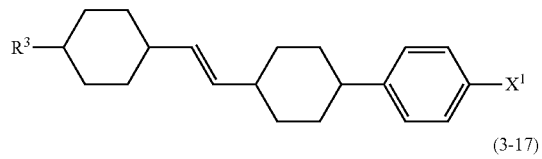
(3-17)
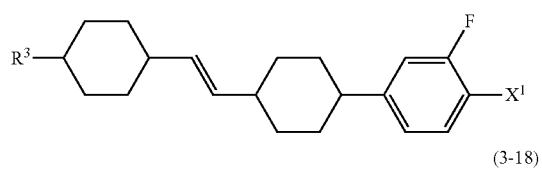
(3-18)
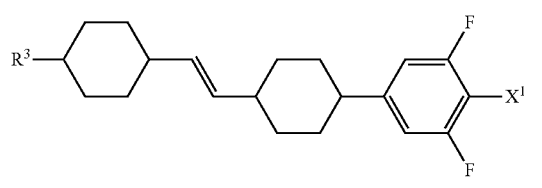
(3-19)
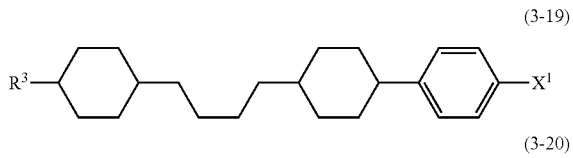
(3-20)
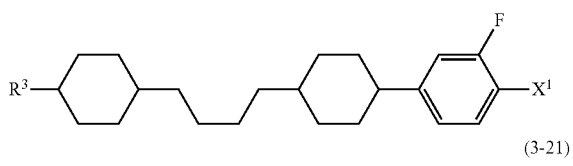
(3-21)
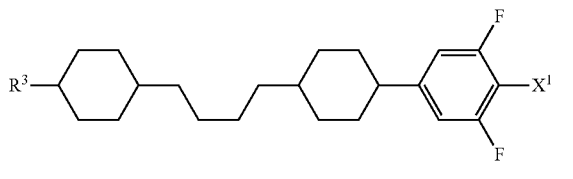
(3-22)
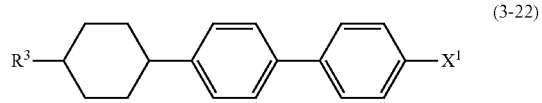

(3-23) 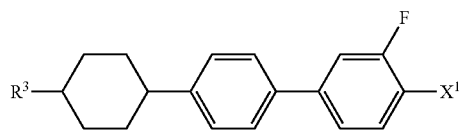
(3-24) 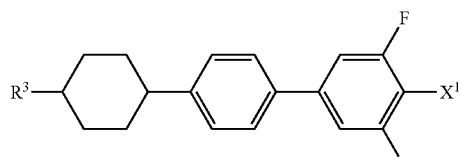
(3-25) 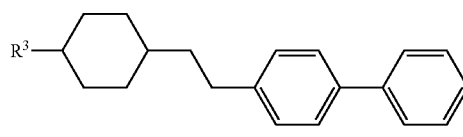
(3-26) 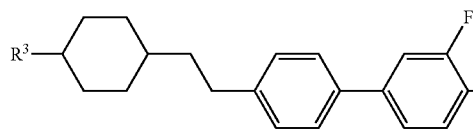
(3-27) 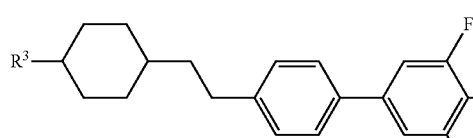
(3-28) 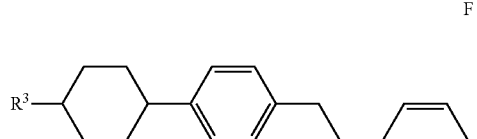
(3-29) 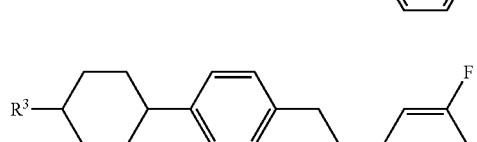
(3-30) 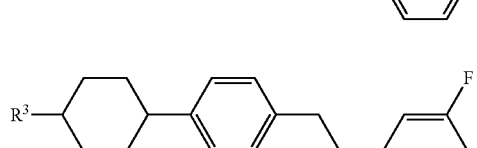
(3-31) 
(3-32) 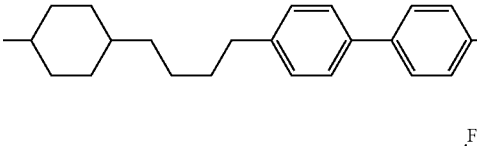
(3-32) 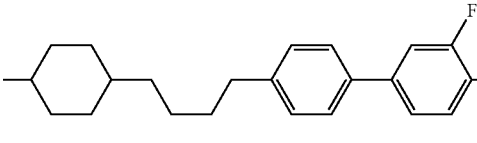
(3-33) 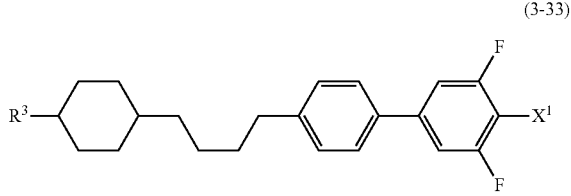
(3-34) 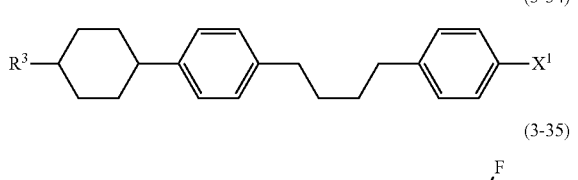
(3-35) 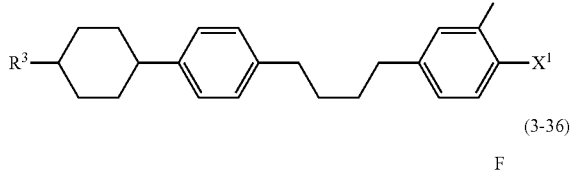
(3-36) 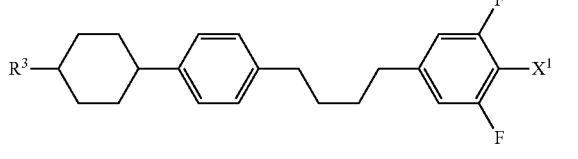
(3-37) 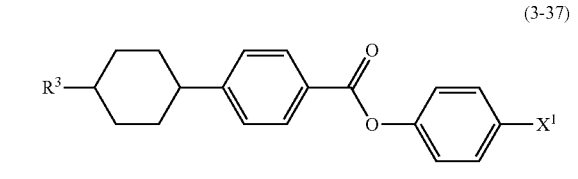
(3-38) 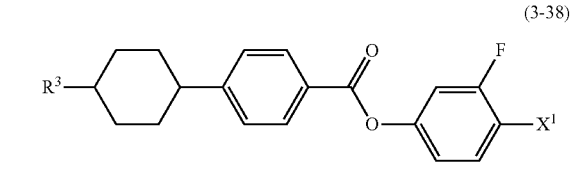
(3-39) 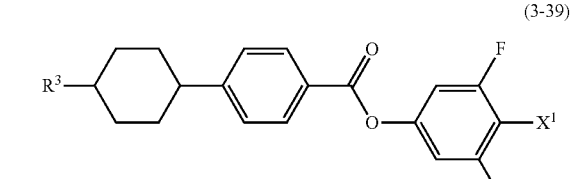
(3-40) 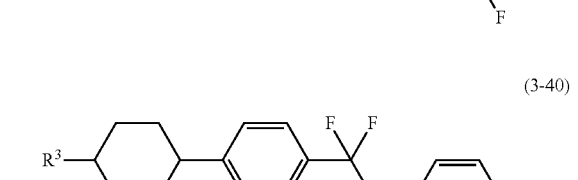
(3-41) 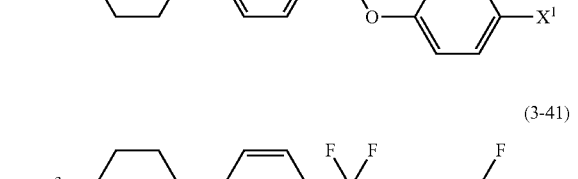

-continued
(3-42)
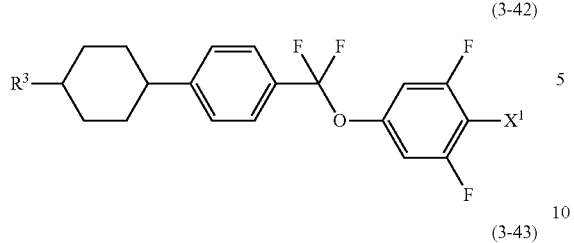
(3-43)
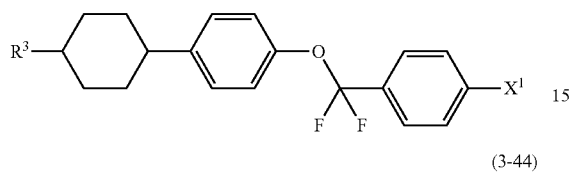
(3-44)
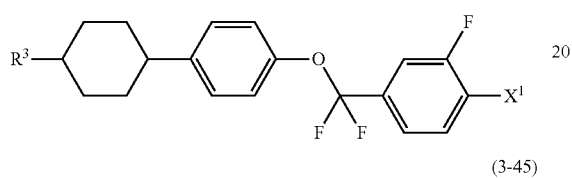
(3-45)
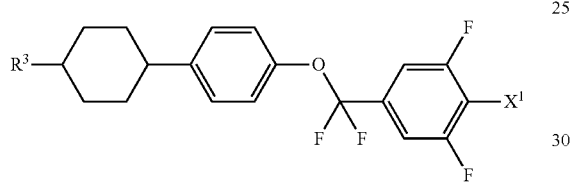
(3-46)
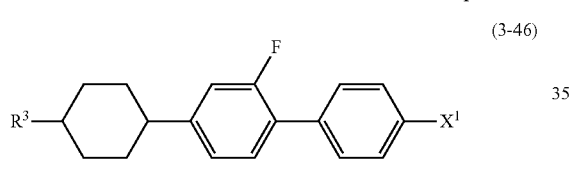
(3-47)
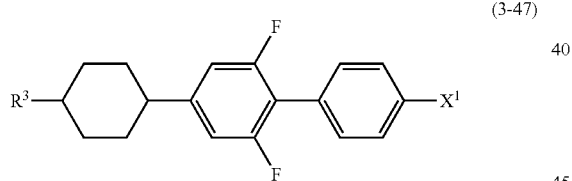
(3-48)
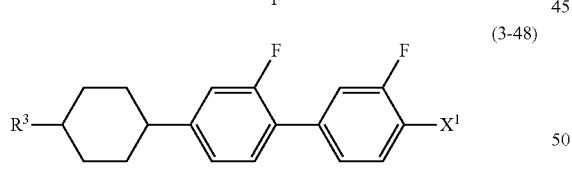
(3-49)
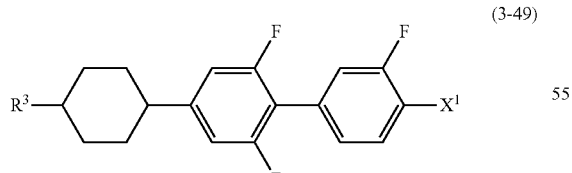
(3-50)
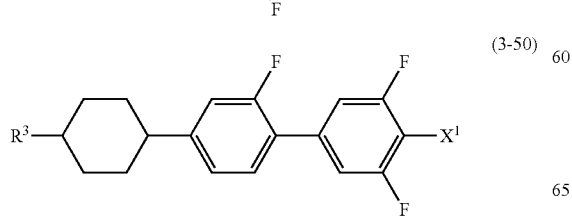
-continued
(3-51)
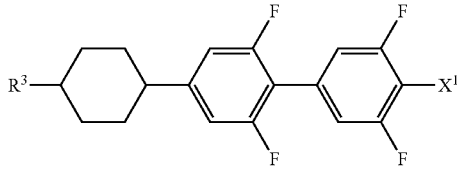
(3-52)
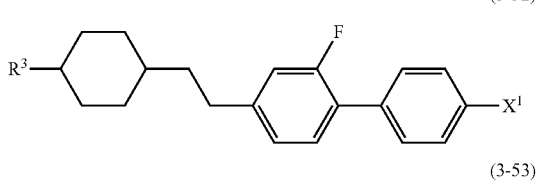
(3-53)
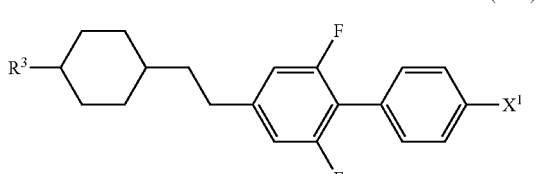
(3-54)
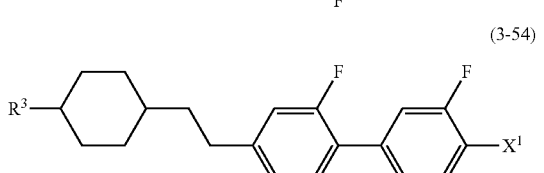
(3-55)
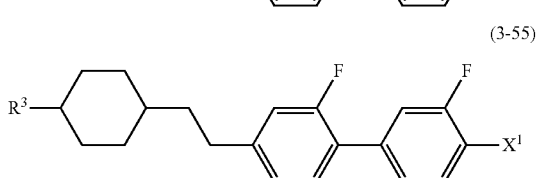
(3-56)
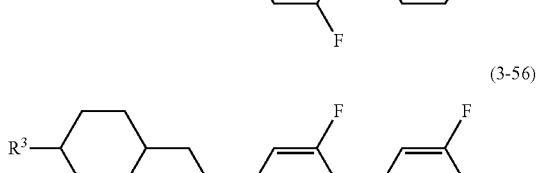
(3-57)
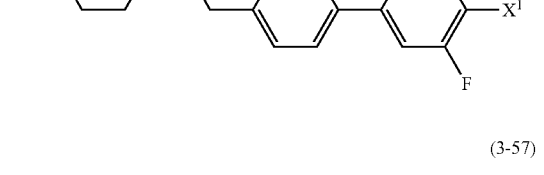
(3-58)
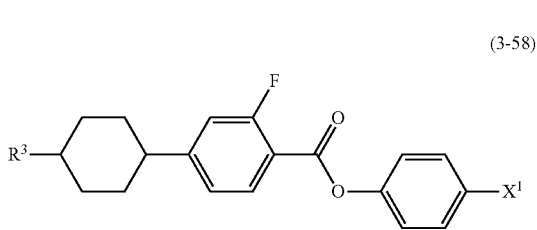

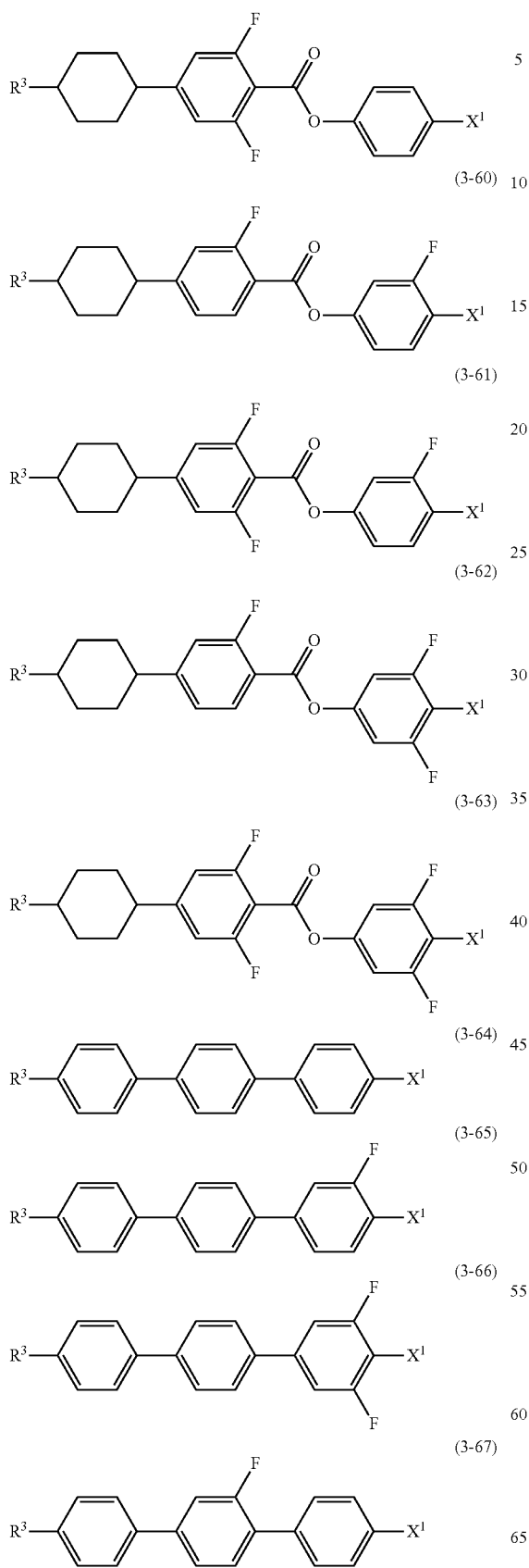
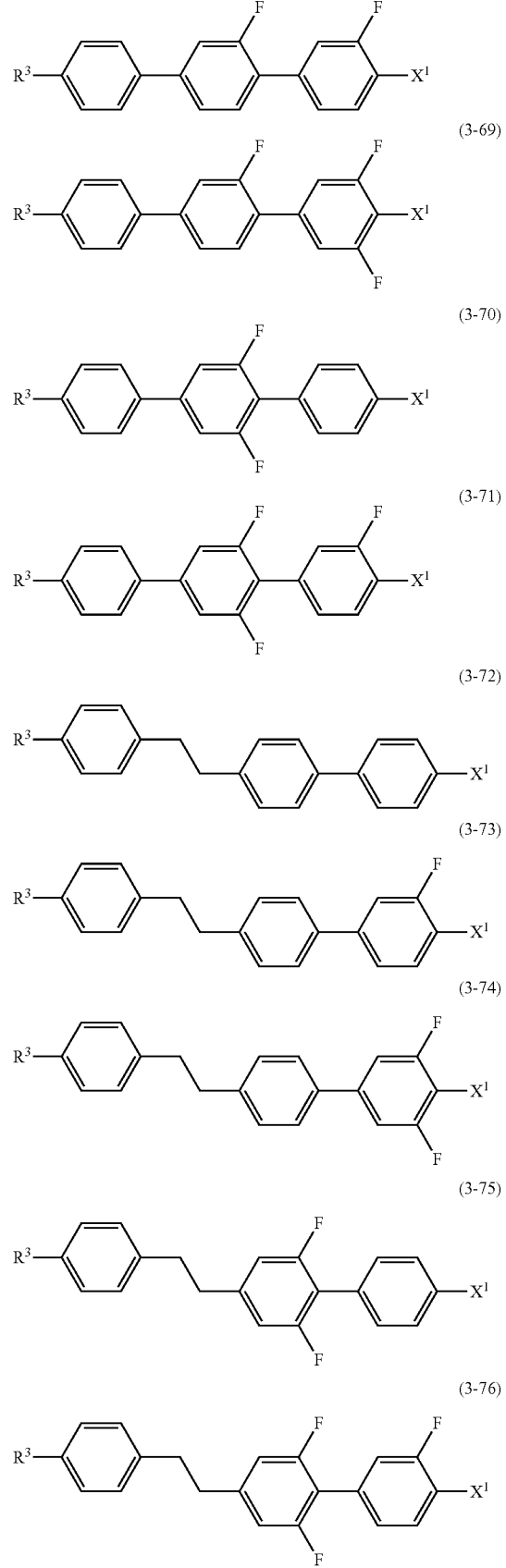

(3-77)
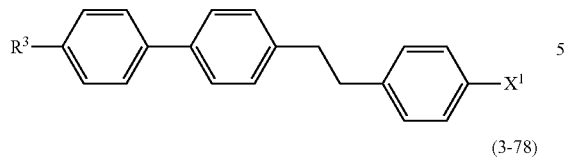
(3-78)
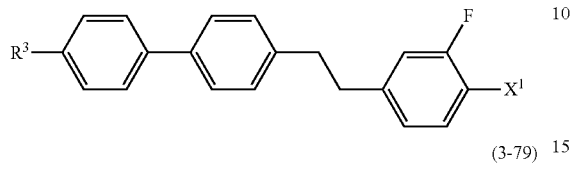
(3-79)
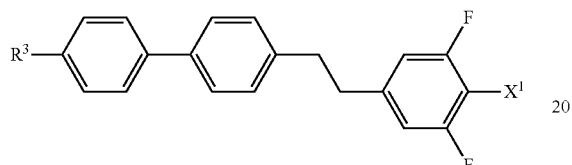
(3-80)
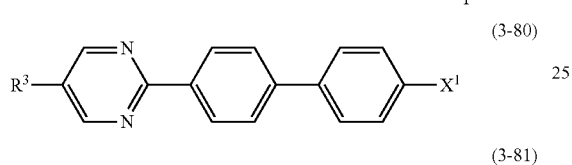
(3-81)
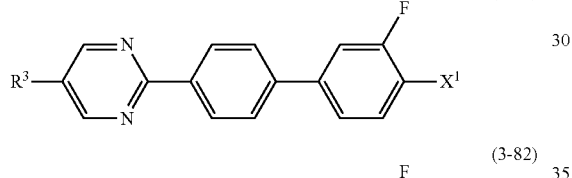
(3-82)
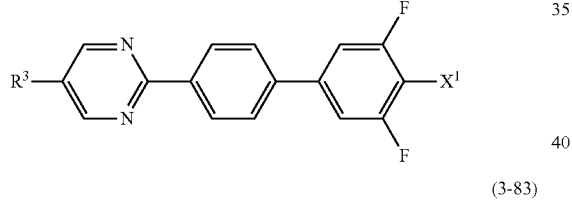
(3-83)
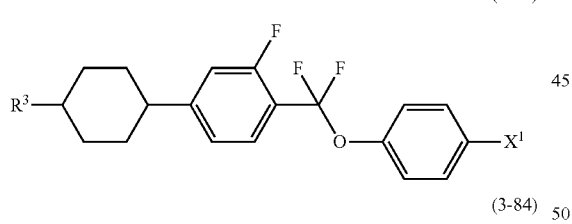
(3-84)
(3-85)
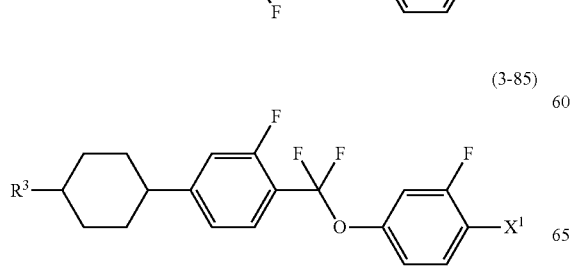
(3-86)
(3-87)
(3-88)
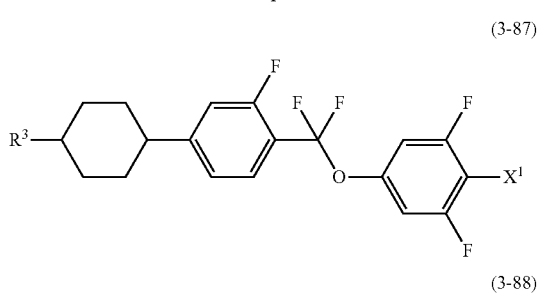
(3-89)
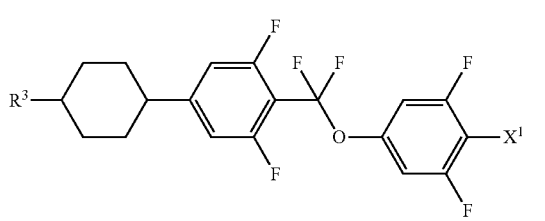
(3-90)
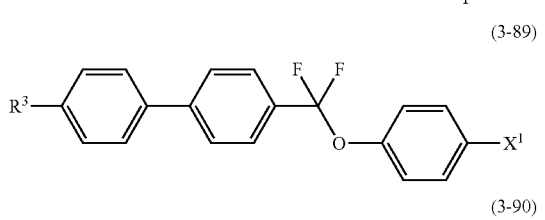
(3-91)
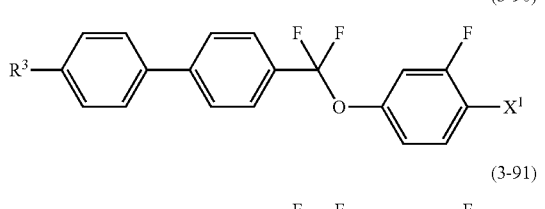
(3-92)
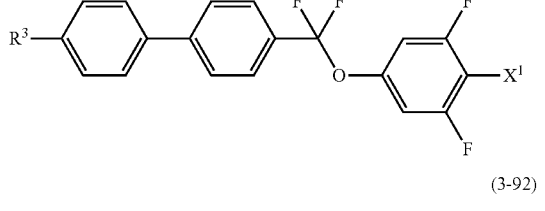
(3-93)
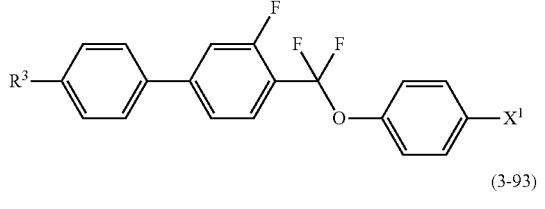

(3-94)
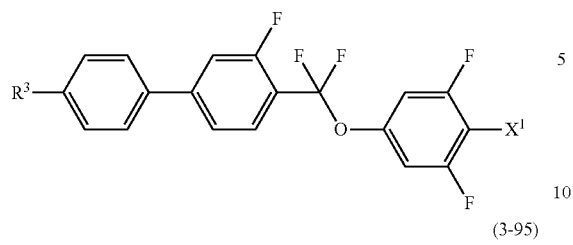
(3-95)
(3-96)
(3-97)
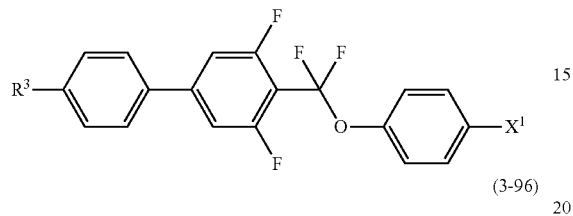
(3-98)
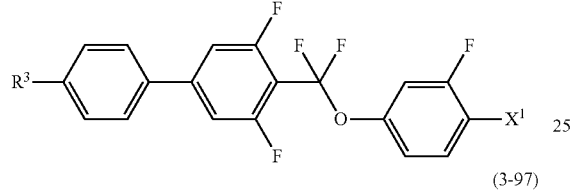
(3-99)
(3-100)
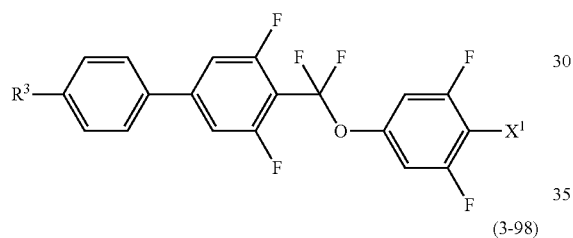
(3-101)
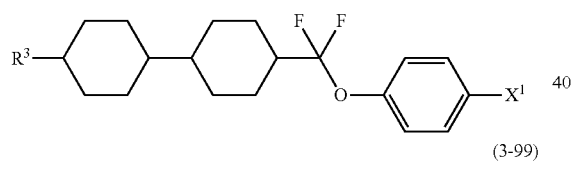
(3-102)
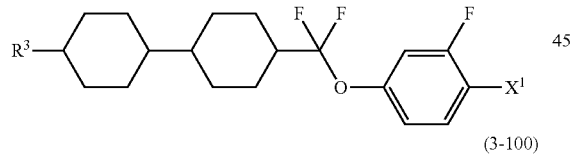
(3-103)
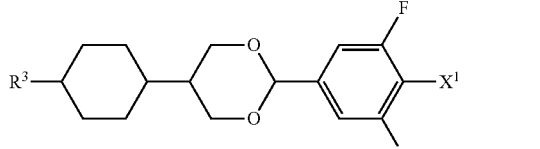
(3-104)
(3-105)
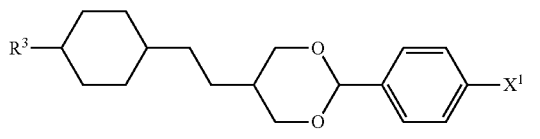
(3-106)
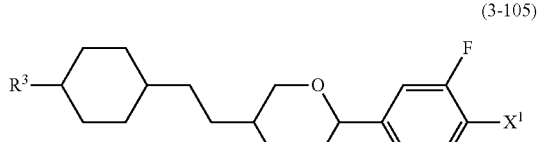
(3-107)
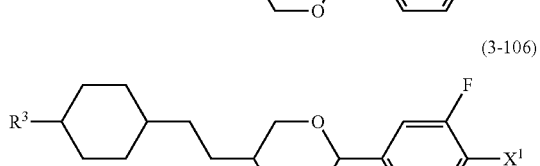
(3-108)
(3-109)
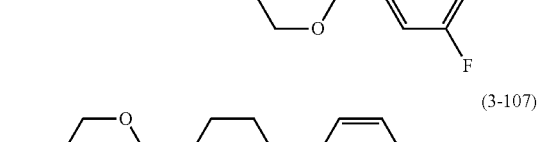
(3-110)
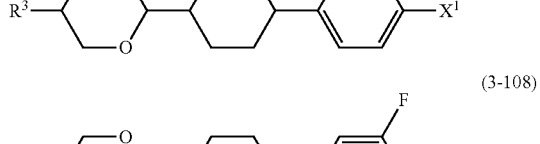
(3-111)
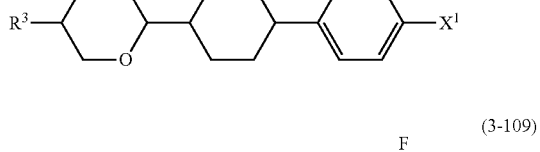

(3-112)
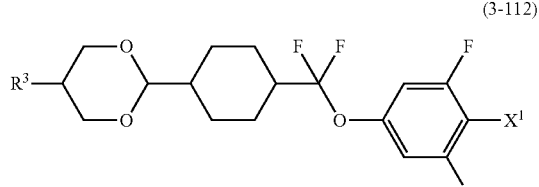
(3-113)
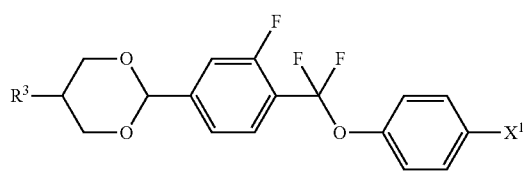
(3-114)
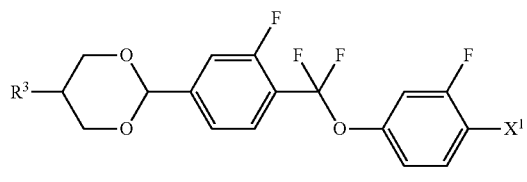
(3-115)
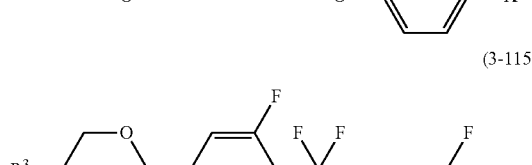
(3-116)
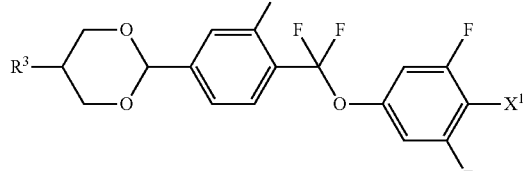
(3-117)
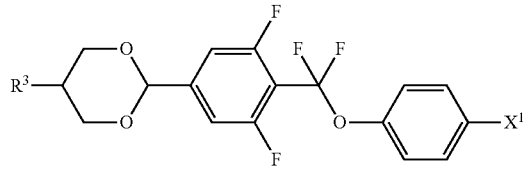
(3-118)
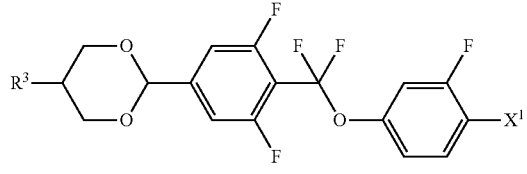
(4-1)
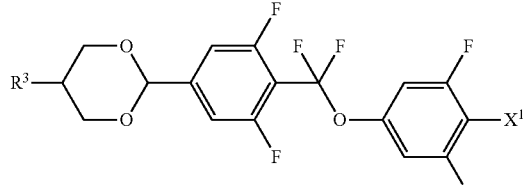
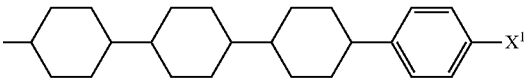
(4-2)
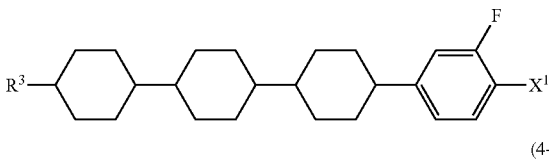
(4-3)
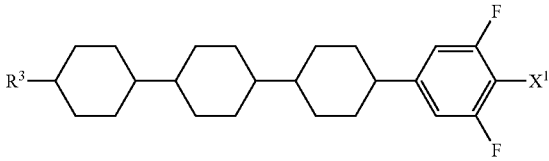
(4-4)
(4-5)
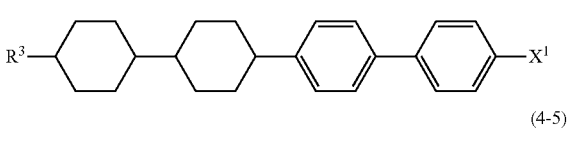
(4-6)
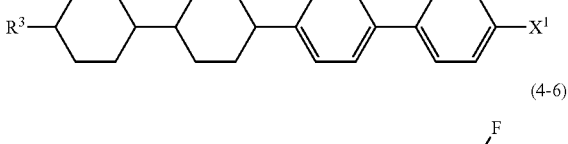
(4-7)
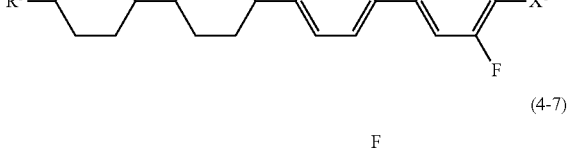
(4-8)
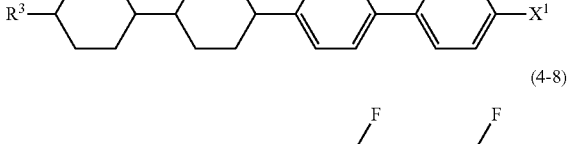
(4-9)
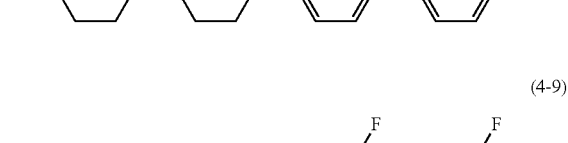
(4-10)
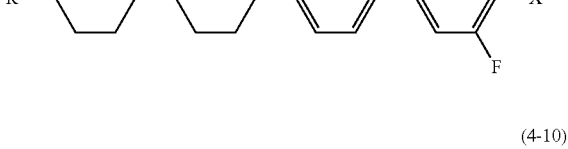

-continued
(4-11) 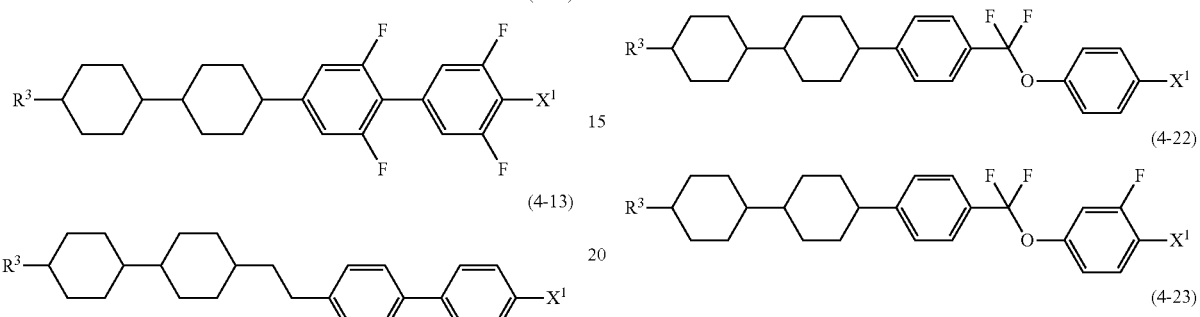
(4-12)
(4-13)
(4-14)
(4-15)
(4-16)
(4-17)
(4-18)
(4-19)
-continued
(4-20) 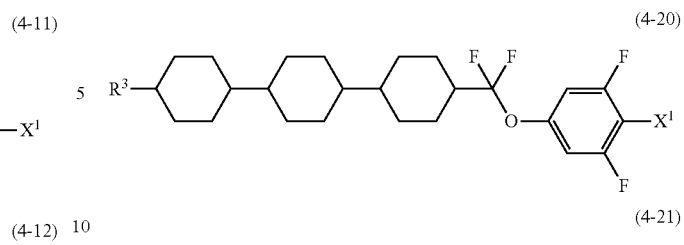
(4-21)
(4-22)
(4-23)
(4-24)
(4-25)
(4-26)
(4-27)
(4-28)

(4-29)
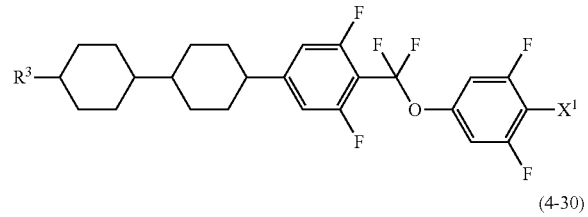
(4-30)
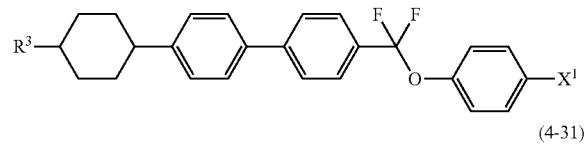
(4-31)
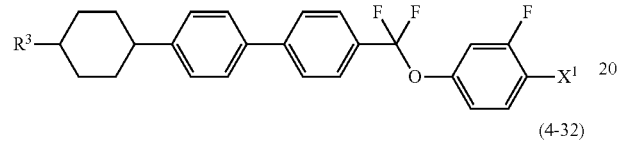
(4-32)
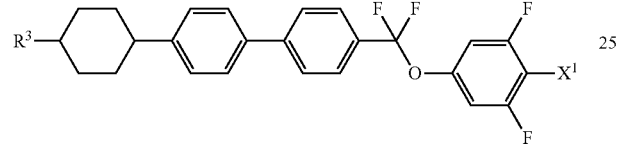
(4-33)
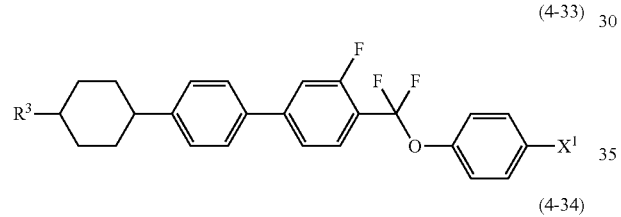
(4-34)
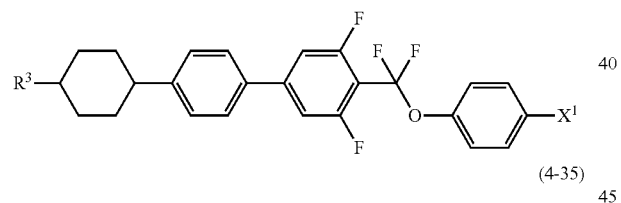
(4-35)
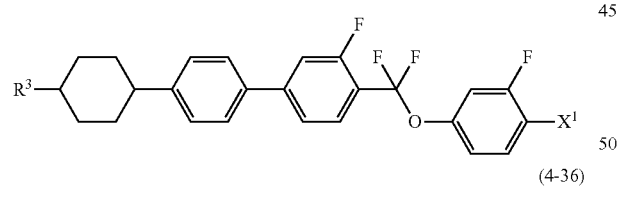
(4-36)
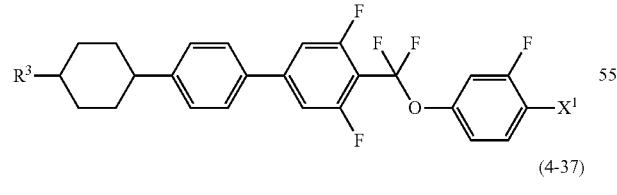
(4-37)
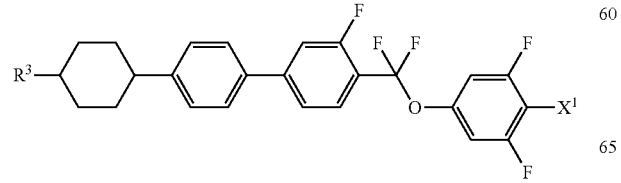
(4-38)
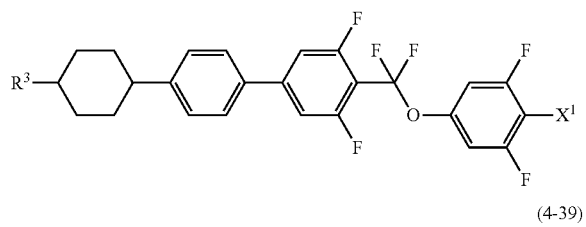
(4-39)
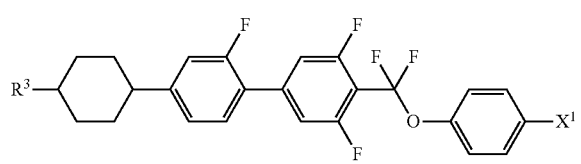
(4-40)
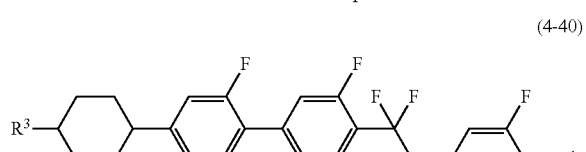
(4-41)
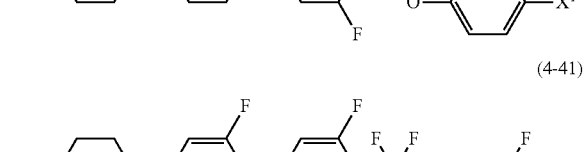
(4-42)
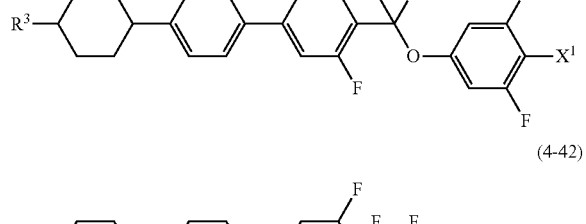
(4-43)
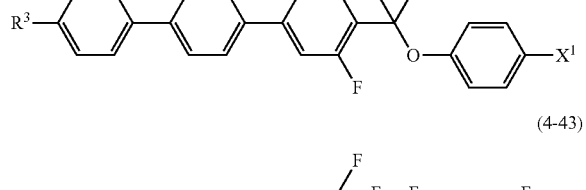
(4-44)
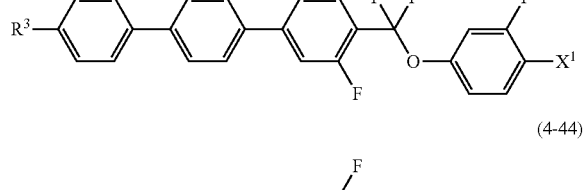
(4-45)
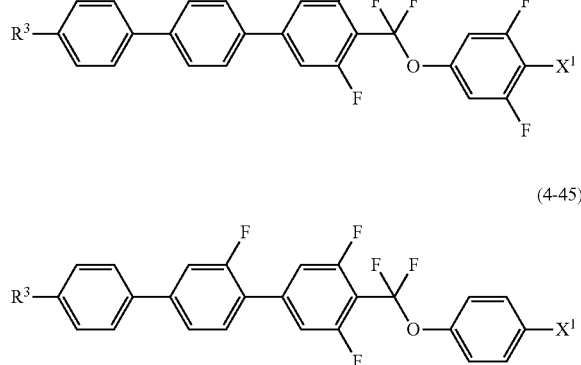

(4-46)
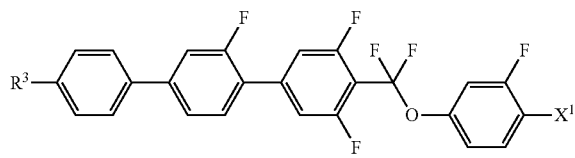

(4-47)
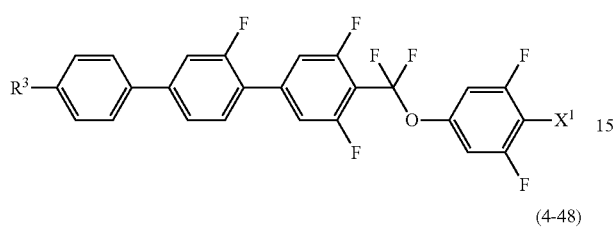

(4-48)

(4-49)
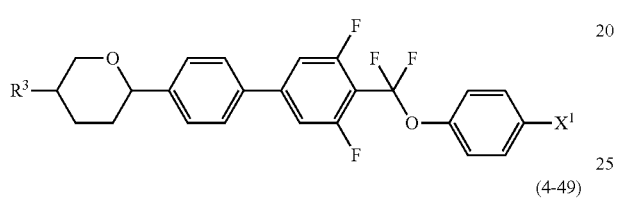

(4-50)
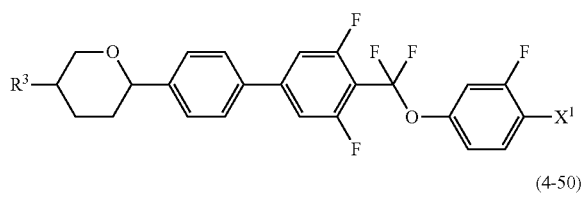

(4-51)
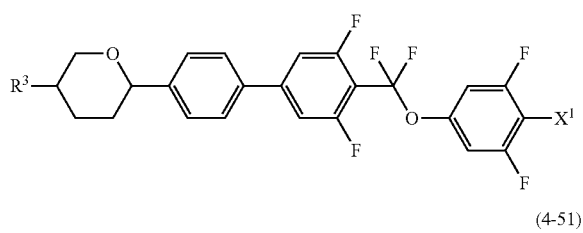

(4-52)
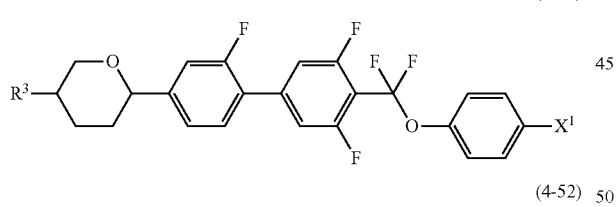

(4-53)
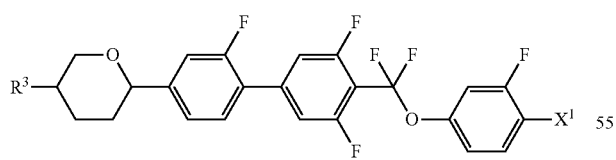

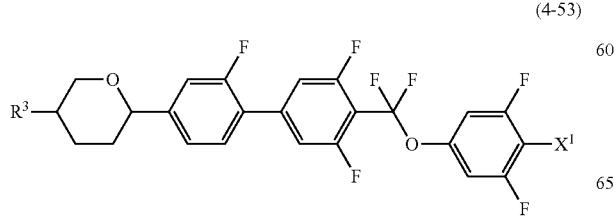

(4-54)
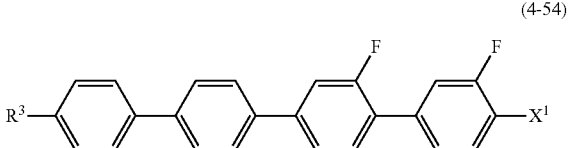

(4-55)
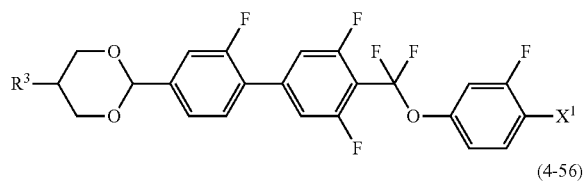

(4-56)
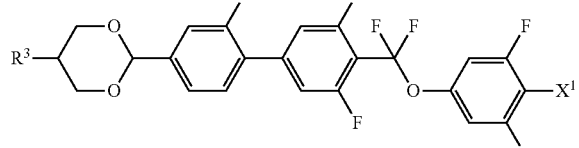

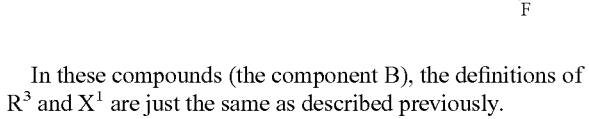

In these compounds (the component B), the definitions of $R^3$ and $X^1$ are just the same as described previously.

The component B is used for the preparation of a composition for use in modes of PS-IPS, PS-FFS, PSA-OCB and so forth, since the dielectric anisotropy is positive and the stability to heat, light or the like is quite excellent. The content of the component B is suitably in the range of 1% by weight to 99% by weight, preferably in the range of 10% by weight to 97% by weight, more preferably in the range of 40% by weight to 95% by weight, based on the total weight of the liquid crystal compounds. In this composition, the viscosity can be adjusted by further addition of the compounds (6) to (8) (the component E). It is desirable that the content of the component B should be 30% by weight or less based on the total weight of the liquid crystal compounds when the component B is added to a composition having negative dielectric anisotropy. The elastic constant of the composition can be adjusted and the voltage-transmittance curve of the device can be adjusted by the addition of the component B.

The component C is the compound (5) where the right-terminal group is —C≡N or —C≡C—C≡N. Desirable examples of the component C include the compounds (5-1) to (5-64).

(5-1)
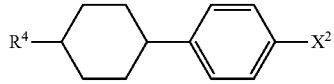

(5-2)
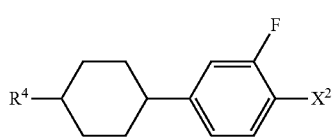

(5-3)
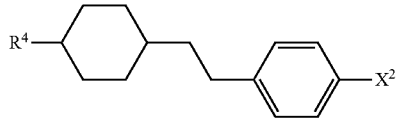

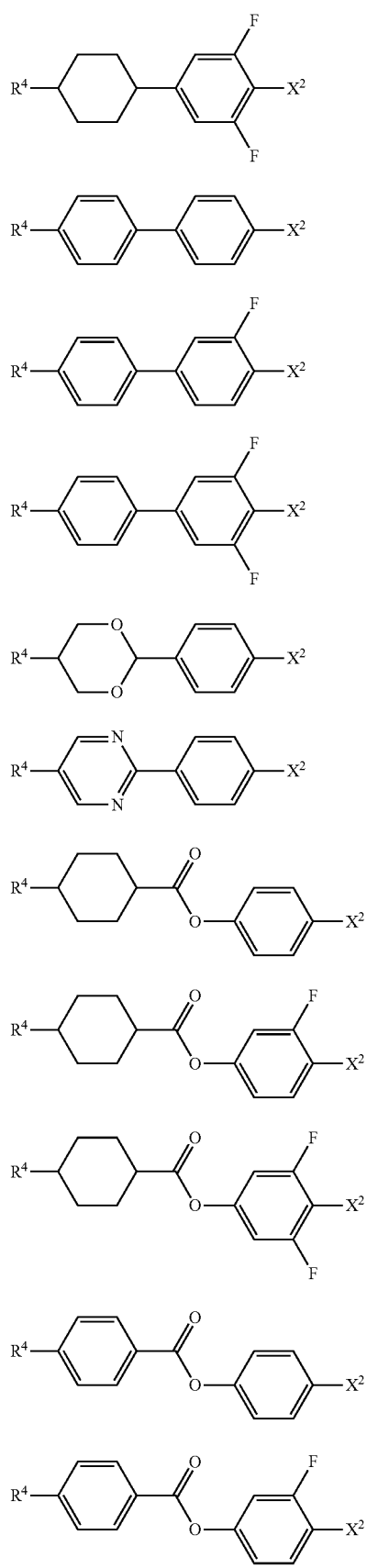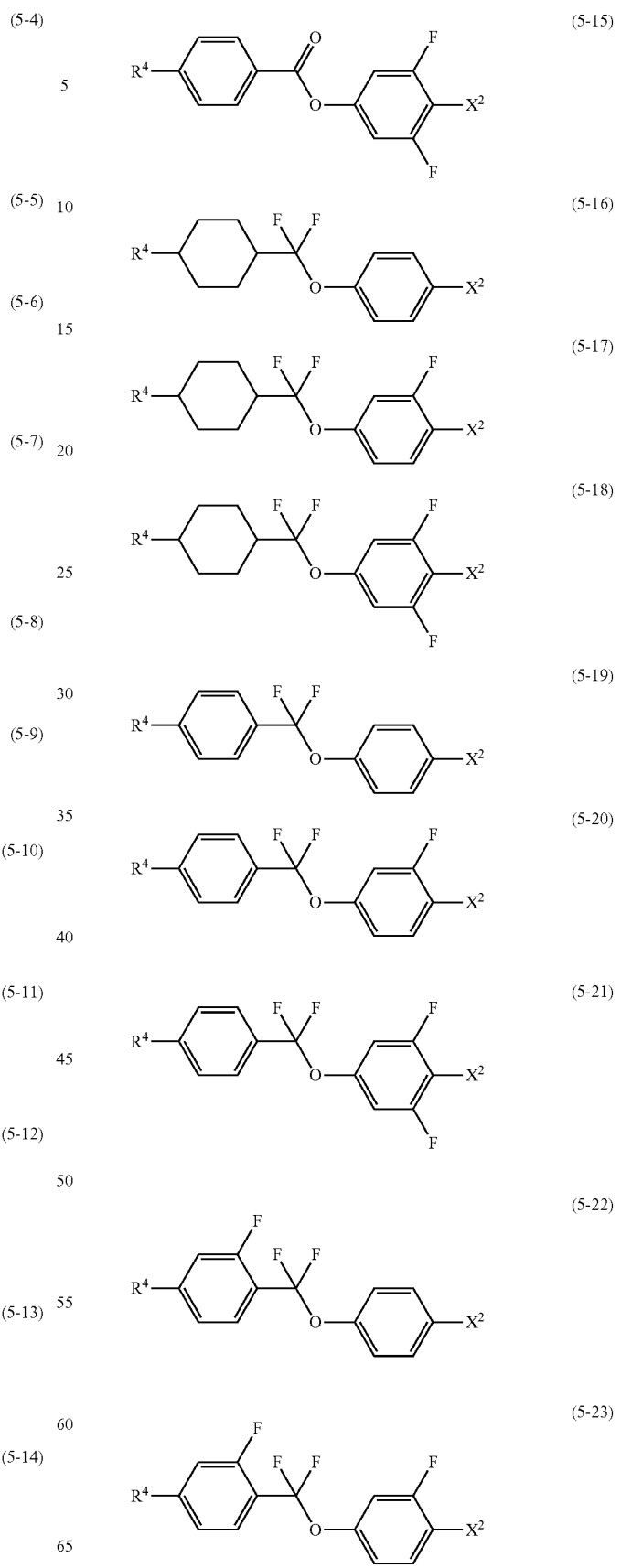

(5-24) 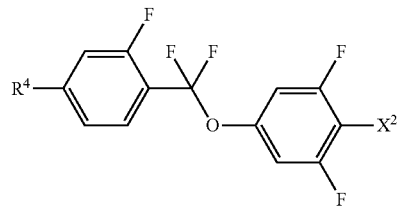
(5-25) 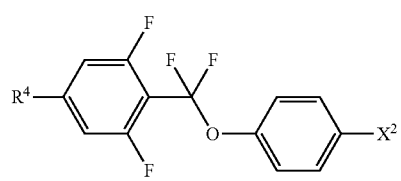
(5-26) 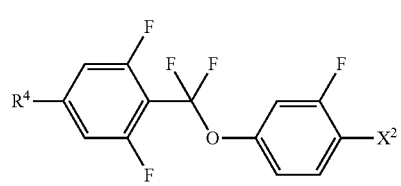
(5-27) 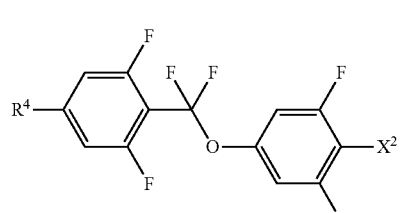
(5-28) 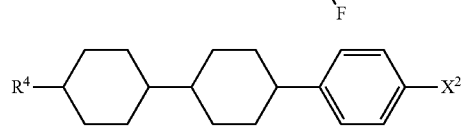
(5-29)
(5-30)
(5-31)
(5-32)
(5-33) 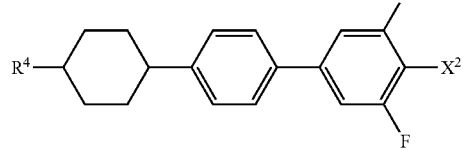
(5-34) 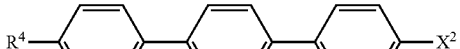
(5-35) 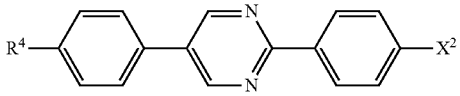
(5-36) 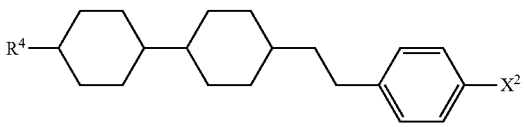
(5-37) 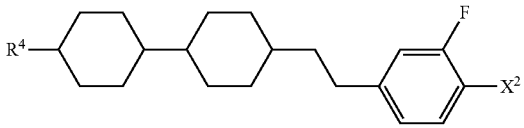
(5-38) 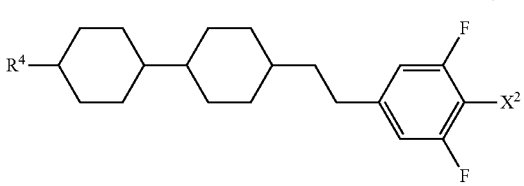
(5-39) 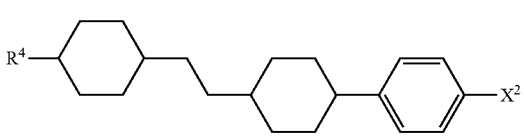
(5-40) 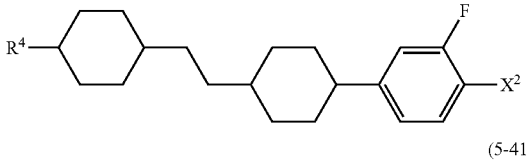
(5-41) 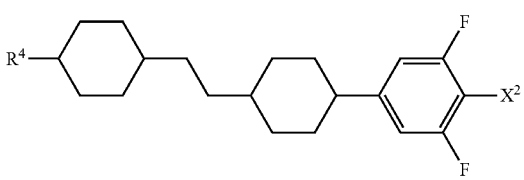
(5-42) 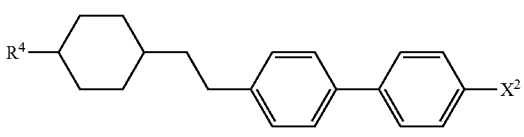
(5-43) 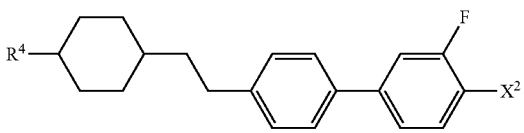

(5-44)
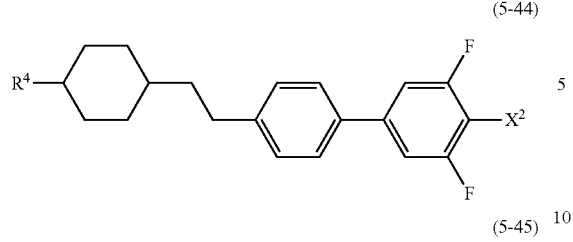
(5-45)
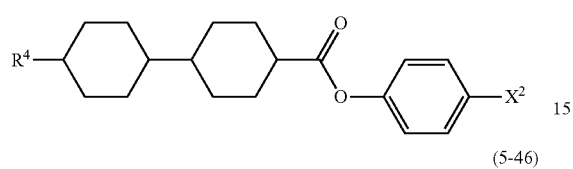
(5-46)
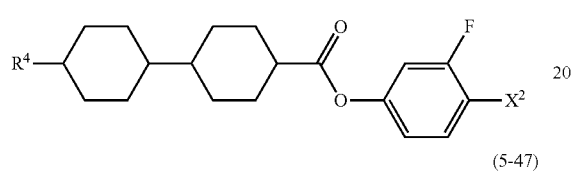
(5-47)
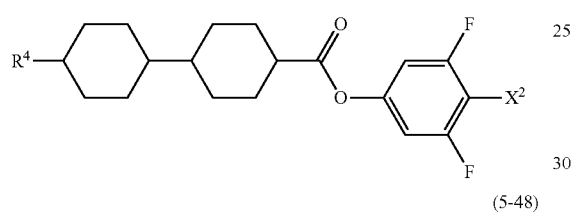
(5-48)
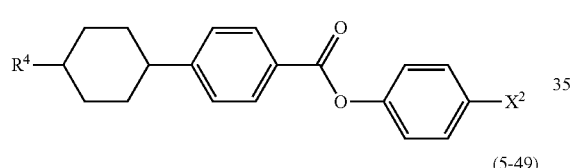
(5-49)
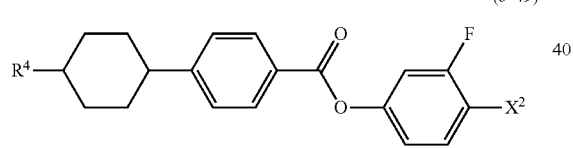
(5-50)
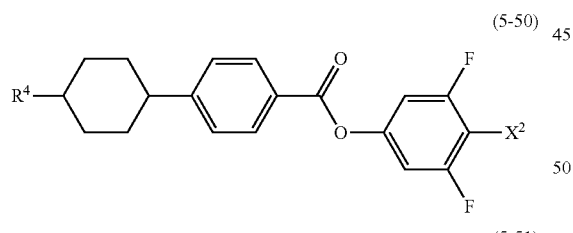
(5-51)
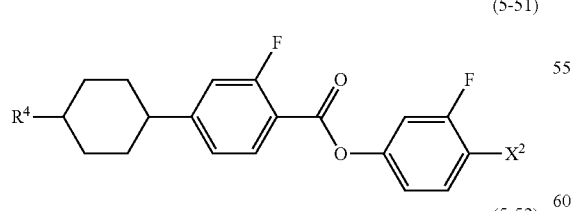
(5-52)
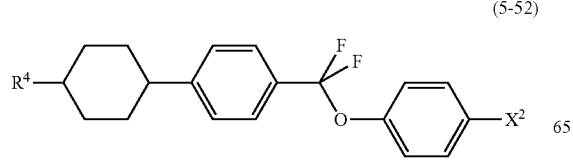
(5-53)
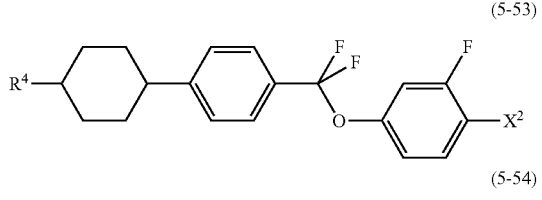
(5-54)
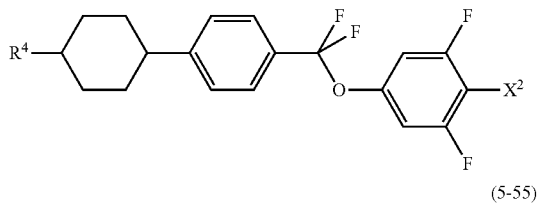
(5-55)
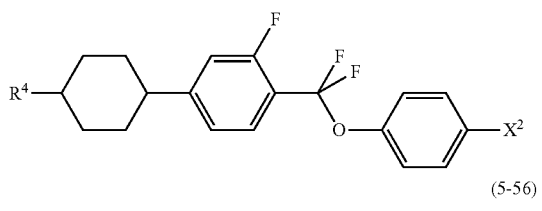
(5-56)
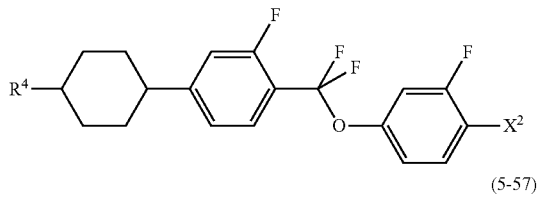
(5-57)
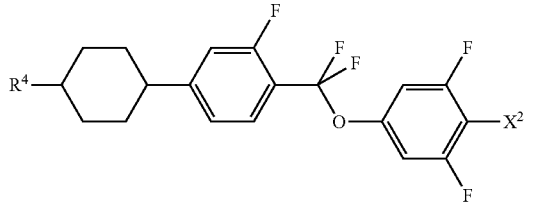
(5-58)
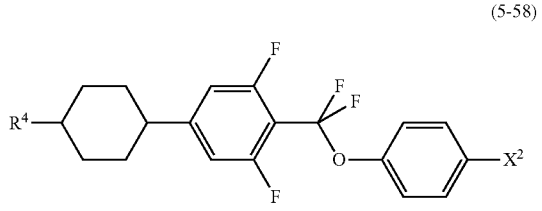
(5-59)
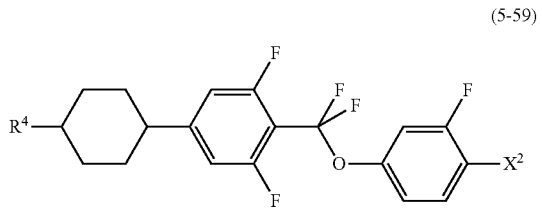
(5-60)
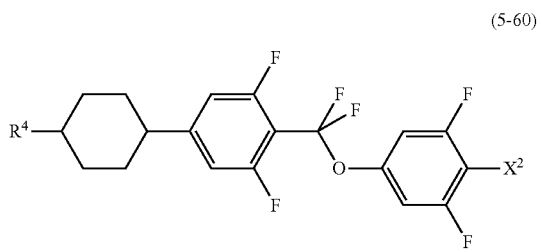

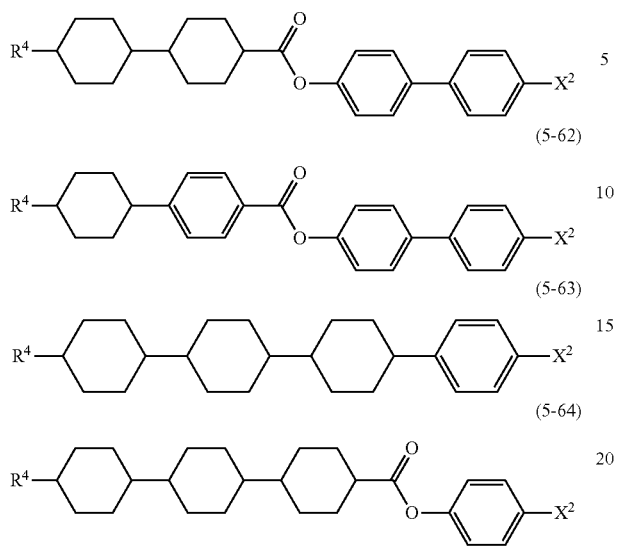

In these compounds (the component C), the definitions of $R^4$ and $X^2$ are just the same as described previously.

The component C is mainly used for the preparation of a composition for use in a PS-TN mode and so forth, since the dielectric anisotropy is positive and its value is large. The dielectric anisotropy of the composition can be increased by the addition of the component C. The component C has the effect of increasing the temperature range of a liquid crystal phase, adjusting the viscosity and adjusting the optical anisotropy. The component C is useful for adjusting the voltage-transmittance curve of the device.

The content of the component C is suitably in the range of 1% by weight to 99% by weight, preferably in the range of 10% by weight to 97% by weight, more preferably 40% by weight to 95% by weight, based on the total weight of the liquid crystal compounds, in the preparation of a composition for use in a mode of PS-TN or the like. In this composition, the temperature range of a liquid crystal phase, the viscosity, the optical anisotropy, the dielectric anisotropy or the like can be adjusted by the addition of the component E. It is desirable that the content of the component C should be 30% by weight or less based on the total weight of the liquid crystal compounds when the component C is added to a composition having negative dielectric anisotropy. The elastic constant of the composition can be adjusted and the voltage-transmittance curve of the device can be adjusted by the addition of the component C.

The component E is a compound where two terminal groups are alkyl or the like. Desirable examples of the component E include the compounds (6-1) to (6-11), the compounds (7-1) to (7-19) and the compounds (8-1) to (8-6).

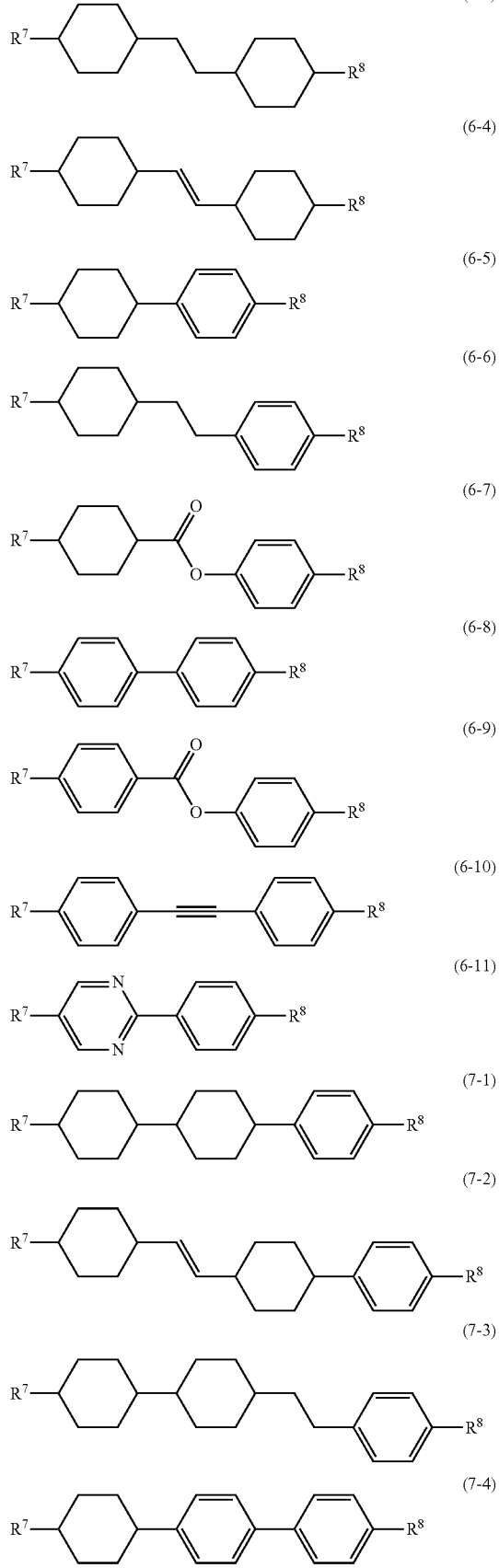

(7-5) 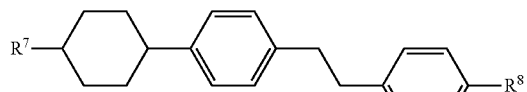
(7-6) 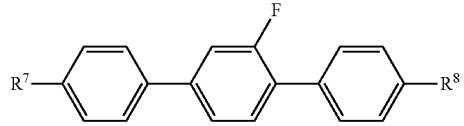
(7-7) 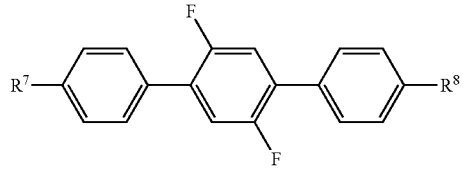
(7-8) 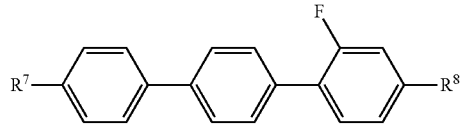
(7-9) 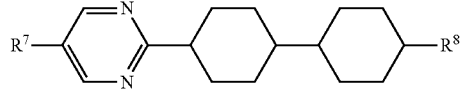
(7-10) 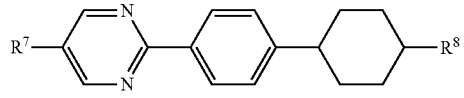
(7-11) 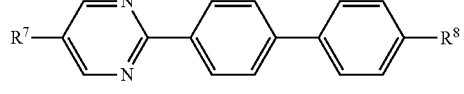
(7-12) 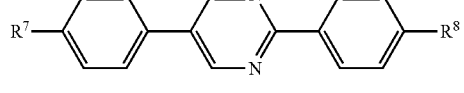
(7-13) 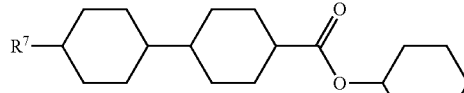
(7-14) 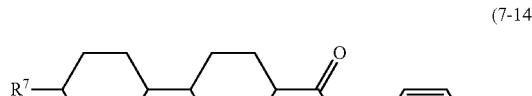
(7-15) 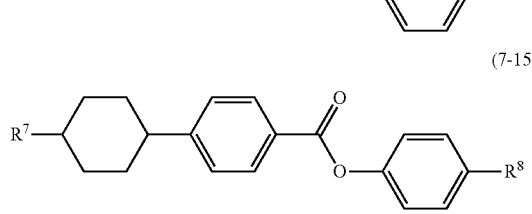
(7-16) 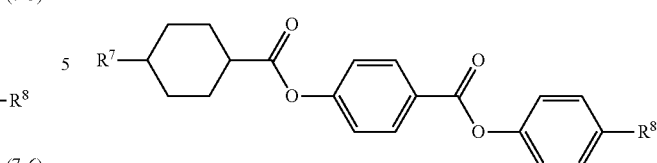
(7-17) 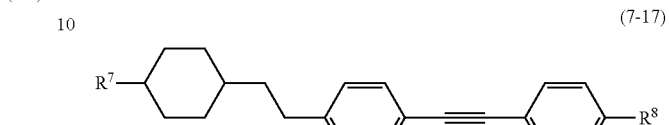
(7-18) 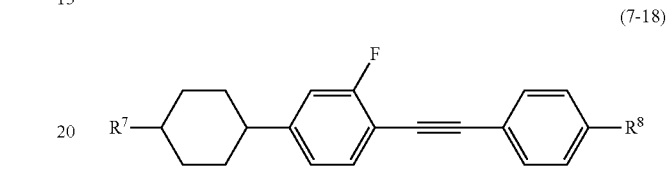
(7-19) 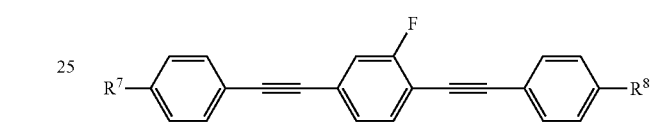
(8-1) 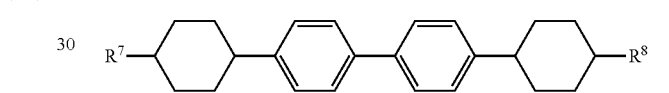
(8-2) 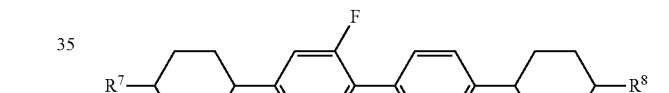
(8-3) 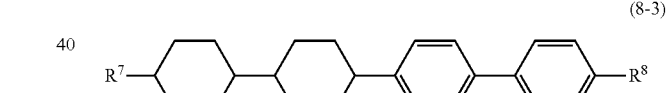
(8-4) 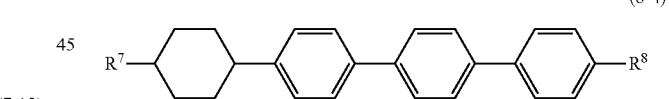
(8-5) 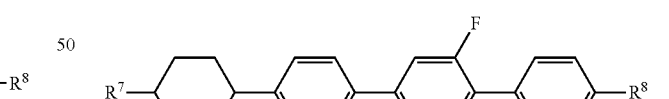
(8-6) 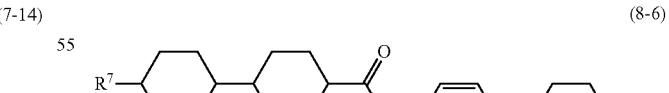
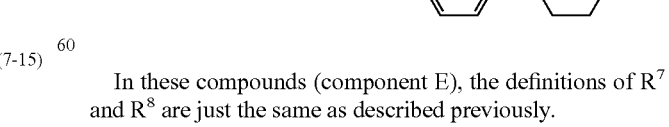
In these compounds (component E), the definitions of $R^7$ and $R^8$ are just the same as described previously.
The component E is close to neutral, since the absolute value of the dielectric anisotropy is small. The compound (6) is mainly effective in adjusting the viscosity or adjusting the optical anisotropy. The compounds (7) and (8) are effective in increasing the temperature range of a nematic phase that is caused by an increase in the maximum temperature, or adjusting the optical anisotropy.

As the content of the component E is increased, the viscosity of the composition decreases. However, the dielectric anisotropy decreases. Thus, it is desirable that the content should increase as long as the required value of the threshold voltage of a device is satisfied. Accordingly, the content of the component E is preferably 30% by weight or more, and more preferably 40% by weight or more based on the total weight of the liquid crystal compounds, in the preparation of a composition for use in modes of PS-IPS, PSA-VA and so forth.
[0114]

The preparation of the liquid crystal composition is carried out according to known methods such as the mutual dissolution of necessary components at higher temperatures than room temperature. An additive may be added to the composition depending on its intended use. Examples of the additive are an optically active compound, an antioxidant, an ultraviolet light absorber, a light stabilizer, a thermal stabilizer, an antifoaming agent and so forth. These kinds of additives are well known to a person skilled in the art, and have been described in the literature.

An optically active compound is effective in inducing a helical structure in liquid crystal molecules, giving a necessary twist angle and thus preventing a reverse twist. A helical pitch can be adjusted by the addition of the optically active compound. Two or more optically active compounds may be added for the purpose of adjusting the temperature dependence of the helical pitch. Desirable examples of the optically active compound include the following compounds (Op-1) to (Op-18). In the compound (Op-18), the ring J is 1,4-cyclohexylene or 1,4-phenylene, and $R^{24}$ is alkyl having 1 to 10 carbons.

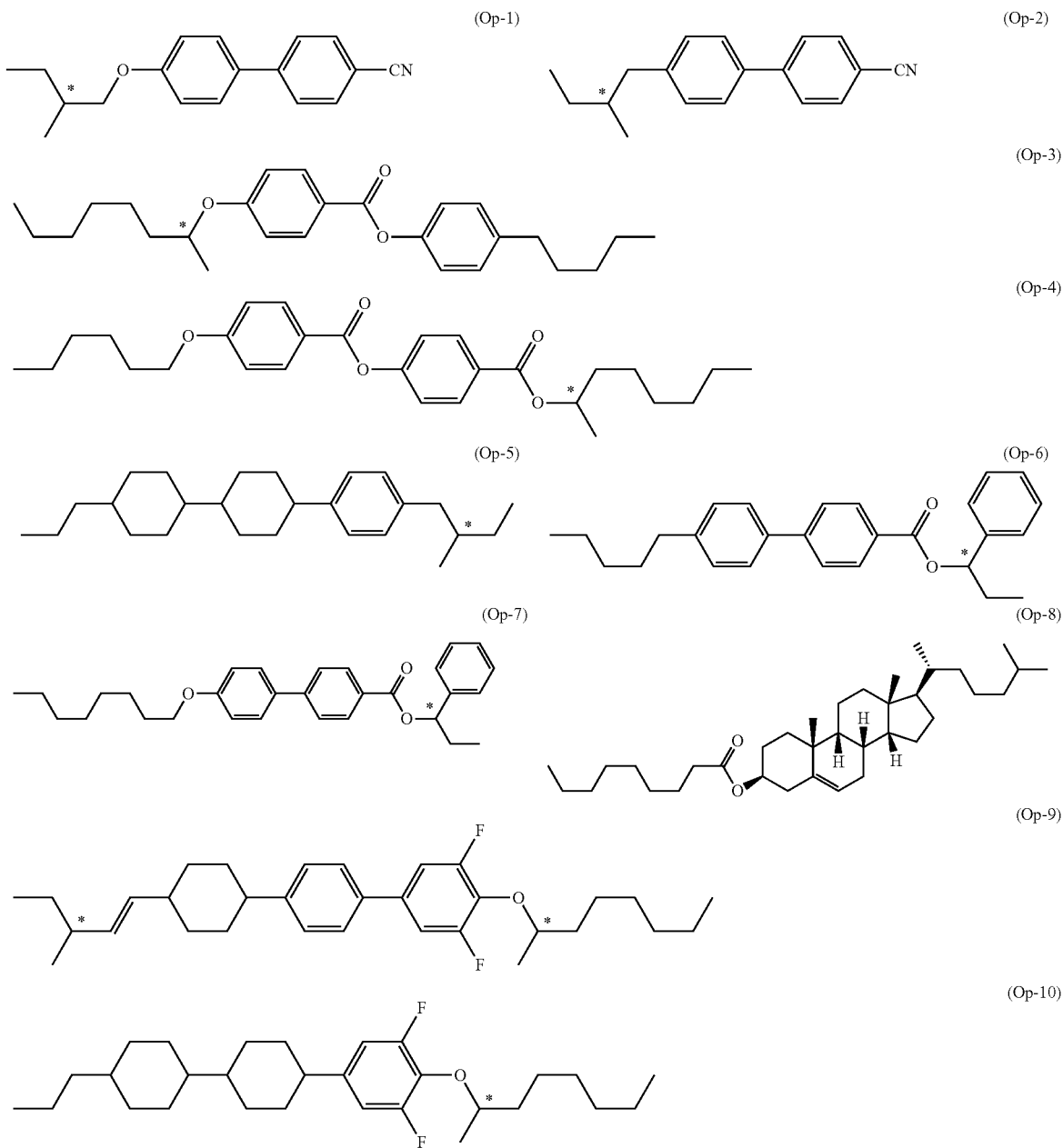

-continued

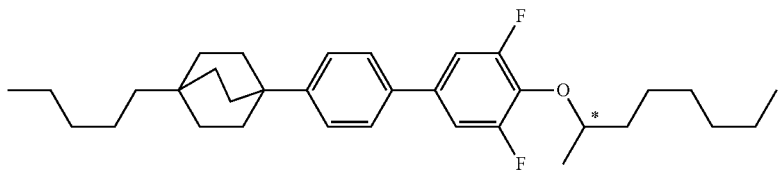
(Op-11)

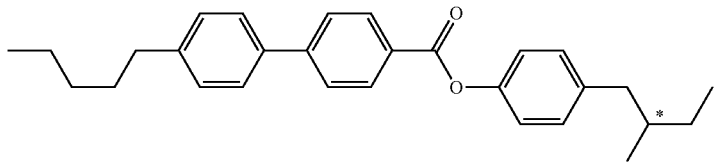
(Op-12)

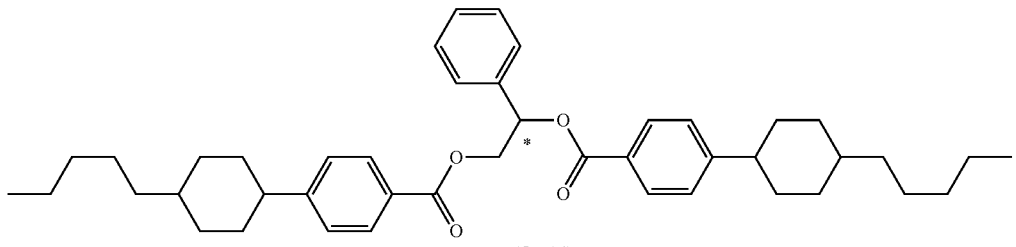
(Op-13)

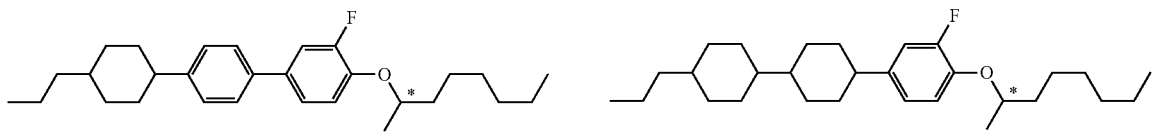

(Op-14) (Op-15)

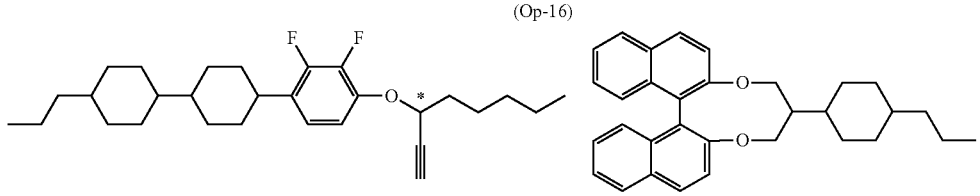

(Op-16) (Op-17)

(Op-18)

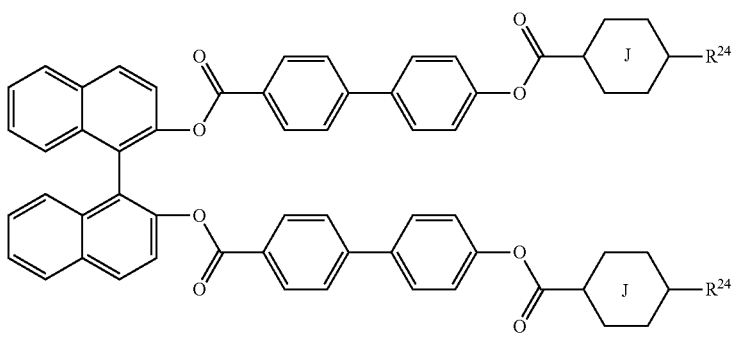

An antioxidant is effective in maintaining a large voltage holding ratio. Desirable examples of the antioxidant include the compounds (AO-1) and (AO-2) described below; Irganox 415, Irganox 565, Irganox 1010, Irganox 1035, Irganox 3114 and Irganox 1098 (trade name: BASF). An ultraviolet light absorber is effective for preventing a decrease in the maximum temperature. Desirable examples of the ultraviolet light absorber include a benzophenone derivative, a benzoate derivative and a triazole derivative. Specific examples include the compounds (AO-3) and (AO-4) described below; Tinuvin 329, Tinuvin P, Tinuvin 326, Tinuvin 234, Tinuvin 213, Tinuvin 400, Tinuvin 328 and Tinuvin 99-2 (trade name: BASF); and 1,4-diazabicyclo[2.2.2]octane (DABCO).

A light stabilizer such as an amine with steric hindrance is desirable for maintaining a large voltage holding ratio. Desirable examples of the light stabilizer include the compounds (AO-5) and (AO-6) described below; Tinuvin 144, Tinuvin 765 and Tinuvin 770DF (trade name: BASF). A thermal stabilizer is also effective in maintaining a large voltage holding ratio, and a desirable example includes Irgafos 168 (trade name: BASF). An antifoaming agent is effective in preventing foam formation. Desirable examples of the antifoaming agent include dimethyl silicone oil and methyl phenyl silicone oil.

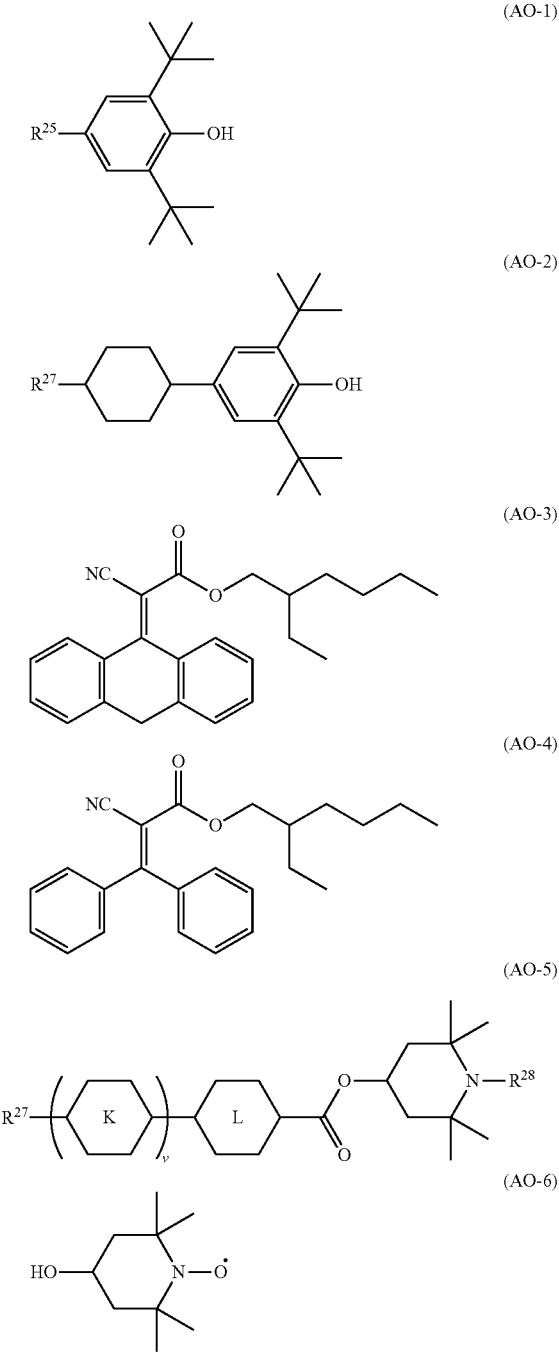

In the compound (AO-1), $R^{25}$ is alkyl having 1 to 20 carbons, alkoxy having 1 to 20 carbons, —COOR$^{26}$ or —CH$_2$CH$_2$COOR$^{26}$; and R$^{26}$ is alkyl having 1 to 20 carbons. In the compounds (AO-2) and (AO-5), $R^{27}$ is alkyl having 1 to 20 carbons. In the compound (AO-5), the ring K and the ring L are independently 1,4-cyclohexylene or 1,4-phenylene; v is 0, 1 or 2; and $R^{28}$ is hydrogen, methyl or O. (oxygen radical).

4. Polymerization

The compound (1) has a suitable polymerization reactivity, a high conversion yield and a high solubility in a liquid crystal composition. A liquid crystal composition including a polymer is formed by the polymerization of a liquid crystal composition including the compound (1) and liquid crystal compounds. This is because the compound (1) gives the polymer in the liquid crystal composition by the polymerization. The polymer is effective in inducing pretilt in liquid crystal molecules. It is desirable that the polymerization is carried out at a temperature in which the liquid crystal composition exhibits a liquid crystal phase. The polymerization proceeds on heating or on irradiation with light, for instance. A desirable reaction is the photopolymerization. It is desirable that the photopolymerization should be carried out at 100° C. or less to avoid the thermal polymerization that occurs simultaneously. The polymerization may be carried out under the conditions of an applied electric or magnetic field.

The polymerization reactivity and the conversion yield of the compound (1) can be adjusted. The compound (1) is suitable for radical polymerization. The compound (1) can smoothly be polymerized by the addition of a polymerization initiator. The amount of the compound (1) remained can be reduced by the optimization of the reaction temperature. Examples of a photo-radical polymerization initiator are TPO, 1173 and 4265 of Darocur series, and 184, 369, 500, 651, 784, 819, 907, 1300, 1700, 1800, 1850 and 2959 of Irgacure series, at Ciba Specialty Chemicals.

Additional examples of the photo-radical polymerization initiators are 4-methoxyphenyl-2,4-bis(trichloromethyl)triazine, 2-(4-butoxystyryl)-5-trichloromethyl-1,3,4-oxadiazole, 9-phenylacridine, 9,10-benzphenazine, a mixture of benzophenone/Michler's ketone, a mixture of hexaarylbiimidazole/mercaptobenzimidazole, 1-(4-isopropylphenyl)-2-hydroxy-2-methylpropan-1-one, benzyldimethylketal, 2-methyl-1-[4-(methylthio)phenyl]-2-morphorinopropan-1-one, a mixture of 2,4-diethylxanthone/methyl p-dimethylaminobenzoate and a mixture of benzophenone/methyltriethanolamine.

The polymerization can be carried out by irradiation with ultraviolet light under the conditions of an applied electric field, after a photo-radical polymerization initiator has been added to a liquid crystal composition. However, the unreacted polymerization initiator or degradation products of the polymerization initiator may cause a poor display such as image burn-in to the device. The photopolymerization may be carried out without the polymerization initiator to avoid it. A desirable wavelength of irradiation light is in the range of 150 nm to 500 nm. A more desirable wavelength is in the range of 250 nm to 450 nm, and the most desirable wavelength is in the range of 300 nm to 400 nm.

5. Liquid Crystal Display Devices

The effect of a polymer in a liquid crystal display device is interpreted as follows: A liquid crystal composition is a mixture of liquid crystal compounds, a polymerizable compound and so forth. The liquid crystal molecules are aligned in the direction of an electric field by applying the electric field to the liquid crystal composition. The polymerizable compound is also aligned similarly according to this alignment. Under these conditions, the polymerizable compound is polymerized by irradiation of the liquid crystal composition with ultraviolet light, as a result of which the network of the polymer is formed in the liquid crystal composition. The liquid crystal molecules are stabilized in conditions of alignment in the direction of the electric field by the effect of the network. The effect is maintained even when the electric field is removed. The response time of the device is decreased accordingly.

It is desirable that the polymerization of the liquid crystal composition should be carried out in a display device. One example is as follows: A display device having two glass substrates equipped with transparent electrodes and alignment films is prepared. A liquid crystal composition in which the compound (1), a liquid crystal compound, an additive and so forth are components is prepared. The composition is poured into the display device. The compound (1) is polymerized by irradiation of the display device with ultraviolet light while an electric field is applied. The polymerization gives a liquid crystal composition including a polymer. A liquid crystal display device having a PSA mode can easily made by this method. Rubbing treatment for the alignment film may be eliminated in this method. Incidentally, a method in which liquid crystal molecules are stabilized without an electric field may be employed.

A liquid crystal display device having a PSA mode is made when the added amount of the polymerizable compound is in the range of 0.1% by weight to 2% by weight based on the total weight of the liquid crystal compounds. The device having a PSA mode can be driven by means of a driving mode such as an active matrix (AM) or a passive matrix (PM). This kind of device can be applied to any type of a reflection type, a transmission type and a semi-transmission type. A device having a polymer dispersed mode can also be made by increasing the added amount of the polymerizable compound.

EXAMPLES

The invention will be explained in more detail based on examples. The invention is not limited by these examples.

1. Examples of the Compound (1)

The compound (1) was prepared by the procedures described in Example 1 and so forth. Compounds prepared herein were identified by means of NMR analysis and so forth. The physical properties of the compounds were measured by the methods described below.

NMR Analysis

A model DRX-500 apparatus (made by Bruker BioSpin Corporation) was used for measurement. In the measurement of $^1$H-NMR, a sample was dissolved in a deuterated solvent such as $CDCl_3$, and measured under the conditions of room temperature, 500 MHz and the accumulation of 16 scans. Tetramethylsilane (TMS) was used as the internal standard. In the measurement of $^{19}$F-NMR, $CFCl_3$ was used as the internal standard, and the accumulation of 24 scans was performed. In the explanation of the nuclear magnetic resonance spectra, the symbols s, d, t, q, quin, sex, m and br stand for a singlet, a doublet, a triplet, a quartet, a quintet, a sextet, a multiplet and line-broadening, respectively.

HPLC Analysis

Model Prominence (LC-20AD; SPD-20A) made by Shimadzu Corporation was used for measurement. A column YMC-Pack ODS-A (length 150 mm, bore 4.6 mm, particle size 5 μm) made by YMC Co., Ltd. was used. Acetonitrile and water were suitably mixed and used as eluent. A UV detector, a RI detector, a Corona detector and so forth were suitably used as a detector. A wavelength for the UV detector was 254 nm. A sample was dissolved in acetonitrile to give a 0.1% by weight solution, and then 1 microliter of the solution was injected into the sample injector. Model C-R7Aplus made by Shimadzu Corporation was used as a recorder.

Ultraviolet and Visible Spectrophotometric Analysis

Model PharmaSpec UV-1700 made by Shimadzu Corporation was used for measurement. Wavelengths in the range of 190 nm to 700 nm were used for the detection. A sample was dissolved in acetonitrile, giving a 0.01 mmol/L solution, which was placed in a quartz cell (optical path length: 1 cm) and measured.

Sample for Measurement

A compound itself was used as a sample when the phase structure and the transition temperature (a clearing point, a melting point, a starting temperature of polymerization, and so forth) were measured. A mixture of the compound and mother liquid crystals was used as a sample when physical properties such as the maximum temperature of a nematic phase, viscosity, optical anisotropy and dielectric anisotropy were measured.

Measurement Method

Physical properties were measured according to the following methods. Most were methods described in the JEITA standards (JEITA-ED-2521B) which was deliberated and established by Japan Electronics and Information Technology Industries Association (abbreviated to JEITA), or the modified methods. No thin film transistor (TFT) was attached to a TN device used for measurement.

(1) Phase Structure

A sample was placed on a hot plate of a melting point apparatus (Hot Stage Model FP-52 made by Mettler Toledo International Enc.) equipped with a polarizing microscope, and the phase conditions and their changes were observed with the polarizing microscope while the sample was heated at the rate of 3° C. per minute, and the kinds of phases were specified.

(2) Transition Temperature (° C.)

A Perkin-Elmer differential scanning calorimeter, a Diamond DSC system or a X-DSC7000 high sensitivity differential scanning analyzer made by SII NanoTechnology Inc. was used for measurement. A sample was heated and then cooled at the rate of 3° C. per minute, and the starting point of an endothermic peak or an exothermic peak caused by the phase change of the sample was obtained by means of the extrapolation, and thus the transition temperature was determined. The transition temperature of a compound, from solid to a liquid crystal phase such as a smectic phase or a nematic phase, may be abbreviated to "the minimum temperature of a liquid crystal phase". The transition temperature of a compound from a liquid crystal phase to liquid may be abbreviated to "a clearing point". A melting point and a starting temperature of polymerization of a compound were also measured by use of this apparatus.

The symbol C stood for crystals. When the kinds of crystals were distinguishable, each was expressed as $C_1$ and $C_2$. The symbols S and N stood for a smectic phase and a nematic phase, respectively. When a smectic A phase, a smectic B phase, a smectic C phase or a smectic F was distinguishable in the smectic phases, it was expressed as $S_A$, $S_B$, $S_C$ or $S_F$, respectively. The symbol I stood for a liquid (isotropic). Transition temperatures were expressed as, for example, "C 50.0 N 100.0 Iso", which means that the transition temperature from crystals to a nematic phase was 50.0° C., and the transition temperature from the nematic phase to a liquid was 100.0° C.

(3) Maximum Temperature of a Nematic Phase ($T_{NI}$ or NI; ° C.)

A sample was placed on a hot plate in a melting point apparatus equipped with a polarizing microscope and was heated at the rate of 1° C. per minute. The temperature was measured when part of the sample began to change from a nematic phase to an isotropic liquid. A higher limit of the temperature range of a nematic phase may be abbreviated to "the maximum temperature." The symbol $T_{NI}$ means that the sample was a mixture of a compound and mother liquid crystals. The symbol NI means that the sample was a mixture of a compound and the component B, C or E.

(4) Minimum Temperature of a Nematic Phase ($T_C$; ° C.)

A sample having a nematic phase was kept in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., $T_C$ was expressed as ≤−20° C. A lower limit of the temperature range of a nematic phase may be abbreviated to "the minimum temperature."

(5) Viscosity (Bulk Viscosity; η; Measured at 20° C.; mPa·s)

An E-type viscometer was used for measurement.

(6) Optical Anisotropy (Refractive Index Anisotropy; Δn; Measured at 25° C.) in which a Polarizing Plate was Attached to the Ocular The measurement was carried out on an Abbe refractometer in which the ocular was equipped with a polarizing plate, using light at a wavelength of 589 nanometers. The surface of the main prism was rubbed in one direction, and then a sample was placed on the main prism. The refractive index (n∥) was measured when the direction of the polarized light was parallel to that of the rubbing. The refractive index (n⊥) was measured when the direction of polarized light was perpendicular to that of the rubbing. The value of the optical anisotropy (Δn) was calculated from the equation: Δn=n∥−n⊥.

(7) Specific Resistance (ρ; Measured at 25° C.; Ωcm)

A sample of 1.0 milliliter was poured into a vessel equipped with electrodes. DC voltage (10 V) was applied to the vessel, and the DC current was measured after 10 seconds. The specific resistance was calculated from the following equation: (specific resistance)=[(voltage)×(electric capacity of vessel)]/[(DC current)×(dielectric constant in vacuum)].

(8) Voltage Holding Ratio (VHR-1; Measured at 25° C.; %)

A TN device used for measurement had a polyimide-alignment film, and the distance between the two glass substrates (cell gap) was 5 micrometers. A sample was poured into the device, and then the device was sealed with an adhesive curable on irradiation with ultraviolet light. A pulse voltage (60 microseconds at 5 V) was applied to the device and the device was charged. A decreasing voltage was measured for 16.7 milliseconds with a high-speed voltmeter, and the area A between a voltage curve and a horizontal axis in a unit cycle was obtained. The area B was an area without the decrease. The voltage holding ratio was a percentage of the area A to the area B.

(9) Voltage Holding Ratio (VHR-2; Measured at 80° C.; %)

The voltage holding ratio was measured in the same way except for the replacement of 25° C. with 80° C. and the results were shown using the symbol VHR-2.

(10) Viscosity (Rotational Viscosity; γ1; Measured at 25° C.; mPa·s)

The measurement was performed according to the method described in M. Imai, et al., Molecular Crystals and Liquid Crystals, Vol. 259, 37 (1995). A sample was poured into a TN device in which the twist angle was 0 degrees and the distance between the two glass substrates (cell gap) was 5 micrometers. Voltages were applied stepwise to the device in the range of 16 to 19.5 volts, with increments of 0.5 volt. After a period of 0.2 second with no voltage, a voltage was applied repeatedly under the conditions of only one rectangular wave (rectangular pulse; 0.2 second) and of no voltage (2 seconds). The peak current and the peak time of the transient current generated by the applied voltage were measured. The value of rotational viscosity was obtained from the measured values and the calculating equation (8) on page 40 of the paper presented by M. Imai, et al. The value of dielectric anisotropy necessary for this calculation was obtained by use of the device that had been used for the measurement of rotational viscosity, according to the method described below.

(11) Dielectric Anisotropy (Δ∈; Measured at 25° C.)

A sample was poured into a TN device in which the distance between the two glass substrates (cell gap) was 9 micrometers and the twist angle was 80 degrees. Sine waves (10 V, 1 kHz) were applied to this device, and the dielectric constant (∈∥) in the major axis direction of liquid crystal molecules was measured after 2 seconds. Sine waves (0.5 V, 1 kHz) were applied to the device and the dielectric constant (∈⊥) in the minor axis direction of the liquid crystal molecules was measured after 2 seconds. The value of dielectric anisotropy was calculated from the equation: Δ∈=∈∥−∈⊥.

(12) Elastic Constant (K; Measured at 25° C.; pN)

A LCR meter Model HP 4284-A made by Yokokawa Hewlett-Packard, Ltd. was used for measurement. A sample was poured into a homogeneous device in which the distance between the two glass substrates (cell gap) was 20 micrometers. Electric charges of 0 volts to 20 volts were applied to the device, and the electrostatic capacity and the applied voltage were measured. The measured values of the electric capacity (C) and the applied voltage (V) were fitted to the equation (2.98) and the equation (2.101) in page 75 of "Ekisho Debaisu Handobukku" (Liquid Crystal Device Handbook, in English; The Nikkan Kogyo Shimbun, Ltd., Japan) and the values of $K_{11}$ and $K_{33}$ were obtained from the equation (2.99). Next, the value of $K_{22}$ was calculated from the equation (3.18) in page 171 and the values of $K_{11}$ and $K_{33}$ thus obtained. The elastic constant K was an average value of $K_{11}$, $K_{22}$ and $K_{33}$.

(13) Threshold Voltage (Vth; Measured at 25° C.; V)

An LCD evaluation system Model LCD-5100 made by Otsuka Electronics Co., Ltd. was used for measurement. The light source was a halogen lamp. A sample was poured into a TN device having a normally white mode, in which the distance between the two glass substrates (cell gap) was about 4.45/Δn (micrometers) and the twist angle was 80 degrees. Voltages applied to the device (32 Hz, rectangular waves) were increased stepwise from 0 V to 10 V, with increments of 0.02 V. During the increase, the device was irradiated with light in the perpendicular direction, and the amount of light passing through the device was measured. A voltage-transmittance curve was drawn, in which the maximum amount of light corresponded to 100% transmittance and the minimum amount of light corresponded to 0% transmittance. The threshold voltage was voltage at 90% transmittance.

(14) Response Time (τ; Measured at 25° C.; Millisecond)

An LCD evaluation system Model LCD-5100 made by Otsuka Electronics Co., Ltd. was used for measurement. The light source was a halogen lamp. The low-pass filter was set at 5 kHz. A sample was poured into a TN device having a normally white mode, in which the cell gap between the two glass substrates was 5.0 micrometers and the twist angle was 80 degrees. Rectangular waves (60 Hz, 5 V, 0.5 second) were applied to this device. The device was simultaneously irradiated with light in the perpendicular direction, and the amount of light passing through the device was measured. The maximum amount of light corresponded to 100% transmittance, and the minimum amount of light corresponded to 0% transmittance. Rise time (τr; millisecond) was the time required for a change from 90% to 10% transmittance. Fall time (τf; millisecond) was the time required for a change from 10% to 90% transmittance. The response time was the sum of the rise time and the fall time thus obtained.

Example 1

Preparation of the Compound No. 26

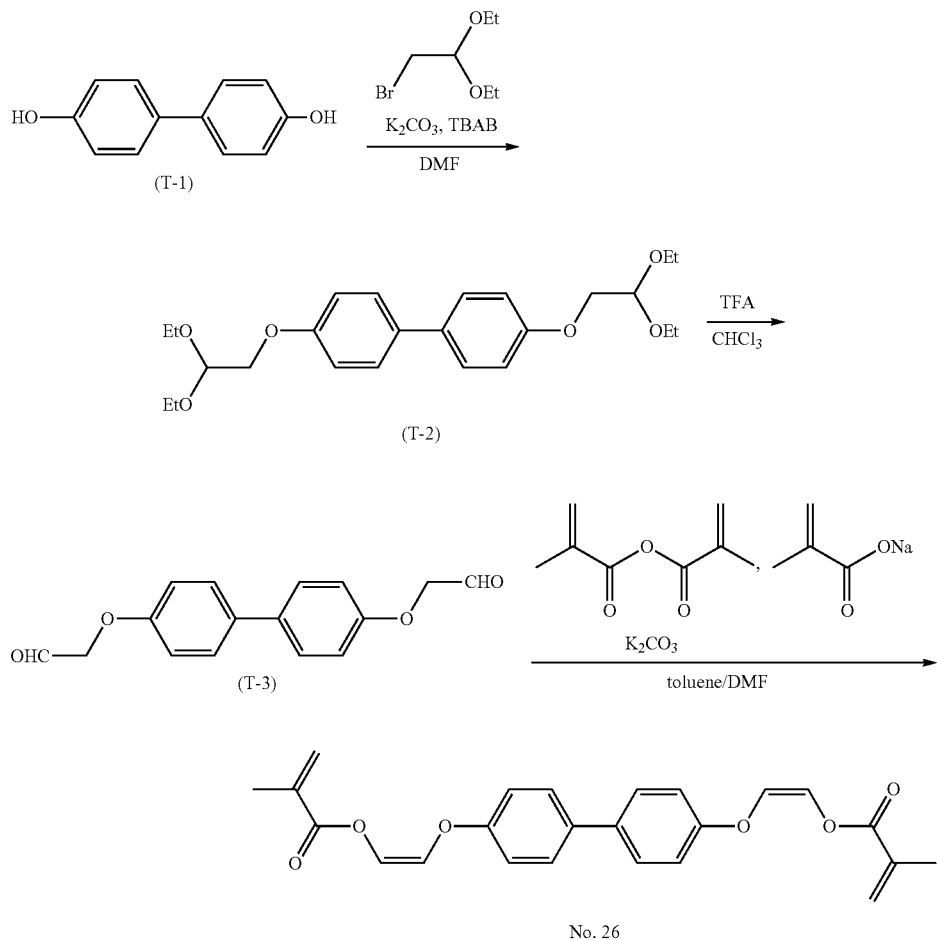

First Step:

(1,1'-Biphenyl)-4,4'-diol (T-1) (200 g, 1.07 mol) was dissolved in DMF (2000 ml), and tetrabutylammonium bromide (34.49 g, 0.107 mol), potassium carbonate (355 g, 2.57 mol) and 2-bromo-1,1-diethoxyethane (506 g, 2.57 mol) were added, and then the mixture was heated to reflux for 5 hours. After the reaction mixture had been allowed to cool to room temperature, it was poured into water (1000 ml), and the mixture was extracted with toluene (500 ml×3). The extract was washed with brine (500 ml×3), dried over anhydrous magnesium sulfate, and concentrated under reduced pressure. The residue was purified by silica gel chromatography (toluene:ethyl acetate=19:1, by volume), and then recrystallized from heptane to give the compound (T-2) (434 g, 1.07 mol, 100%).

Second Step:

The compound (T-2) (434 g, 1.07 mol) was dissolved in chloroform (4000 ml), and then trifluoroacetic acid (918 ml, 12.36 mol) was added dropwise at room temperature. After 16 hours, the reaction mixture was poured into water, and trifluoroacetic acid was treated by the addition of sodium bicarbonate. The mixture was extracted with ethyl acetate (500 ml×3). The extract was washed with brine (1000 ml), dried over anhydrous magnesium sulfate, and concentrated under reduced pressure to give the compound (T-3) (224 g, 0.828 mol, 81%).

Third Step:

The compound (T-3) (224 g, 0.828 mol) was dissolved in toluene (1000 ml), and methacrylic anhydride (1279 g, 8.3 mol), sodium methacrylate (17.93 g, 0.166 mol), potassium carbonate (573.5 g, 415 mol) and DMF (100 ml) were added, and then the mixture was heated to reflux for 21 hours. After the reaction mixture had been allowed to cool to room temperature, it was filtrated through Celite, and then concentrated under reduced pressure. The residue was purified by silica gel chromatography (heptane:ethyl acetate=6:1, by volume), and by recrystallization (heptane:ethyl acetate=6:1) to give the compound No. 26 (67.5 g, 0.166 mol, 20%).

$^1$H-NMR (CDCl$_3$; δ ppm): 7.50 (d, 4H), 7.12 (d, 4H), 6.95 (d, 2H), 6.29 (s, 2H), 6.18 (d, 2H), 5.70 (s, 2H) and 2.01 (s, 6H).

The physical properties of the compound No. 26 were as follows: Melting point, 98.2° C.; starting temperature of polymerization, 236° C.

Example 2

Preparation of the Compound No. 1

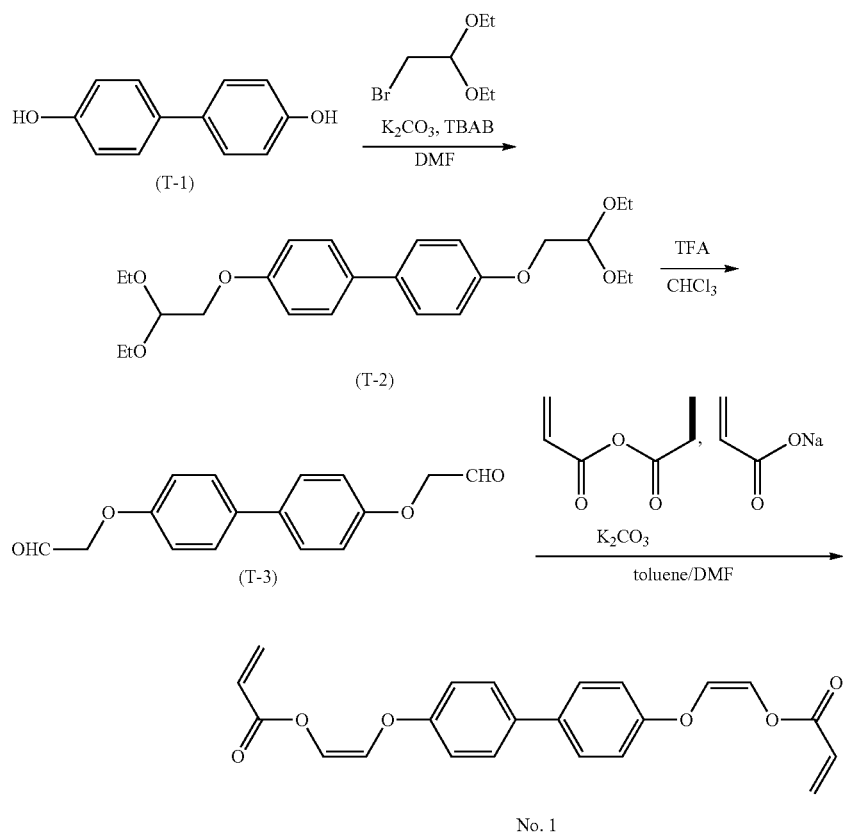

The compound No. 1 was obtained in the same manner as in Example 1, except that acrylic anhydride and sodium acrylate were used in the third step.

$^1$H-NMR (CDCl$_3$; δ ppm): 7.52 (d, 4H), 7.12 (d, 4H), 6.98 (d, 2H), 6.58 (dd, 2H), 6.26 (dd, 2H), 6.19 (d, 2H) and 5.97 (dd, 2H).

The physical properties of the compound No. 1 were as follows: Melting point, 121.1° C.

Example 3

The Compound No. 56

No. 56

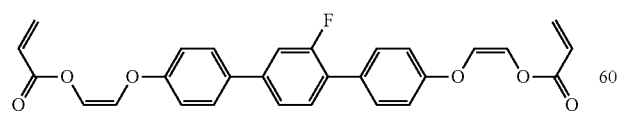

Melting point: 106.8° C.

$^1$H-NMR (CDCl$_3$; δ ppm): 7.59 (t, 4H), 7.47 (t, 1H), 7.40 (dd, 1H), 7.35 (dd, 1H), 7.15 (d, 4H), 6.99 (dd, 2H), 6.58 (dt, 2H), 6.26 (dd, 2H), 6.21 (t, 2H) and 5.98 (d, 2H).

Example 4
The Compound No. 94
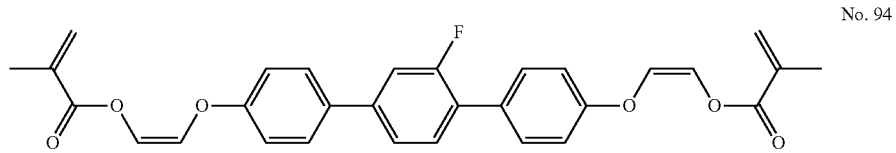 [SMILES: C=C(C)C(=O)O/C=C\Oc1ccc(-c2ccc(-c3ccc(O/C=C\OC(=O)C(=C)C)cc3)c(F)c2)cc1]
Phase transition temperature: C 117.9 N 123.3 I.
$^1$H-NMR (CDCl$_3$; δ ppm): 7.58 (t, 4H), 7.46 (t, 1H), 7.41 (dd, 1H), 7.35 (dd, 1H), 7.15 (d, 4H), 6.97 (dd, 2H), 6.30 (d, 2H), 6.21 (t, 2H), 5.72 (s, 2H) and 2.01 (s, 6H).
Example 5
The Compound No. 155
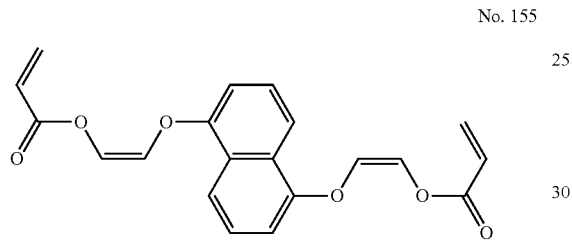
Melting point: 101.0° C.
$^1$H-NMR (CDCl$_3$; δ ppm): 8.05 (d, 2H), 7.47 (t, 2H), 7.12 (d, 2H), 7.08 (d, 2H), 6.63 (d, 1H), 6.59 (d, 1H), 6.33 (d, 2H), 6.29 (dd, 2H) and 6.00 (dd, 2H).
Example 6
The compounds No. 1 to No. 195 that will be described below can be prepared by synthetic methods similar to those described in Example 1.
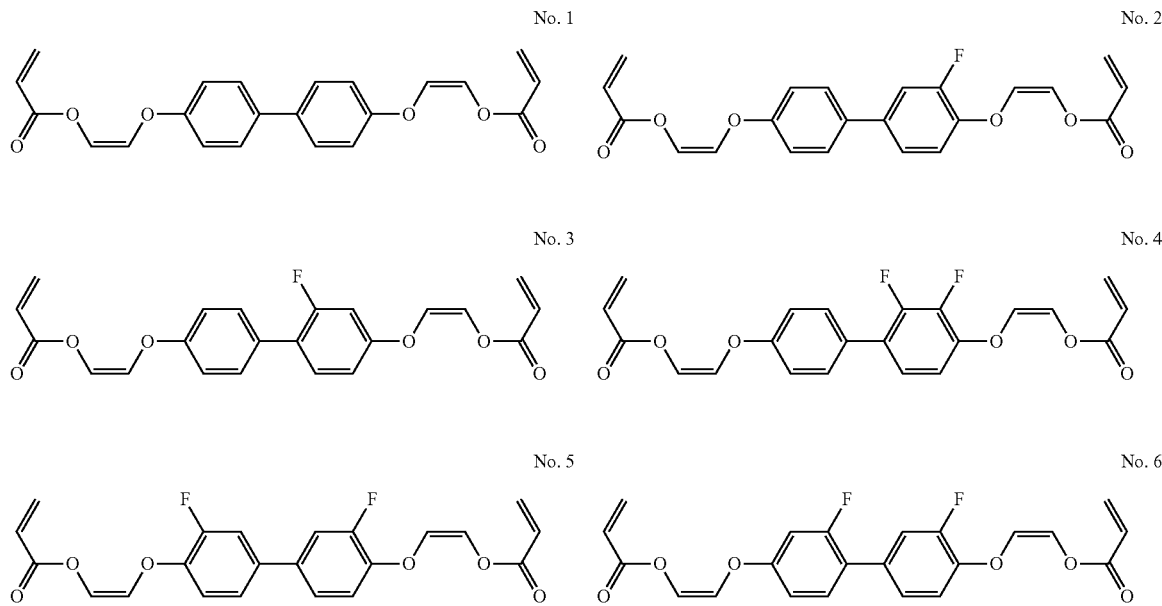

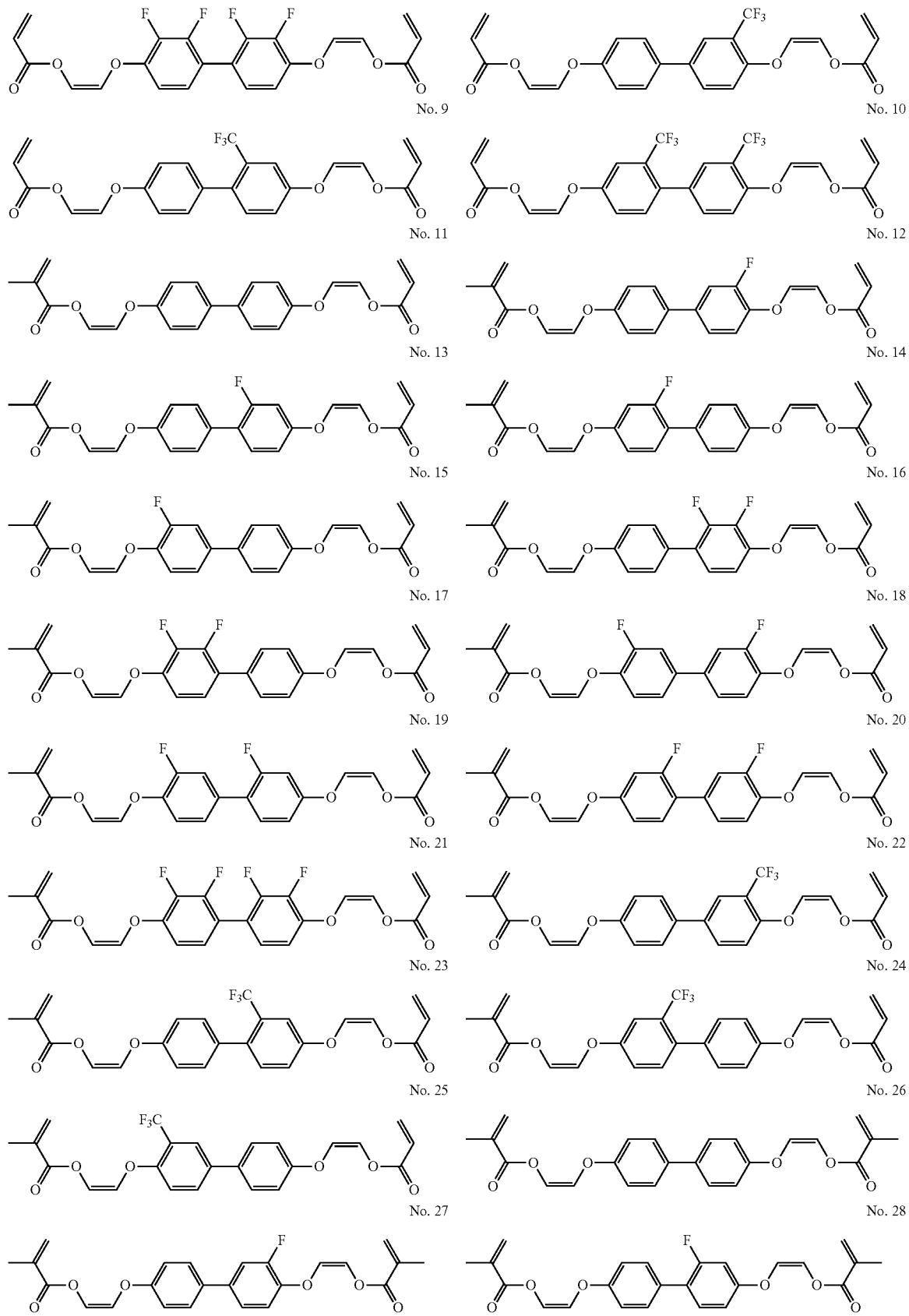

-continued
No. 29
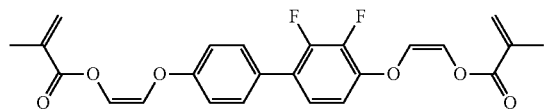
No. 30
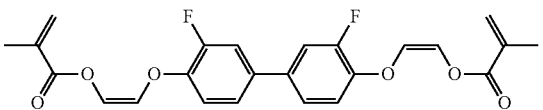
No. 31
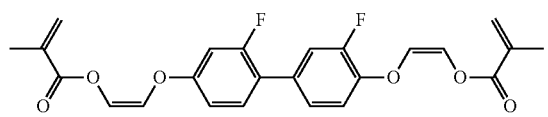
No. 32
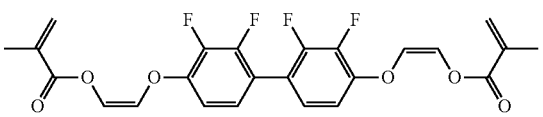
No. 33
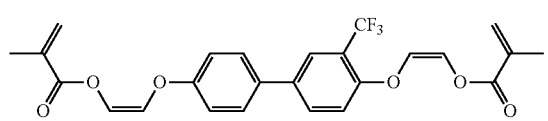
No. 34
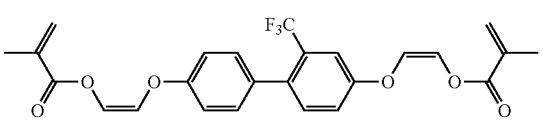
No. 35
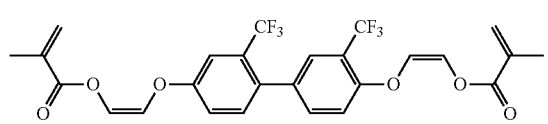
No. 36
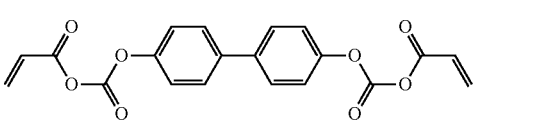
No. 37
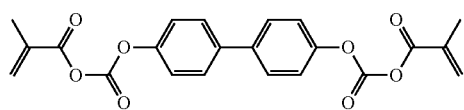
No. 38
No. 39
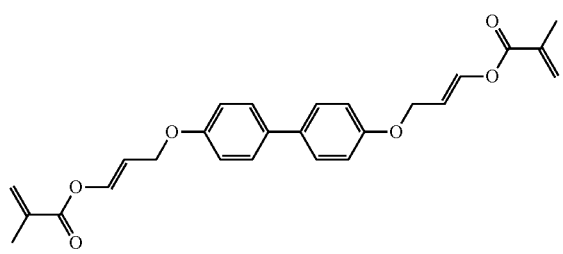
No. 40
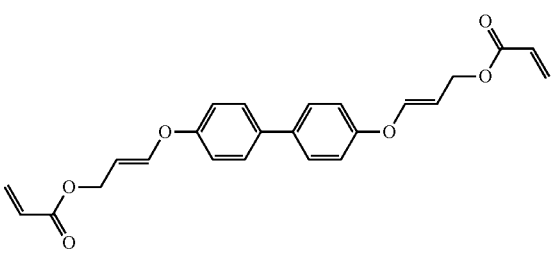
No. 41
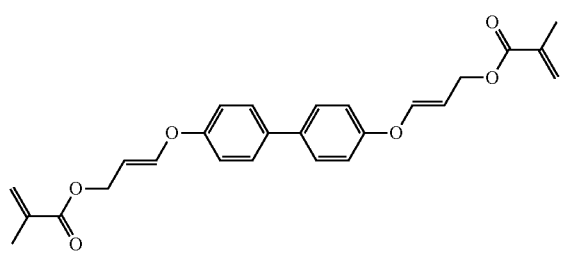
No. 42
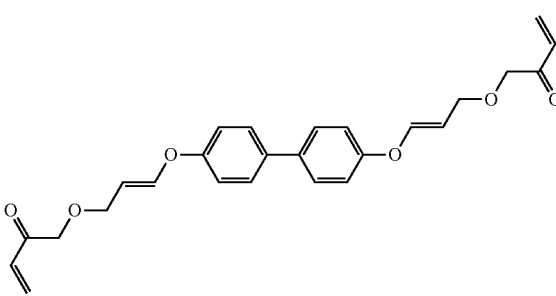

No. 43
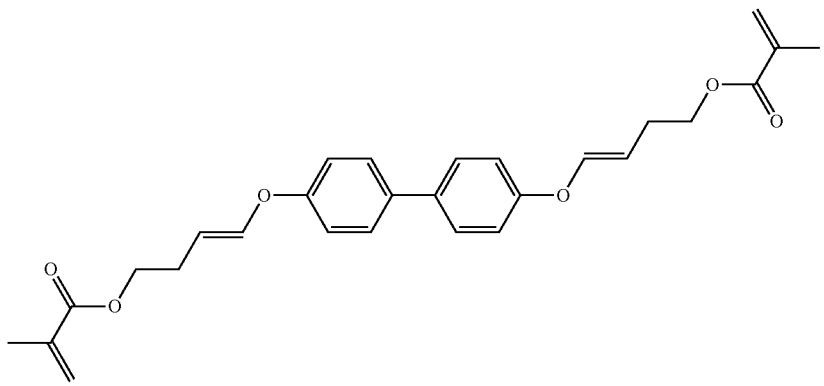
No. 44
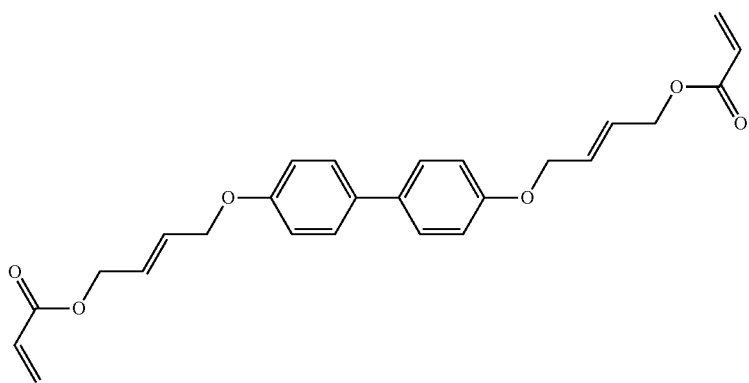
No. 45
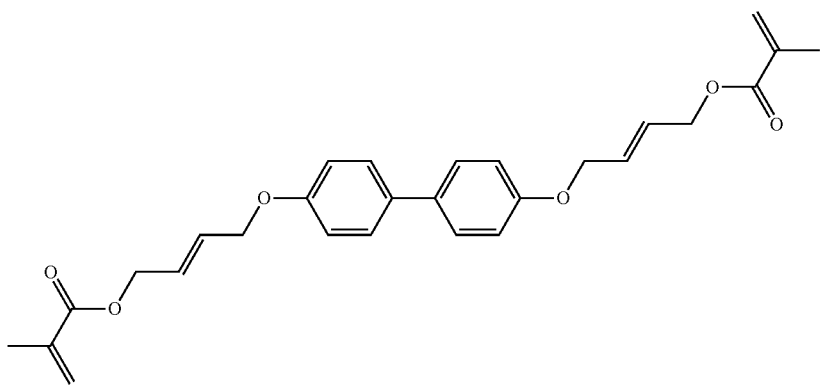
No. 46
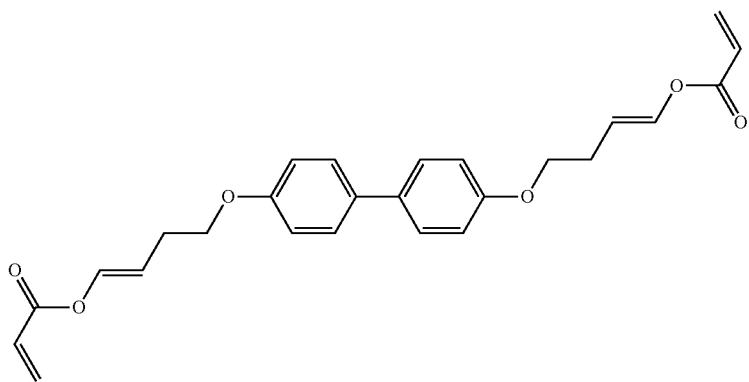

No. 47
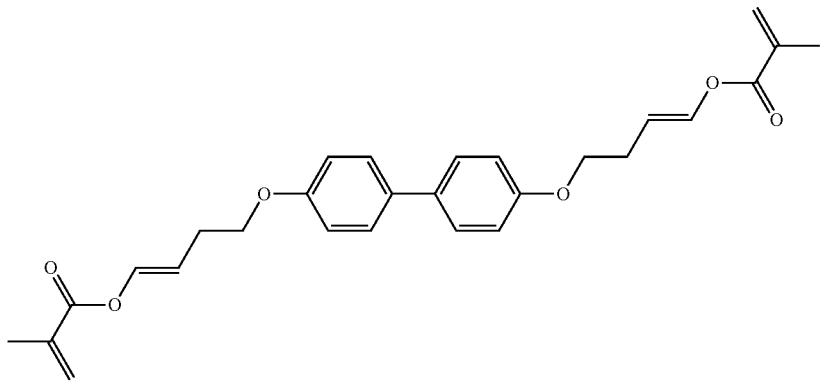
No. 48 No. 49
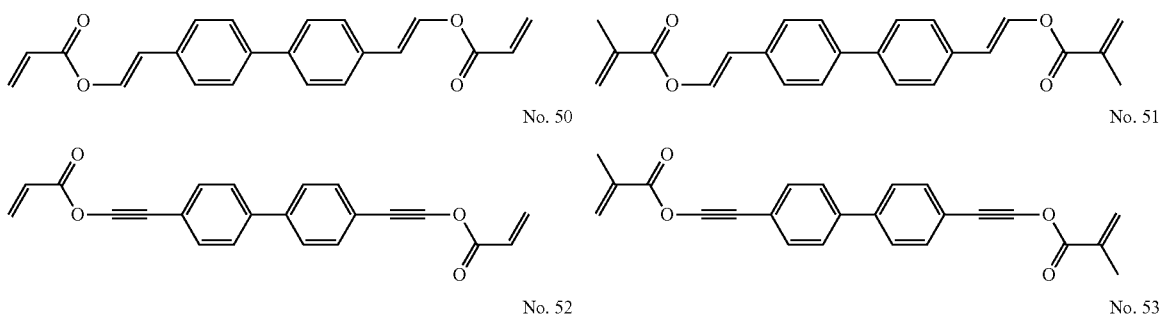
No. 50 No. 51
No. 52 No. 53
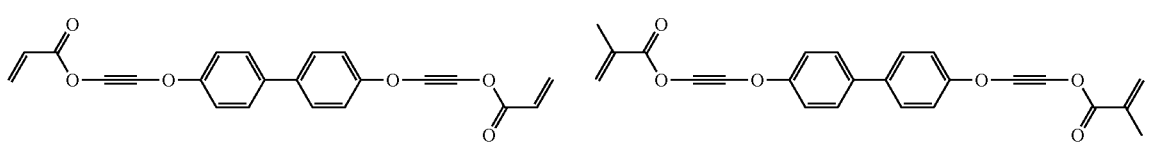
No. 54
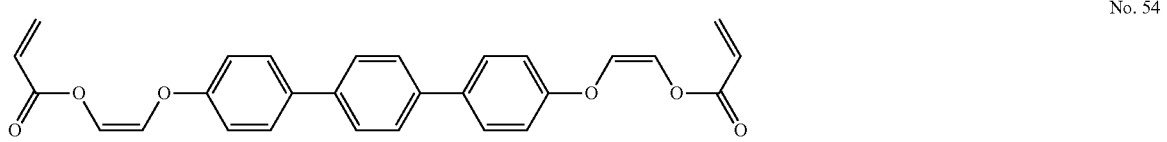
No. 55
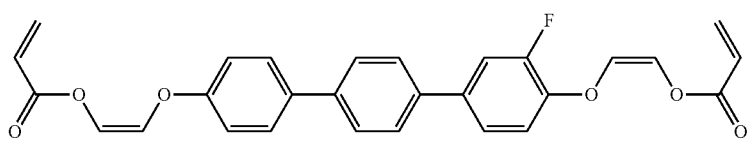
No. 56
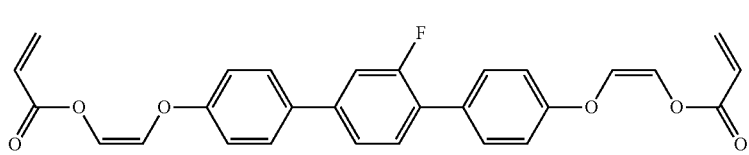
No. 57
No. 58
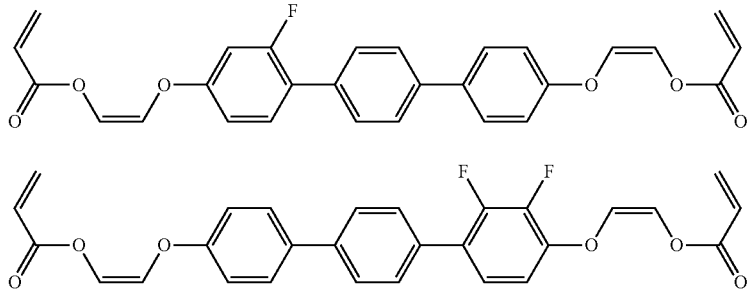

-continued
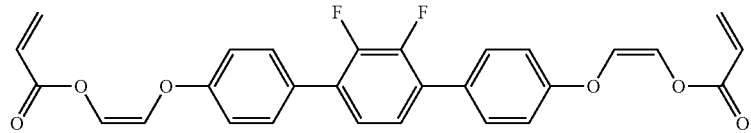
No. 59
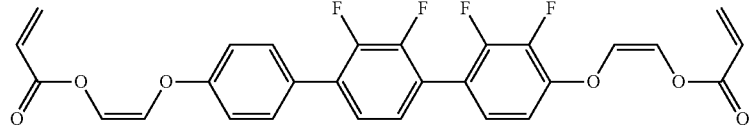
No. 60
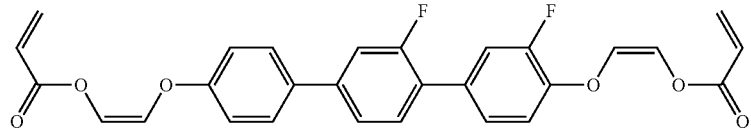
No. 61
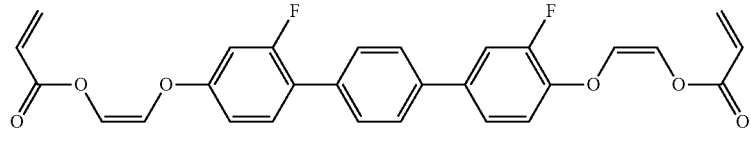
No. 62
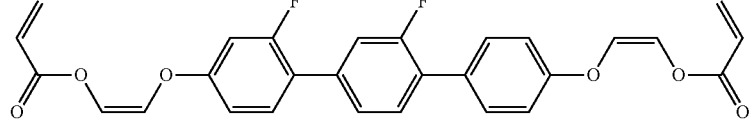
No. 63
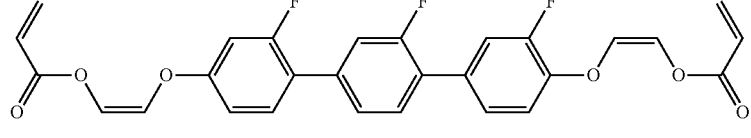
No. 64
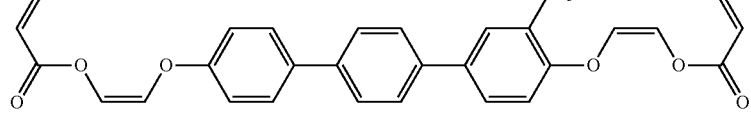
No. 65
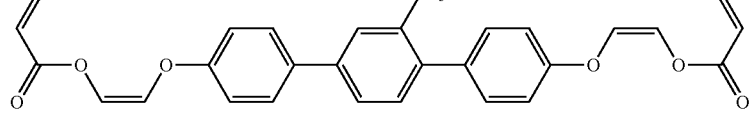
No. 66
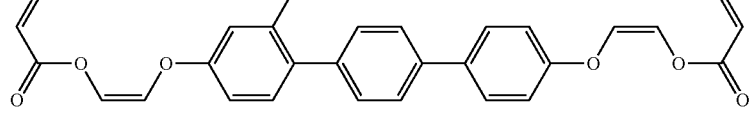
No. 67
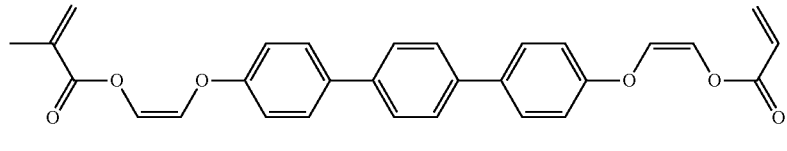
No. 68
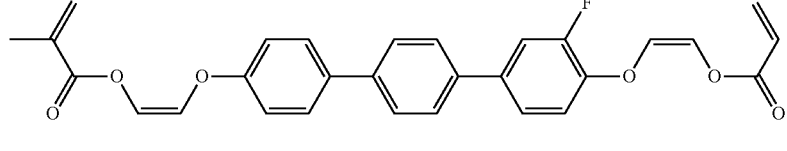
No. 69

-continued
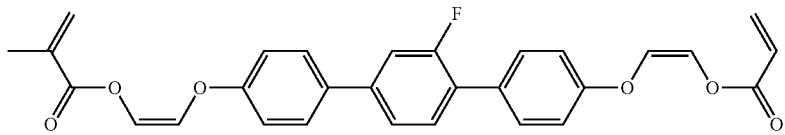 No. 70
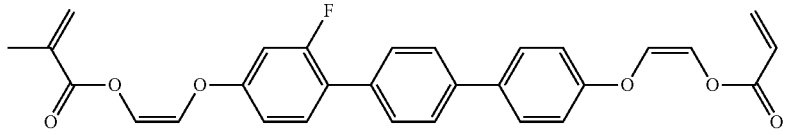 No. 71
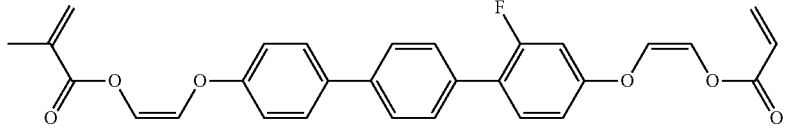 No. 72
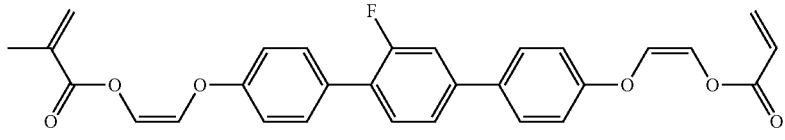 No. 73
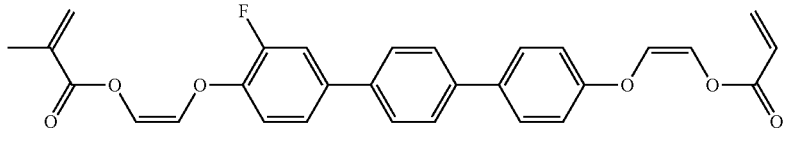 No. 74
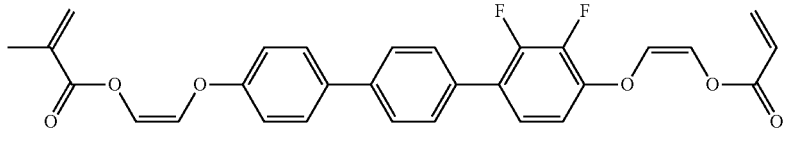 No. 75
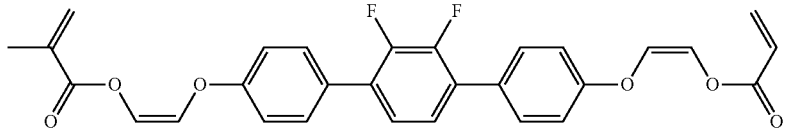 No. 76
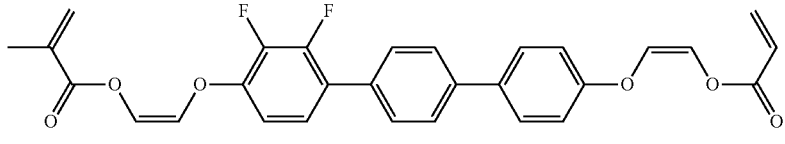 No. 77
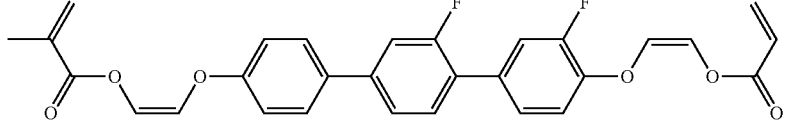 No. 78
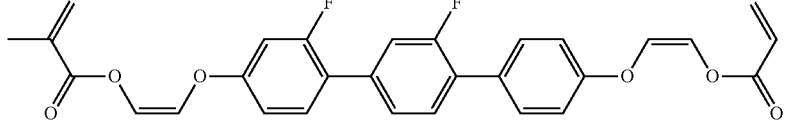 No. 79
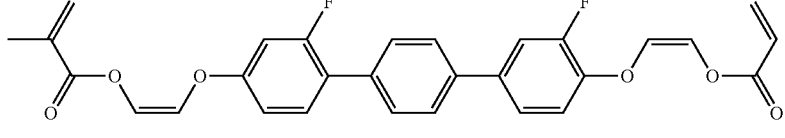 No. 80

-continued
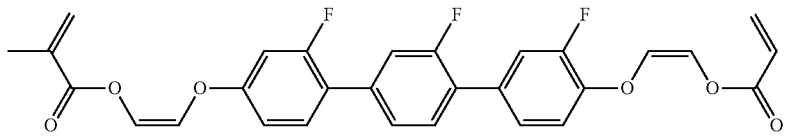
No. 81
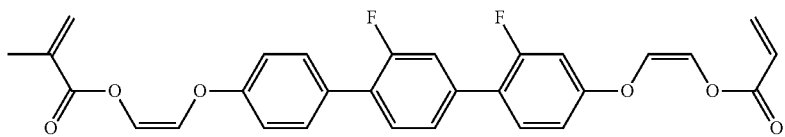
No. 82
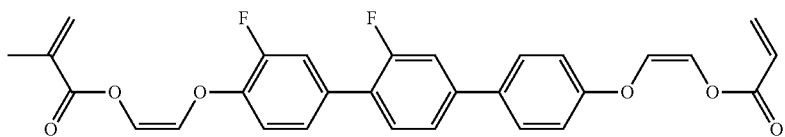
No. 83
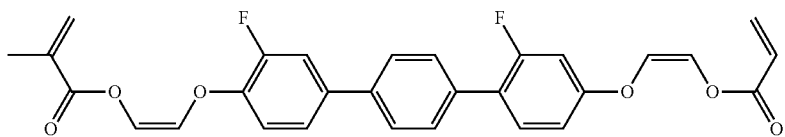
No. 84
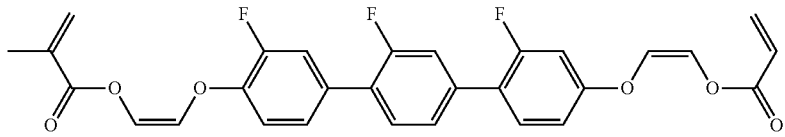
No. 85
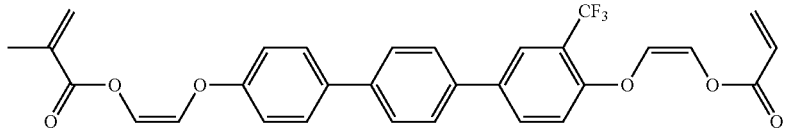
No. 86
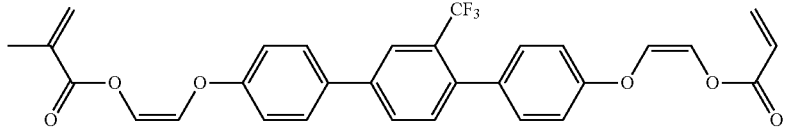
No. 87
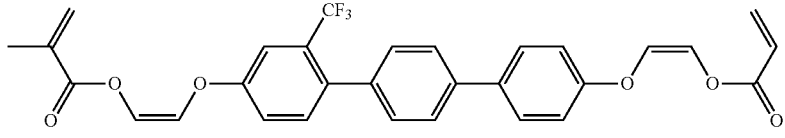
No. 88
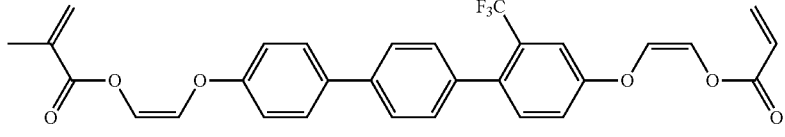
No. 89
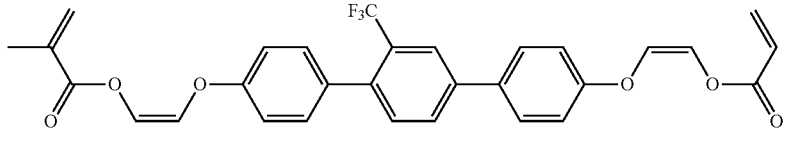
No. 90
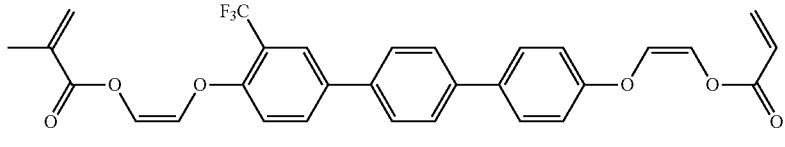
No. 91

-continued
No. 92
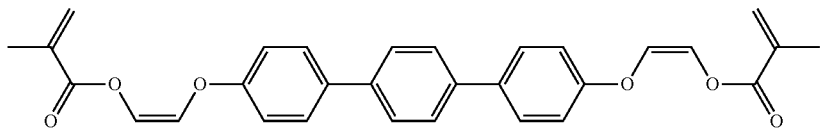
No. 93
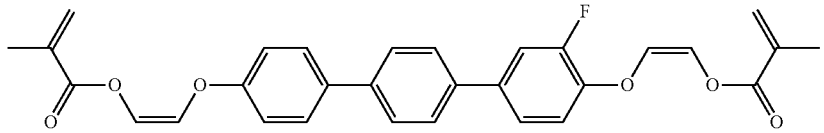
No. 94
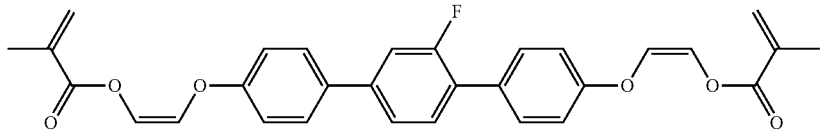
No. 95
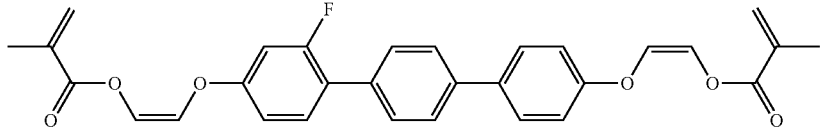
No. 96
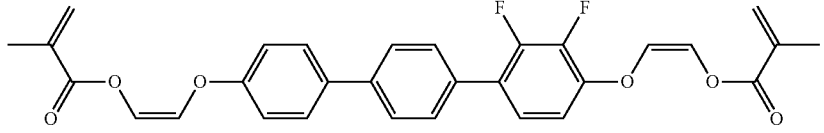
No. 97
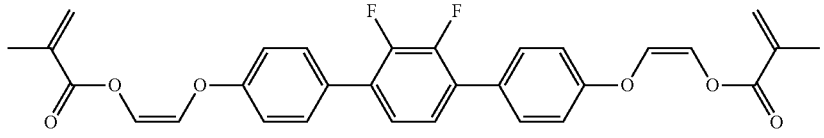
No. 98
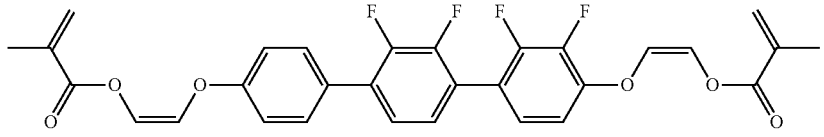
No. 99
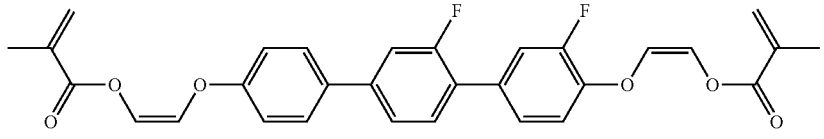
No. 100
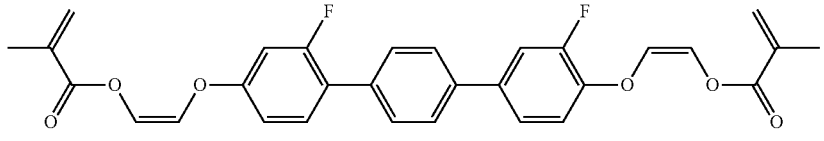
No. 101
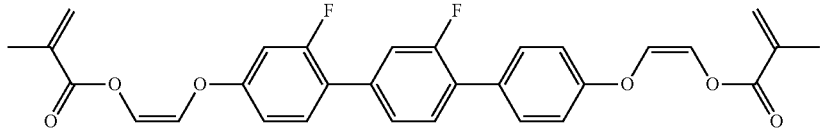
No. 102
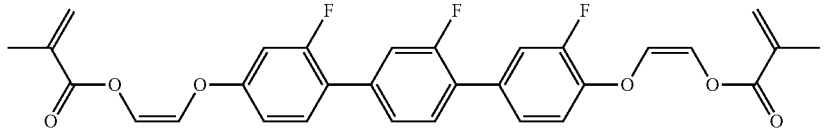

-continued
No. 103
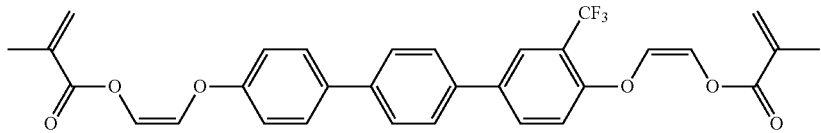
No. 104
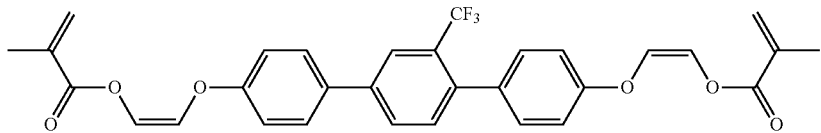
No. 105
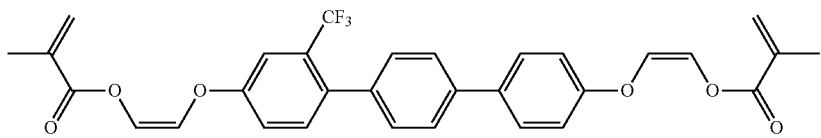
No. 106 No. 107
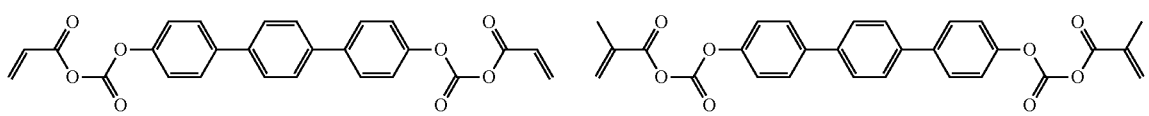
No. 108
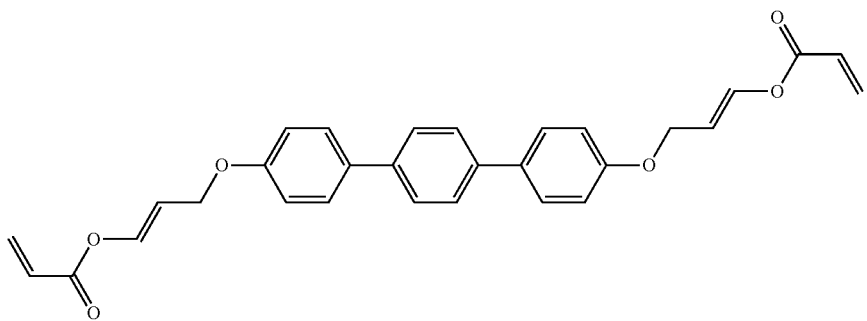
No. 109
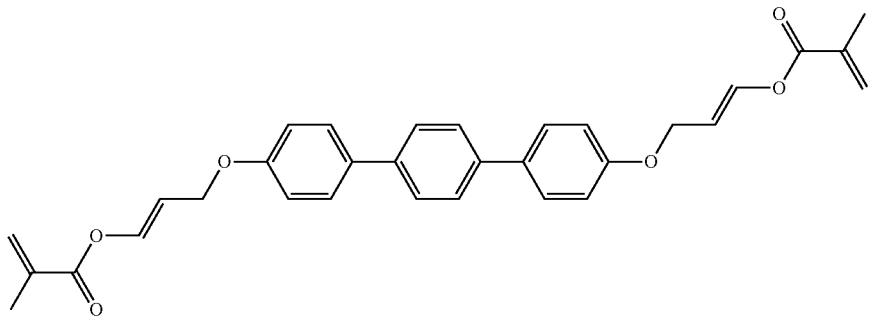
No. 110
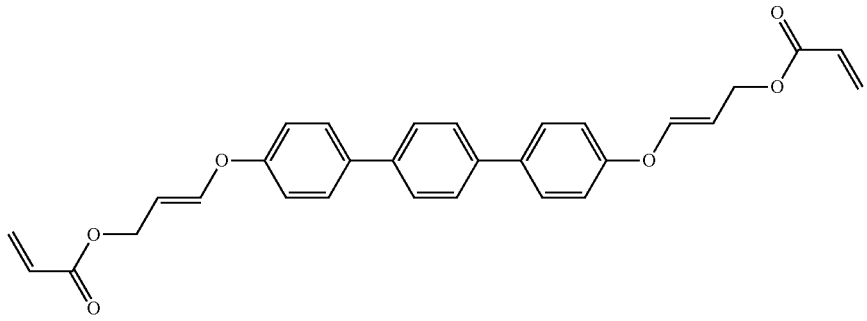

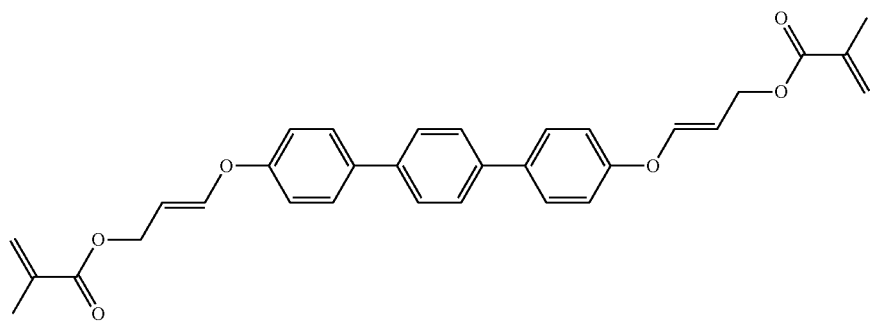
No. 111
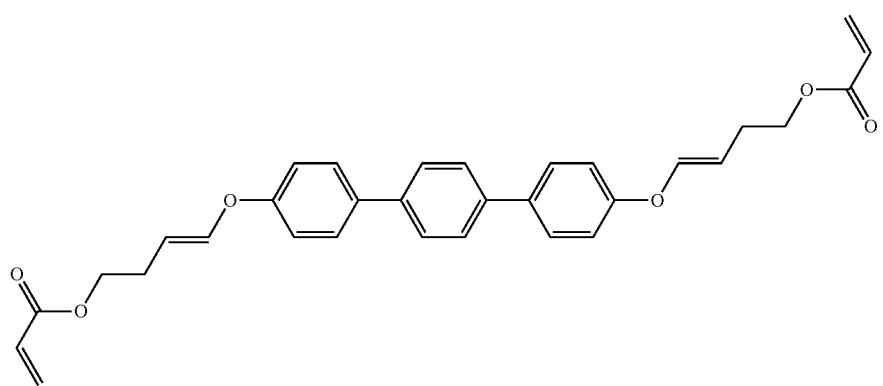
No. 112
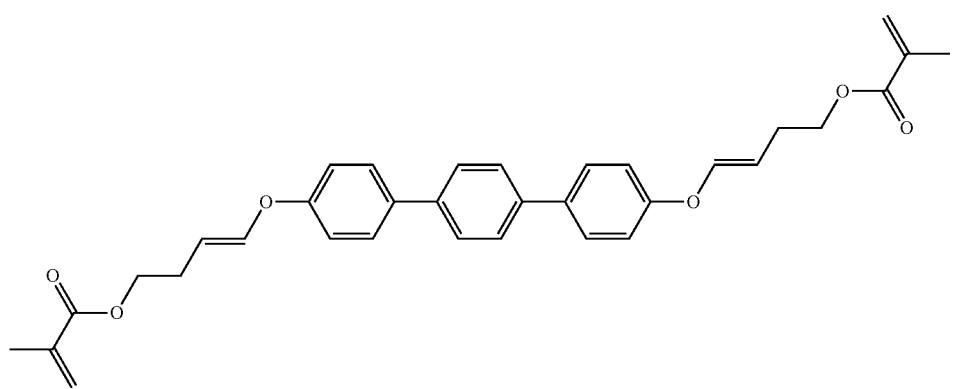
No. 113
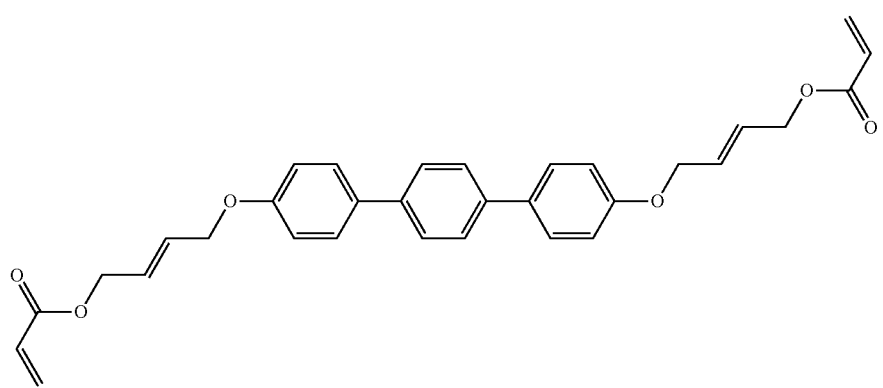
No. 114

-continued
No. 115
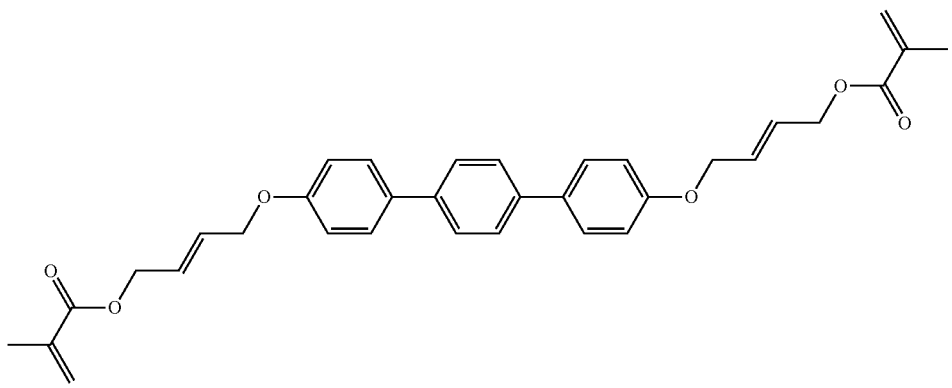
No. 116
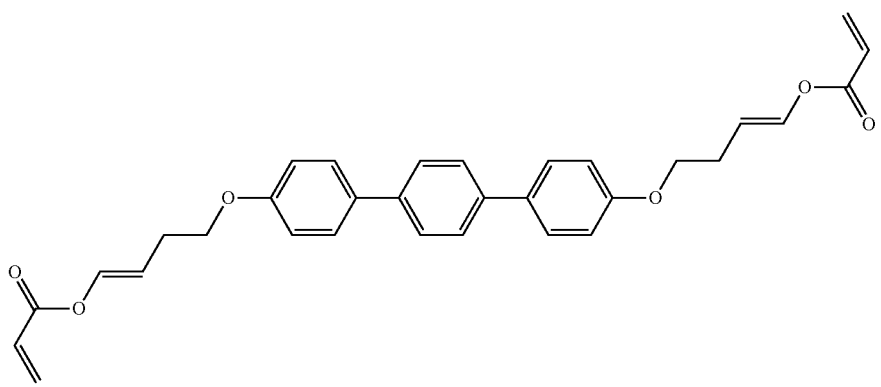
No. 117
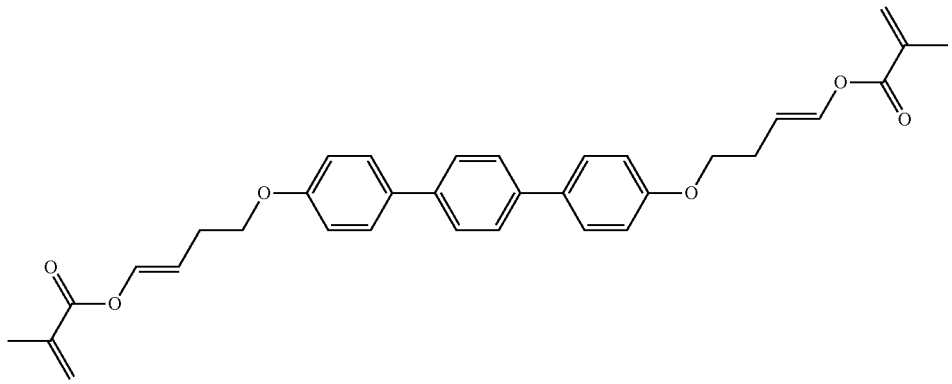
No. 118　　　　　　　　　　　　　　　No. 119
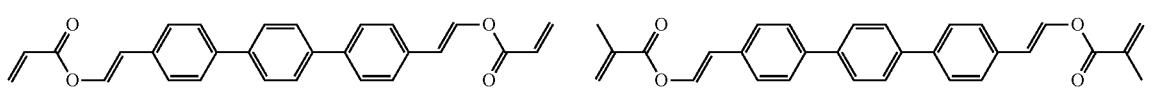
No. 120
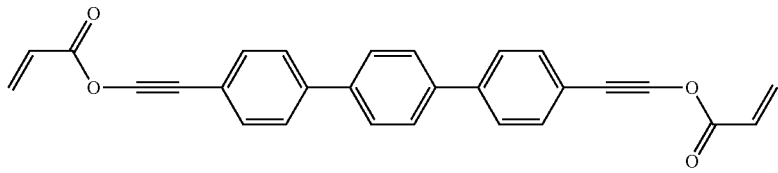
No. 121
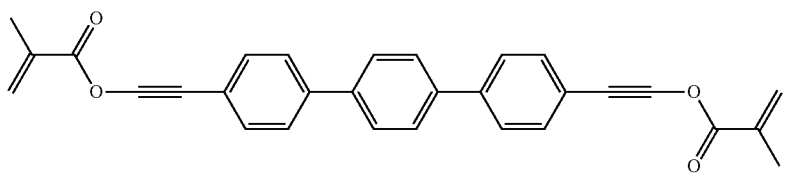

-continued
No. 122
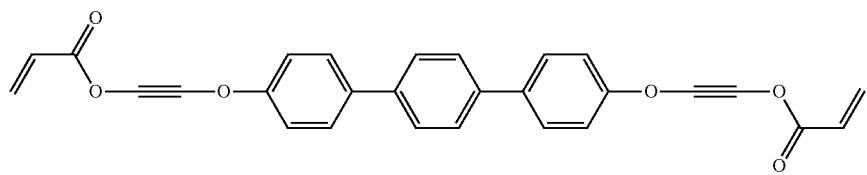
No. 123
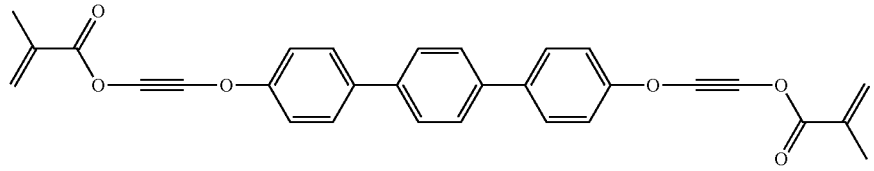
No. 124  No. 125
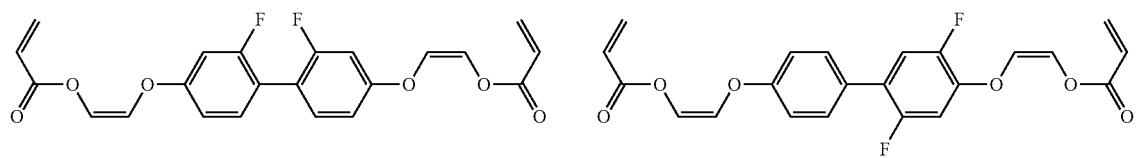
No. 126  No. 127
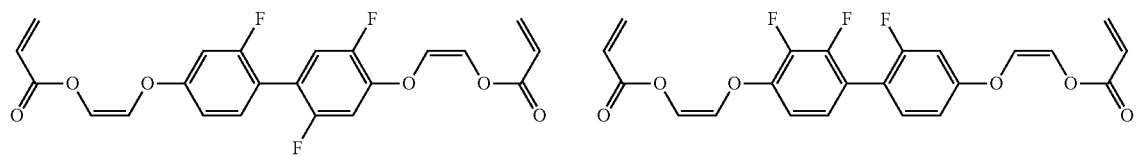
No. 128  No. 129
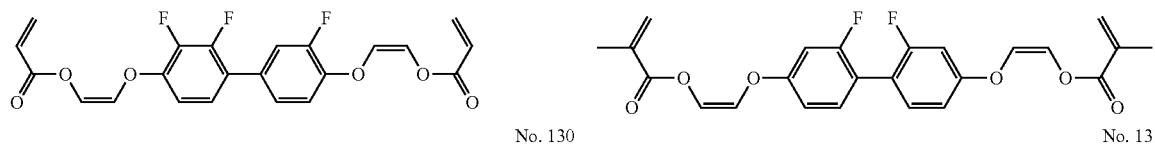
No. 130  No. 131
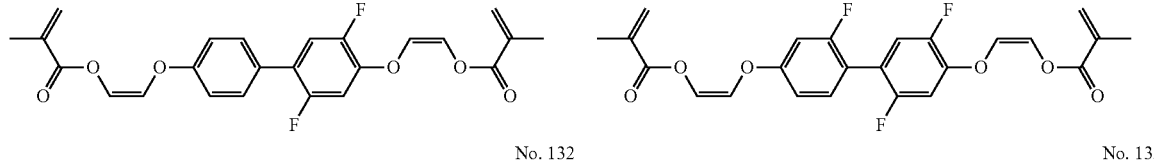
No. 132  No. 133
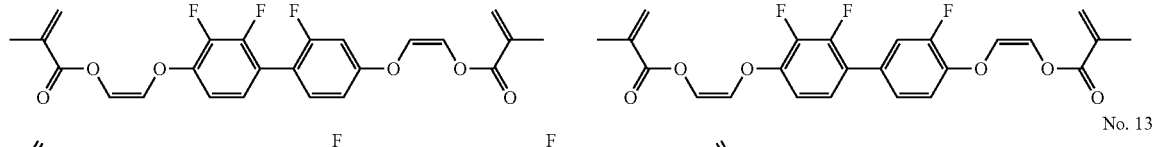
No. 134
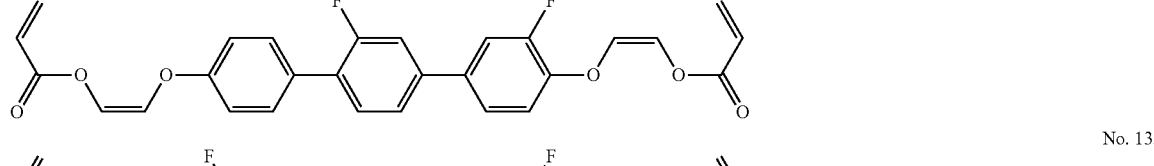
No. 135
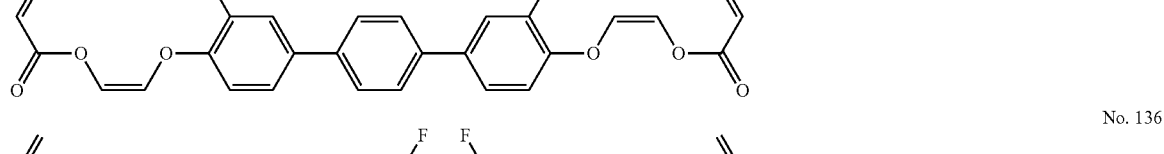
No. 136

No. 137
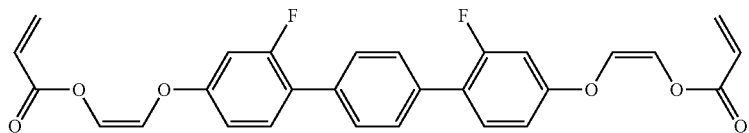
No. 138
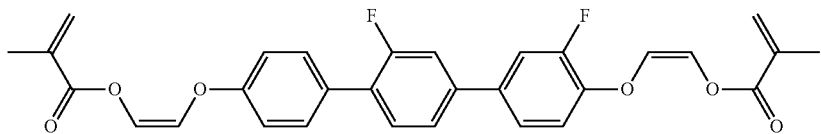
No. 139
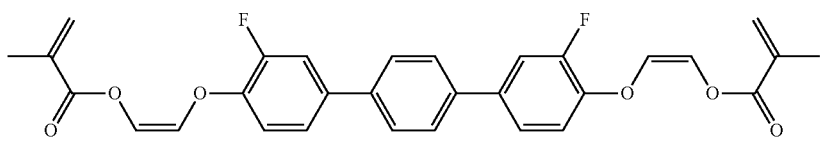
No. 140
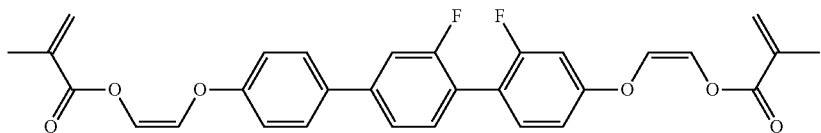
No. 141
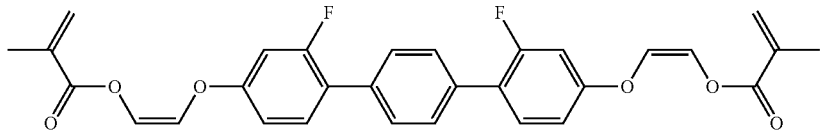
No. 142
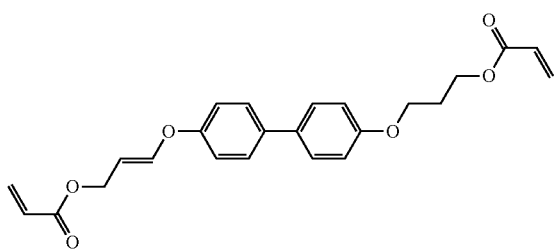
No. 143
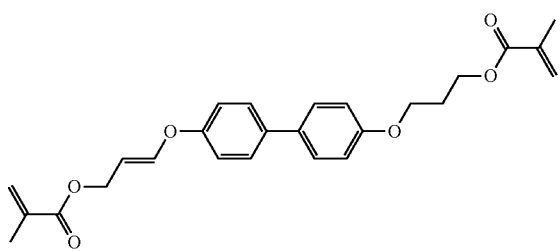
No. 144
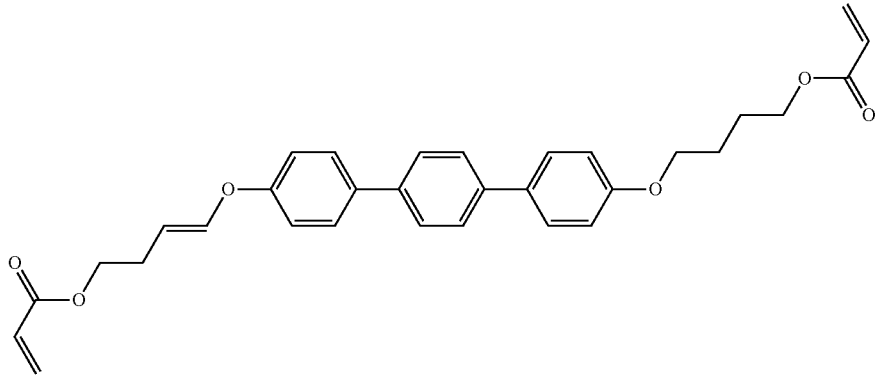

-continued
No. 145
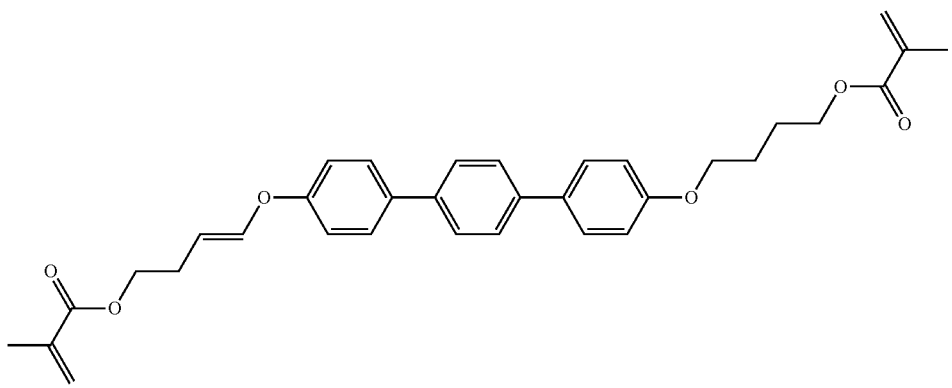
No. 146 No. 147
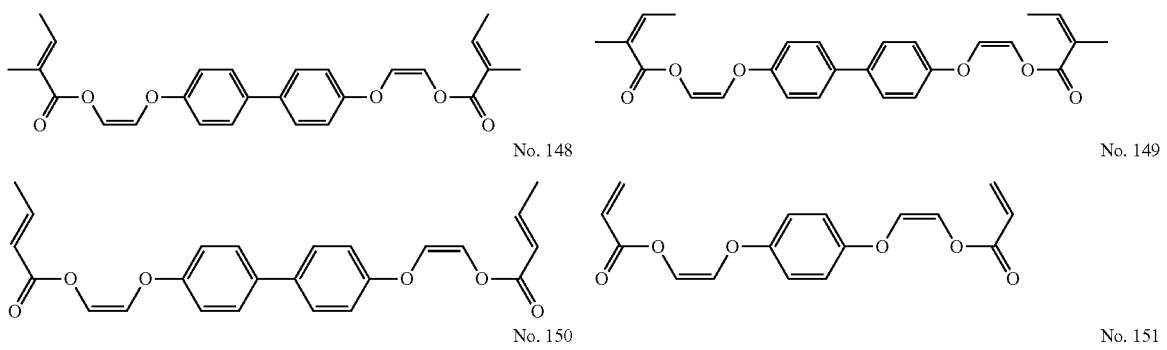
No. 148 No. 149
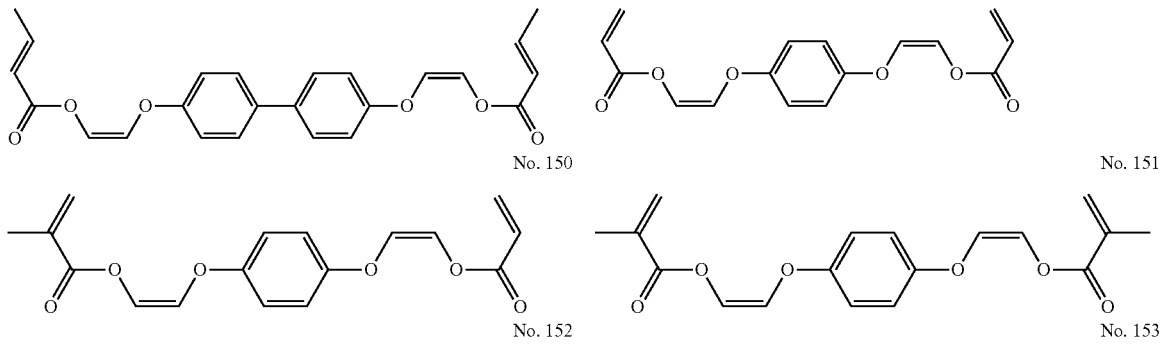
No. 150 No. 151
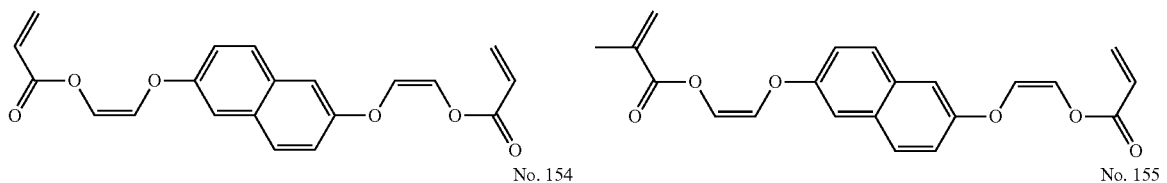
No. 152 No. 153
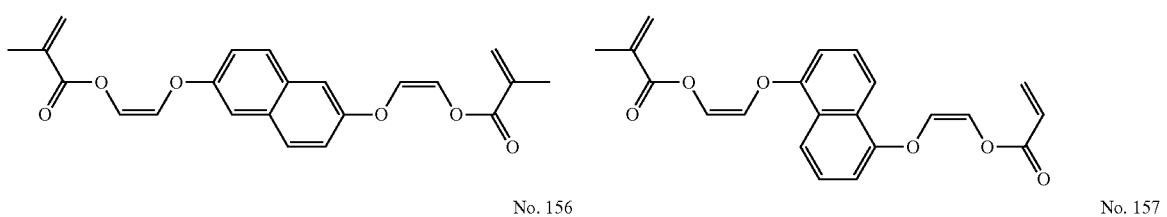
No. 154 No. 155
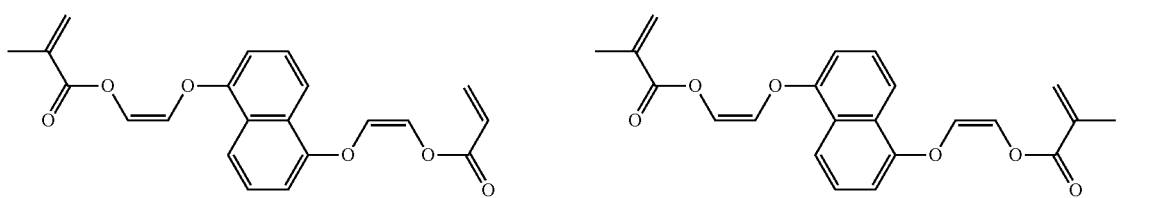
No. 156 No. 157
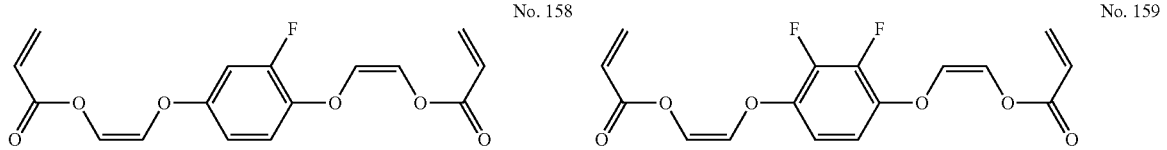
No. 158 No. 159

-continued
No. 160
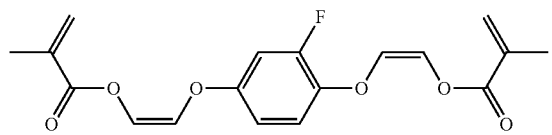
No. 161
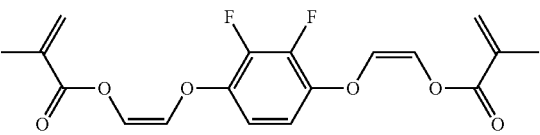
No. 162
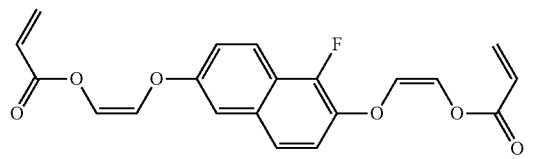
No. 163
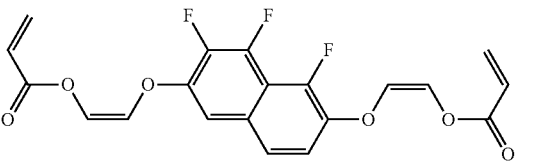
No. 164
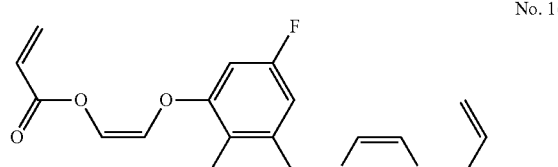
No. 165
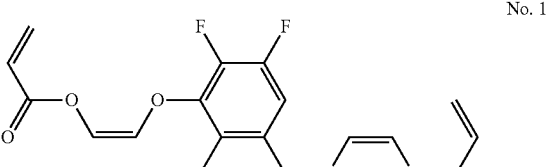
No. 166
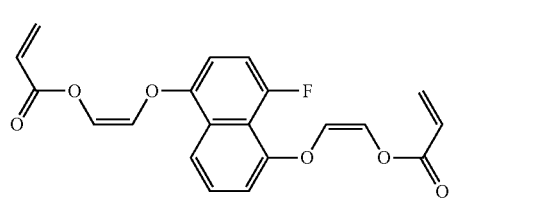
No. 167
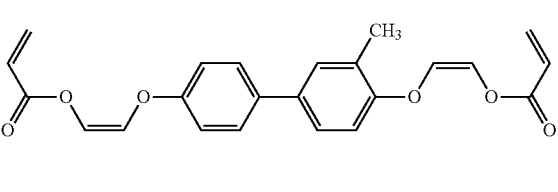
No. 168
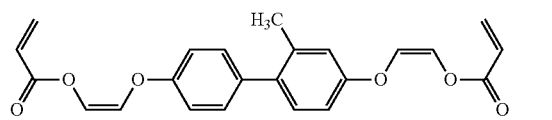
No. 169
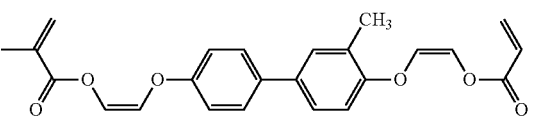
No. 170
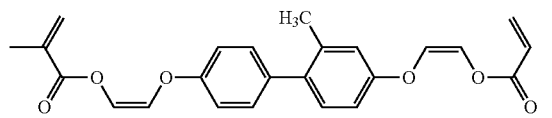
No. 171
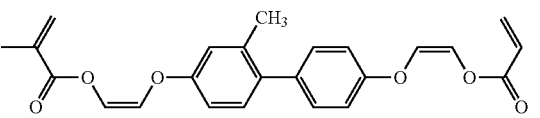
No. 172
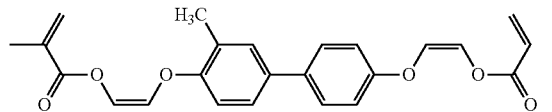
No. 173
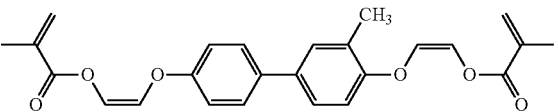
No. 174
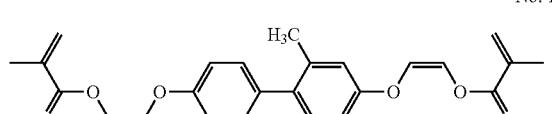
No. 175
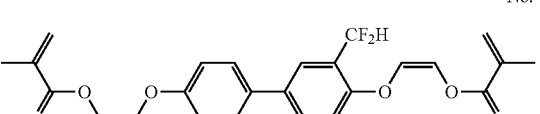
No. 176
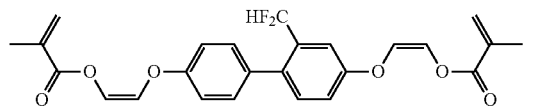
No. 177
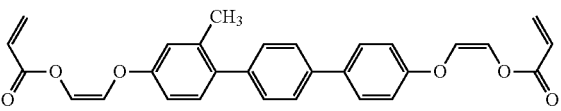

-continued
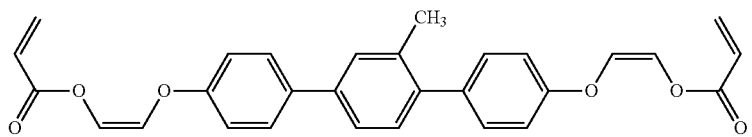
No. 178
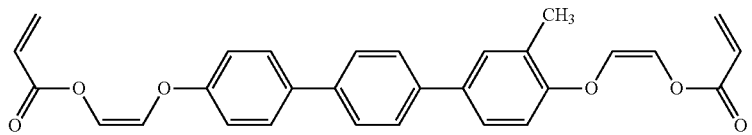
No. 179
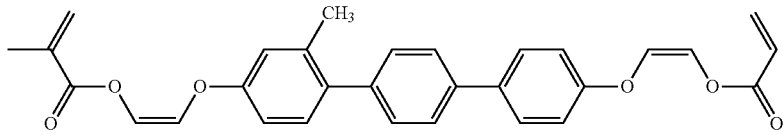
No. 180
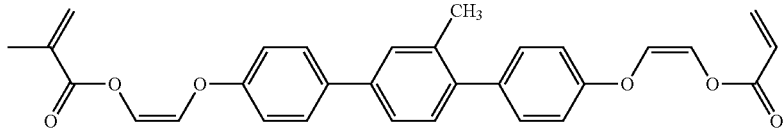
No. 181
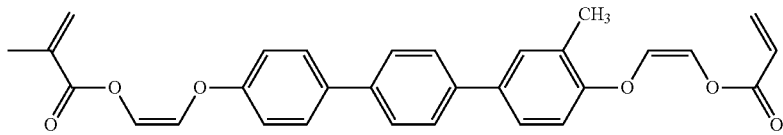
No. 182
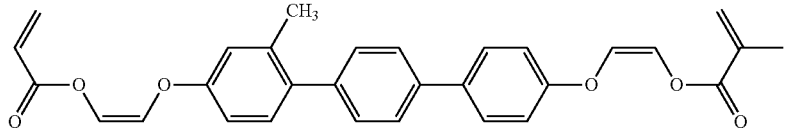
No. 183
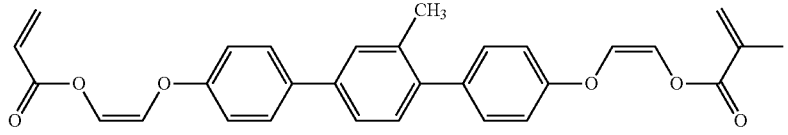
No. 184
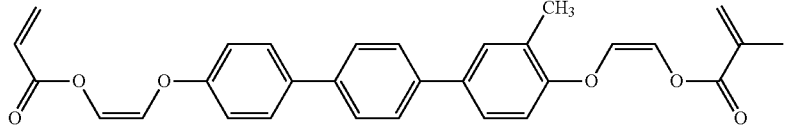
No. 185
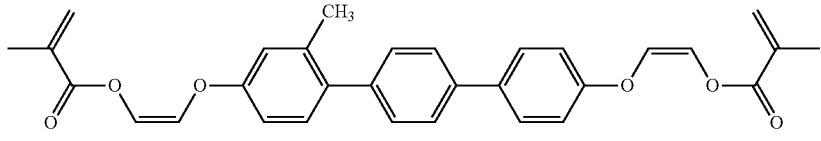
No. 186
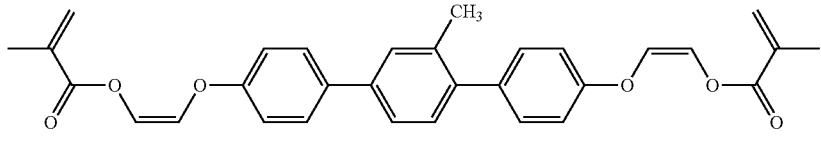
No. 187
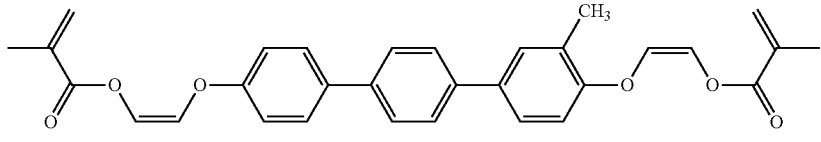
No. 188

-continued

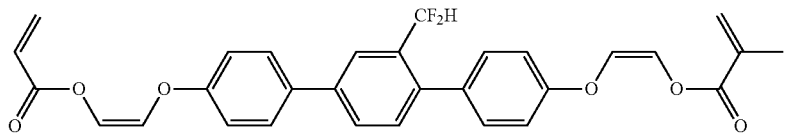
No. 189

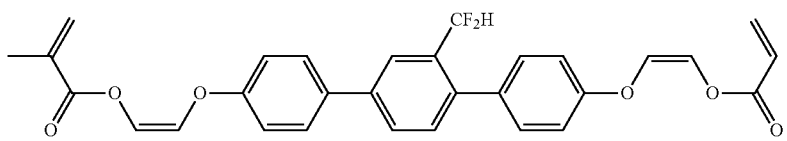
No. 190

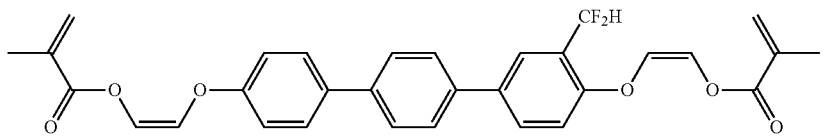
No. 191

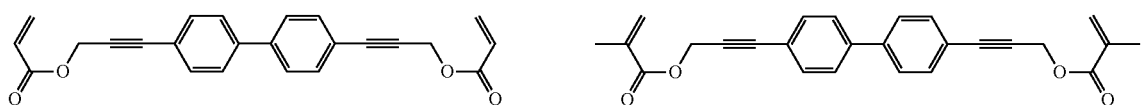
No. 192 No. 193

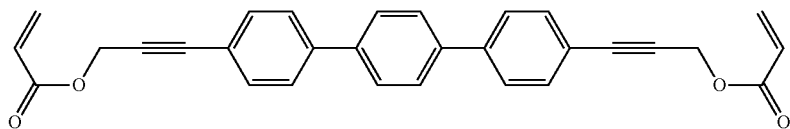
No. 194

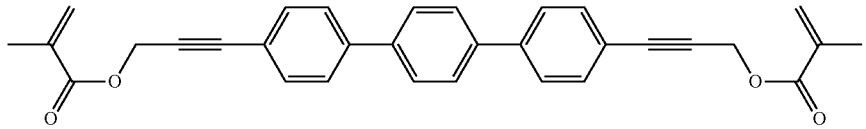
No. 195

2. Examples of the Liquid Crystal Composition

The compounds described in Examples were expressed in terms of symbols according to the definition in Table 1 described below. In Table 1, the configuration of 1,4-cyclohexylene is trans. The parenthesized number next to the symbols in Example indicates the number of the compound. The symbol (-) means any other liquid crystal compound. The contents (percentage) of liquid crystal compounds mean the percentages by weight (% by weight) based on the total weight of the liquid crystal compounds. Last, the values of physical properties of the liquid crystal composition were summarized. The physical properties were measured according to the method described above, and measured values themselves were reported (without extrapolation).

TABLE 1

Method of Description of Compound using Symbols
R—(A$_1$)—Z$_1$— ··· —Z$_n$—(A$_n$)—R'

| 1) Left-terminal Group R— | Symbol |
|---|---|
| $C_nH_{2n+1}$— | n- |
| $C_nH_{2n+1}O$— | nO— |
| $C_mH_{2m+1}OC_nH_{2n}$— | mOn- |
| $CH_2$=CH— | V— |
| $C_nH_{2n+1}$—CH=CH— | nV— |
| $CH_2$=CH—$C_nH_{2n}$— | Vn- |
| $C_mH_{2m+1}$—CH=CH—$C_nH_{2n}$— | mVn- |

TABLE 1-continued

Method of Description of Compound using Symbols
R—(A$_1$)—Z$_1$— ··· —Z$_n$—(A$_n$)—R'

| | |
|---|---|
| $CF_2$=CH— | VFF— |
| $CF_2$=CH—$C_nH_{2n}$— | VFFn- |

| 2) Right-terminal Group —R' | Symbol |
|---|---|
| —$C_nH_{2n+1}$ | -n |
| —$OC_nH_{2n+1}$ | —On |
| —$COOCH_3$ | —EMe |
| —CH=$CH_2$ | —V |
| —CH=CH—$C_nH_{2n+1}$ | —Vn |
| —$C_nH_{2n}$—CH=$CH_2$ | -nV |
| —$C_mH_{2m}$—CH=CH—$C_nH_{2n+1}$ | -mVn |
| —CH=$CF_2$ | —VFF |
| —F | —F |
| —Cl | —CL |
| —$OCF_3$ | —OCF3 |
| —$OCF_2H$ | —OCF2H |
| —$CF_3$ | —CF3 |
| —CF=CH—$CF_3$ | —FVCF3 |
| —C≡N | —C |

| 3) Bonding Group —$Z_n$— | Symbol |
|---|---|
| —$C_nH_{2n}$— | n |
| —COO— | E |
| —CH=CH— | V |
| —$CH_2O$— | 1O |

TABLE 1-continued

Method of Description of Compound using Symbols
R—(A₁)—Z₁— ··· —Zₙ—(Aₙ)—R'

| | Symbol |
|---|---|
| —OCH₂— | O1 |
| —CF₂O— | X |
| —C≡C— | T |

| 4) Ring Structure —Aₙ— | Symbol |
|---|---|
|  | H |
|  | B |
| 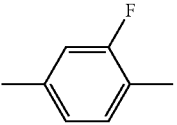 | B(F) |
| 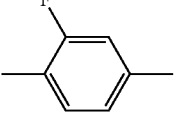 | B(2F) |
| 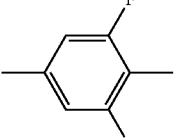 | B(F,F) |
| 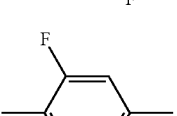 | B(2F,5F) |
| 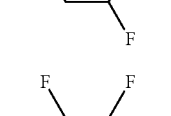 | B(2F,3F) |
| 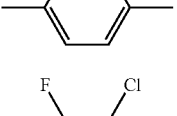 | B(2F,3CL) |
| 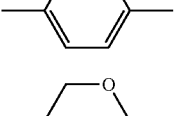 | G |
| 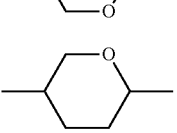 | dh |
| 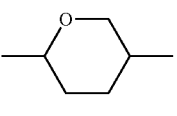 | Dh |
| 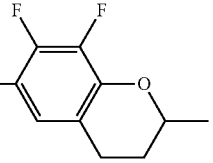 | Cro(7F,8F) |

5) Examples of Description

Example 1. 3-BB(F,F)XB(F,F)-F

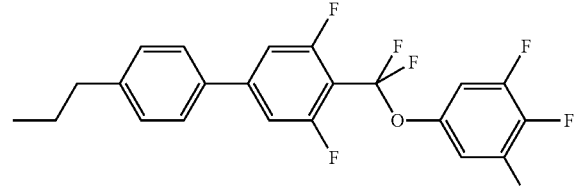

Example 2. 3HBB(2F,3F)-O2

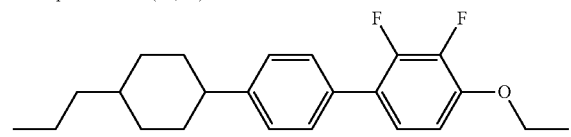

Example 3. 3-HH-4

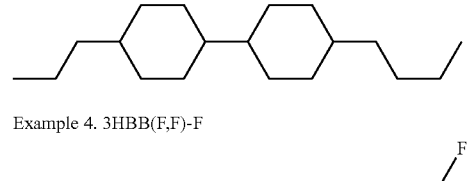

Example 4. 3HBB(F,F)-F

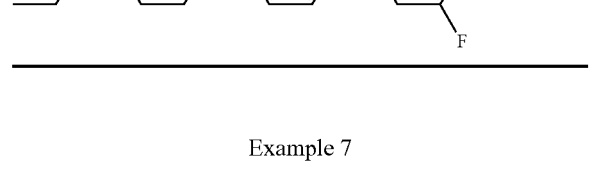

Example 7

| | | |
|---|---|---|
| 5-HB-CL | (2-2) | 16% |
| 3-HH-4 | (6-1) | 12% |
| 3-HH-5 | (6-1) | 4% |
| 3-HHB-F | (3-1) | 4% |
| 3-HHB-CL | (3-1) | 3% |
| 4-HHB-CL | (3-1) | 4% |
| 3-HHB(F)-F | (3-2) | 10% |
| 4-HHB(F)-F | (3-2) | 9% |
| 5-HHB(F)-F | (3-2) | 9% |
| 7-HHB(F)-F | (3-2) | 8% |
| 5-HBB(F)-F | (3-23) | 4% |
| 1O1-HBBH-5 | (8-1) | 3% |
| 3-HHBB(F,F)-F | (4-6) | 2% |
| 4-HHBB(F,F)-F | (4-6) | 3% |
| 5-HHBB(F,F)-F | (4-6) | 3% |
| 3-HH2BB(F,F)-F | (4-15) | 3% |
| 4-HH2BB(F,F)-F | (4-15) | 3% |

The following compound was added in the ratio of 0.3% by weight based on the preceding composition.

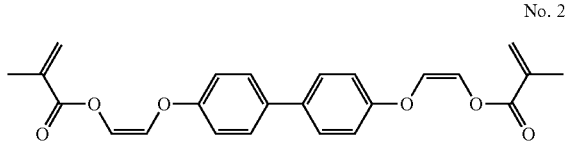

No. 26

NI=113.9° C.; Δn=0.090; Δ∈=3.8; η=19.2 mPa·s.

Example 8

| | | |
|---|---|---|
| 3-HHB(F,F)-F | (3-3) | 9% |
| 3-H2HB(F,F)-F | (3-15) | 8% |
| 4-H2HB(F,F)-F | (3-15) | 8% |
| 5-H2HB(F,F)-F | (3-15) | 8% |
| 3-HBB(F,F)-F | (3-24) | 21% |
| 5-HBB(F,F)-F | (3-24) | 20% |
| 3-H2BB(F,F)-F | (3-27) | 10% |
| 5-HHBB(F,F)-F | (4-6) | 3% |
| 5-HHEBB-F | (4-17) | 2% |
| 3-HH2BB(F,F)-F | (4-15) | 3% |

Example 9

| | | |
|---|---|---|
| 5-HB-F | (2-2) | 12% |
| 6-HB-F | (2-2) | 9% |
| 7-HB-F | (2-2) | 7% |
| 2-HHB-OCF3 | (3-1) | 7% |
| 3-HHB-OCF3 | (3-1) | 7% |
| 4-HHB-OCF3 | (3-1) | 7% |
| 5-HHB-OCF3 | (3-1) | 5% |
| 3-HH2B-OCF3 | (3-4) | 4% |
| 5-HH2B-OCF3 | (3-4) | 4% |
| 3-HHB(F,F)-OCF2H | (3-3) | 4% |
| 3-HHB(F,F)-OCF3 | (3-3) | 5% |
| 3-HH2B(F)-F | (3-5) | 3% |
| 3-HBB(F)-F | (3-23) | 10% |
| 5-HBB(F)-F | (3-23) | 10% |
| 5-HBBH-3 | (8-1) | 3% |
| 3-HB(F)BH-3 | (8-2) | 3% |

The following compound was added in the ratio of 0.3% by weight based on the preceding composition.

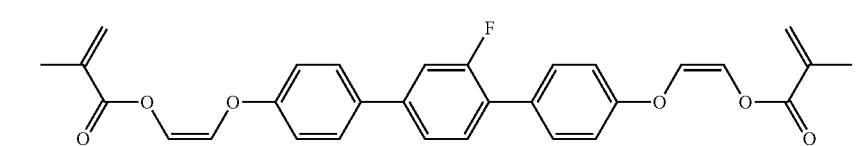

No. 94

-continued

| | | |
|---|---|---|
| 1O1-HBBH-4 | (8-1) | 4% |
| 1O1-HBBH-5 | (8-1) | 4% |

The following compound was added in the ratio of 0.3% by weight based on the preceding composition.

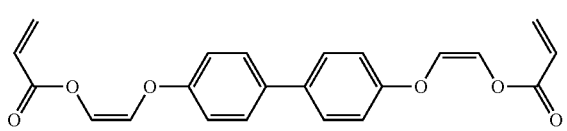

No. 1

NI=98.8° C.; Δn=0.117; Δ∈=9.1; η=35.3 mPa·s.

Example 10

| | | |
|---|---|---|
| 5-HB-CL | (2-2) | 11% |
| 3-HH-4 | (6-1) | 8% |
| 3-HHB-1 | (7-1) | 5% |
| 3-HHB(F,F)-F | (3-23) | 8% |
| 3-HBB(F,F)-F | (3-24) | 20% |
| 5-HBB(F,F)-F | (3-24) | 15% |
| 3-HHEB(F,F)-F | (3-12) | 10% |
| 4-HHEB(F,F)-F | (3-12) | 3% |
| 5-HHEB(F,F)-F | (3-12) | 3% |
| 2-HBEB(F,F)-F | (3-39) | 3% |
| 3-HBEB(F,F)-F | (3-39) | 5% |
| 5-HBEB(F,F)-F | (3-39) | 3% |
| 3-HHBB(F,F)-F | (4-6) | 6% |

The following compound was added in the ratio of 0.3% by weight based on the preceding composition.

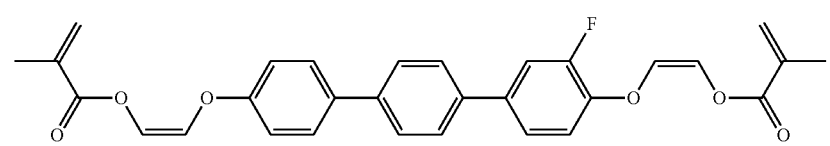

No. 93

Example 11

| | | |
|---|---|---|
| 3-HB-CL | (2-2) | 6% |
| 5-HB-CL | (2-2) | 4% |
| 3-HHB-OCF3 | (3-1) | 5% |
| 3-H2HB-OCF3 | (3-13) | 5% |
| 5-H4HB-OCF3 | (3-19) | 15% |
| V-HHB(F)-F | (3-2) | 5% |
| 3-HHB(F)-F | (3-2) | 5% |
| 5-HHB(F)-F | (3-2) | 5% |
| 3-H4HB(F,F)-CF3 | (3-21) | 8% |
| 5-H4HB(F,F)-CF3 | (3-21) | 10% |
| 5-H2HB(F,F)-F | (3-15) | 5% |
| 5-H4HB(F,F)-F | (3-21) | 7% |
| 2-H2BB(F)-F | (3-26) | 5% |
| 3-H2BB(F)-F | (3-26) | 10% |
| 3-HBEB(F,F)-F | (3-29) | 5% |

The following compound was added in the ratio of 0.3% by weight based on the preceding composition.

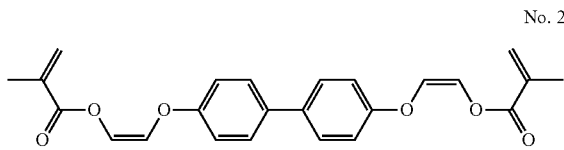

No. 26

NI=70.4° C.; Δn=0.098; Δ∈=8.4; η=25.6 mPa·s.

Example 12

| | | |
|---|---|---|
| 5-HB-CL | (2-2) | 17% |
| 7-HB(F,F)-F | (2-4) | 3% |
| 3-HH-4 | (6-1) | 10% |
| 3-HH-5 | (6-1) | 5% |
| 3-HB-O2 | (6-5) | 15% |
| 3-HHB-1 | (7-1) | 8% |
| 3-HHB-O1 | (7-1) | 5% |
| 2-HHB(F)-F | (3-2) | 7% |
| 3-HHB(F)-F | (3-2) | 7% |
| 5-HHB(F)-F | (3-2) | 7% |
| 3-HHB(F,F)-F | (3-3) | 6% |
| 3-H2HB(F,F)-F | (3-15) | 5% |
| 4-H2HB(F,F)-F | (3-15) | 5% |

The following compound was added in the ratio of 0.3% by weight based on the preceding composition.

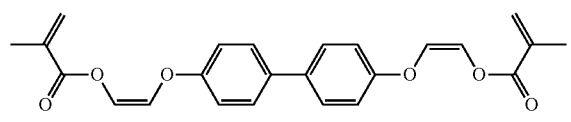

No. 26

NI=71.7° C.; Δn=0.074; Δ∈=2.9.

Example 13

| | | |
|---|---|---|
| 5-HB-CL | (2-2) | 3% |
| 7-HB(F)-F | (2-3) | 7% |
| 3-HH-4 | (6-1) | 9% |
| 3-HH-EMe | (6-2) | 23% |
| 3-HHEB-F | (3-10) | 8% |
| 5-HHEB-F | (3-10) | 8% |
| 3-HHEB(F,F)-F | (3-12) | 10% |
| 4-HHEB(F,F)-F | (3-12) | 5% |
| 5-HGB(F,F)-F | (3-103) | 6% |
| 3-H2GB(F,F)-F | (3-106) | 5% |
| 5-GHB(F,F)-F | (3-109) | 7% |
| 3-GB(F,F)XB(F,F)-F | (3-118) | 4% |
| 5-GB(F)B(F,F)XB(F,F)-F | (4-56) | 5% |

The following compound was added in the ratio of 0.15% by weight based on the preceding composition, and

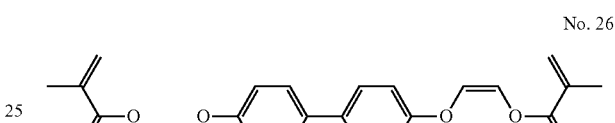

No. 26 the following compound was further added in the ratio of 0.15% by weight.

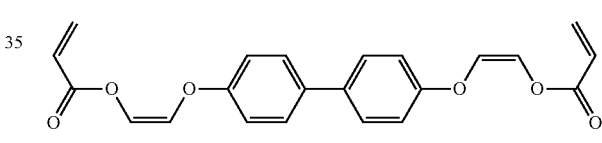

No. 1

NI=80.0° C.; Δn=0.069; Δ∈=7.9; η=22.0 mPa·s.

Example 14

| | | |
|---|---|---|
| 3-HB-O2 | (6-5) | 10% |
| 5-HB-O2 | (6-5) | 6% |
| 5-HB-CL | (2-2) | 13% |
| 3-HBB(F,F)-F | (3-24) | 7% |
| 3-PyB(F)-F | (5-9) | 10% |
| 5-PyB(F)-F | (5-9) | 10% |
| 3-PyBB-F | (7-11) | 10% |
| 4-PyBB-F | (7-11) | 10% |
| 5-PyBB-F | (7-11) | 10% |
| 5-HBB(F)B-2 | (7-6) | 7% |
| 5-HBB(F)B-3 | (7-6) | 7% |

The following compound was added in the ratio of 0.3% by weight based on the preceding composition.

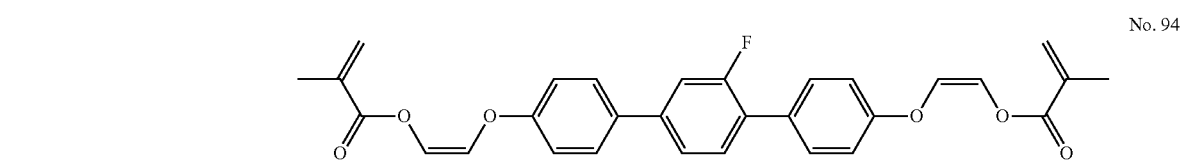 [SMILES: C=C(C)C(=O)O/C=C\Oc1ccc(-c2ccc(-c3ccc(O/C=C\OC(=O)C(=C)C)cc3)c(F)c2)cc1]

No. 94

Example 15

| | | |
|---|---|---|
| 3-HB-C | (5-1) | 5% |
| 3-BEB(F)-C | (5-14) | 4% |
| 1V2-BEB(F)-C | (5-14) | 12% |
| 3-HHB-C | (5-28) | 6% |
| 3-HHB(F)-C | (5-29) | 6% |
| 3-HB-O2 | (6-5) | 11% |
| 5-HB-O2 | (6-5) | 7% |
| 2-HH-3 | (6-1) | 11% |
| 3-HH-4 | (6-1) | 10% |
| 3-HHB-1 | (7-1) | 8% |
| 3-HHB-O1 | (7-1) | 4% |
| 3-H2BTB-2 | (7-17) | 4% |
| 3-H2BTB-3 | (7-17) | 4% |
| 3-H2BTB-4 | (7-17) | 4% |
| 3-HB(F)TB-2 | (7-18) | 4% |

The following compound was added in the ratio of 0.3% by weight based on the preceding composition.

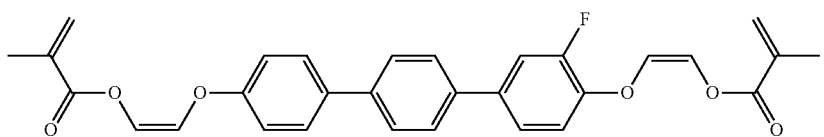
No. 93

Example 16

| | | |
|---|---|---|
| 3-HBB(F,F)XB(F,F)-F | (4-38) | 10% |
| 4-BB(F)B(F,F)XB(F,F)-F | (4-47) | 8% |
| 5-BB(F)B(F,F)XB(F,F)-F | (4-47) | 3% |
| 3-HH-O1 | (6-1) | 3% |
| V-HH-3 | (6-1) | 39% |
| 1V-HH-3 | (6-1) | 6% |
| V-HHB-1 | (7-1) | 5% |
| 1-BB(F)B-2V | (7-6) | 5% |
| 5-HBB(F)B-2 | (8-5) | 4% |
| 3-HXB(F,F)-F | (2-13) | 4% |
| 3-HHXB(F,F)-CF3 | (3-100) | 6% |
| 3-BB(F,F)XB(F,F)-F | (3-97) | 7% |

The following compound was added in the ratio of 0.15% by weight based on the preceding composition, and

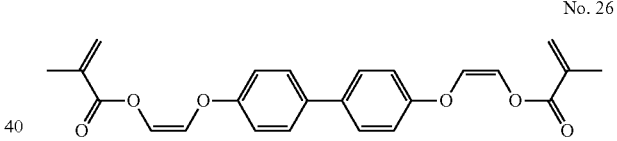
No. 26 the following compound was further added in the ratio of 0.15% by weight.

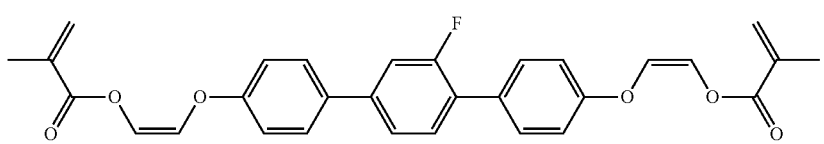
No. 94

Example 17

| | | |
|---|---|---|
| 3-HH-V | (6-1) | 23% |
| 3-HH-V1 | (6-1) | 3% |
| 3-HB-O2 | (6-5) | 8% |
| 3-HHB-1 | (7-1) | 10% |
| 3-BB(F)B-5 | (7-6) | 8% |
| 3-HHXB(F,F)-F | (3-100) | 10% |
| 3-BB(F,F)XB(F,F)-F | (3-97) | 6% |
| 3-GB(F,F)XB(F,F)-F | (3-118) | 7% |
| 3-HBBXB(F,F)-F | (4-32) | 5% |
| 3-HBB(F,F)XB(F,F)-F | (4-38) | 6% |
| 4-GB(F)B(F,F)XB(F,F)-F | (4-56) | 5% |
| 3-BB(F)B(F,F)XB(F)-F | (4-46) | 3% |
| 4-BB(F)B(F,F)XB(F,F)-F | (4-47) | 6% |

The following compound was added in the ratio of 0.15% by weight based on the preceding composition, and

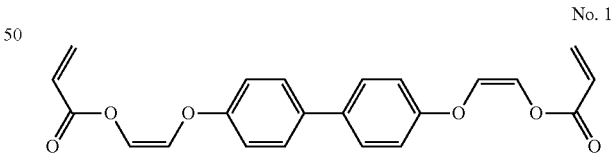
No. 26 the following compound was further added in the ratio of 0.10% by weight.

No. 1

NI=80.5° C.; Δn=0.110; Δ∈=9.7; η=19.3 mPa·s.

3. Comparative Example

Preparation of the comparative compound (R-1), [1,1'-biphenyl]-4,4'-diyl bis(2-methacrylate)

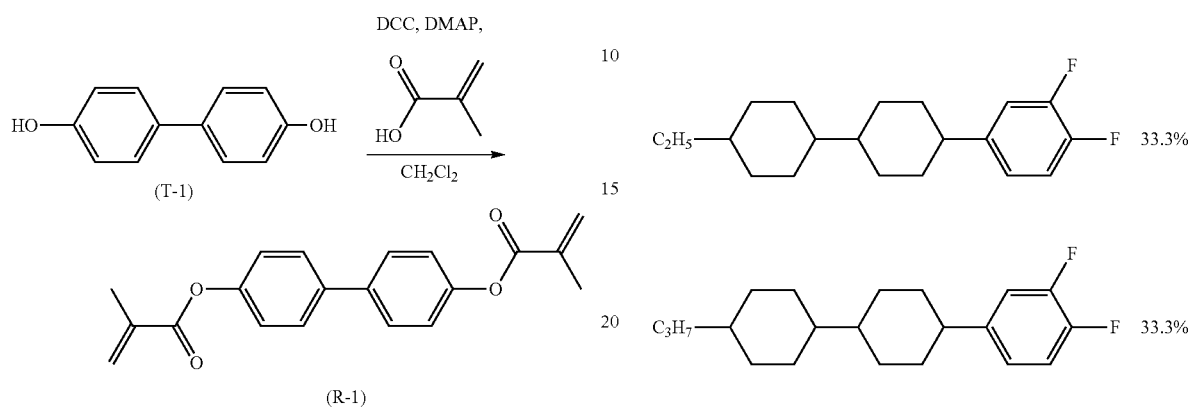

(T-1)

(R-1)

Colorless crystals of the comparative compound (R-1) were obtained by the preparation according to the reaction formula described above.

$^1$H-NMR (DMSO-d; δ ppm): 7.24 (d, 4H), 6.96 (d, 4H), 6.41 (d, 2H), 6.26 (d, 2H) and 1.98 (s, 6H).

observed in the same way. Table 2 shows the results. For the symbols in Table 2, "○" shows that no crystals were deposited, and "x" shows that crystals were deposited. From Table 2, it is found that the polymerizable compound of the invention is excellent in solubility in the liquid crystal composition A. Incidentally, the component and ratio of the liquid crystal composition A were as follows.

$C_2H_5$— [structure] —F  33.3%

$C_3H_7$— [structure] —F  33.3%

$C_5H_{11}$— [structure] —F  33.4%

TABLE 2

Comparison of solubility in a liquid crystal composition

| Compound | Chemical formula | Solubility at room temperature for 2 days |
|---|---|---|
| Compound No. 26 | [structure] | ○ |
| Comparative compound (R-1) | [structure] | x |

The physical properties of the comparative compound (R-1) were as follows: Melting point, 150° C., starting temperature of polymerization, 152° C.

Comparative Example 1

Comparison of Solubility in a Liquid Crystal Composition

The compound No. 26 was added to the liquid crystal composition A in the ratio of 0.3% by weight, which was heated to 50° C. for 30 minutes. The resulting solution was allowed to stand at room temperature for 2 days. It was then observed visually whether or not the crystals were deposited. On the other hand, the comparative compound (R-1) was

INDUSTRIAL APPLICABILITY

The polymerizable compound of the invention has a suitable polymerization reactivity, a high conversion yield and a high solubility in a liquid crystal composition. The liquid crystal composition of the invention includes this compound and has physical properties such as a high maximum temperature of a nematic phase, a low minimum temperature of a nematic phase, a small viscosity, a suitable optical anisotropy, a large dielectric anisotropy, a suitable elastic constant, a large specific resistance and a suitable pretilt. The composition has a suitable balance between at least two of the physical properties. The polymerizable compound gives a polymer in the composition. The composition is suitable for a liquid crystal display device having a PSA mode. A liquid crystal display device containing the composition has a wide temperature range in which the device can be used, a short response time, a large voltage holding ratio, a low threshold voltage, a large contrast ratio and a long service life. Accordingly, the device can widely be utilized for the display of personal computers, televisions and so forth.

What is claimed is:

1. A compound represented by formula (1):

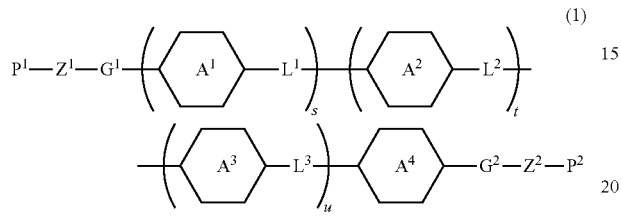

(1)

wherein
the ring $A^1$, the ring $A^2$, the ring $A^3$ and the ring $A^4$ are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these groups at least one hydrogen may be replaced by halogen, alkyl having 1 to 12 carbons or alkyl having 1 to 12 carbons in which at least one hydrogen has been replaced by halogen;

$Z^1$ and $Z^2$ are independently alkylene having 1 to 10 carbons, and in the alkylene at least one —CH$_2$— may be replaced by —O—, —COO— or —OCOO— and at least one —CH$_2$—CH$_2$— may be replaced by —CH=CH— or —C≡C—;

$G^1$ and $G^2$ are —O—;

$L^1$, $L^2$ and $L^3$ are independently a single bond, —COO— or —CH=CH—;

s, t and u are independently 0 or 1;

$P^1$ and $P^2$ are independently a group selected from groups represented by formulas (P-1), (P-2) and (P-3):

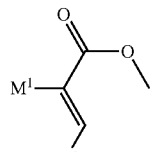

(P-1)

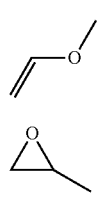

(P-2)

(P-3)

in formula (P-1), $M^1$ and $M^2$ are independently hydrogen, fluorine, methyl or trifluoromethyl;

at least one of $Z^1$ and $Z^2$ has an unsaturated bond when $G^1$ and $G^2$ are —O—, and $P^1$ and $P^2$ are a group represented by formula (P-1);

at least one of $Z^1$ and $Z^2$ has the unsaturated bond when s and t are 1, u is 0, $G^1$ and $G^2$ are —O—, the ring $A^1$ and the ring $A^4$ are 1,4-phenylene, the ring $A^2$ is 1,4-phenylene in which at least one hydrogen has been replaced by chlorine, methyl or trifluoromethyl, and $P^1$ and $P^2$ a group represented by formula (P-2);

at least one of $Z^1$ and $Z^2$ has the unsaturated bond when $L^1$, $L^2$ and $L^3$ are —COO—.

2. The compound according to claim 1, wherein at least one of $Z^1$ and $Z^2$ has an unsaturated bond.

3. The compound according to claim 1, the compound is represented by formula (1-1) or (1-2):

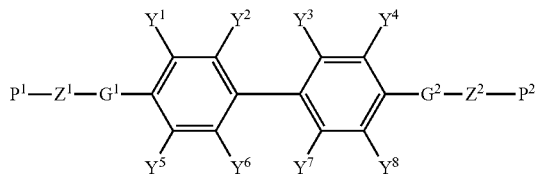

(1-1)

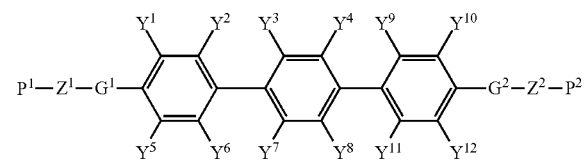

(1-2)

in formulas (1-1) and (1-2),
$Z^1$ and $Z^2$ are independently alkylene having 1 to 10 carbons, and in the alkylene at least one —CH$_2$— may be replaced by —O—, —COO— or —OCOO— and at least one —CH$_2$—CH$_2$— may be replaced by —CH=CH— or —C≡C—;

$G^1$ and $G^2$ are —O—;

$Y^1$ to $Y^{12}$ are independently hydrogen, fluorine, methyl or trifluoromethyl;

$P^1$ and $P^2$ are independently a group selected from groups represented by formulas (P-1), (P-2) and (P-3):

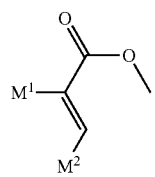

(P-1)

(P-2)

(P-3)

in formula (P-1), $M^1$ and $M^2$ are independently hydrogen, fluorine, methyl or trifluoromethyl;

in formulas (1-1) and (1-2), at least one of $Z^1$ and $Z^2$ has an unsaturated bond when $G^1$ and $G^2$ are —O—, and $P^1$ and $P^2$ are a group represented by formula (P-1); and in formula (1-2), at least one of $Z^1$ and $Z^2$ has the unsaturated bond when $G^1$ and $G^2$ are —O—, all of $Y^1$, $Y^2$ and $Y^5$ to $Y^{12}$ are hydrogen, at least one of $Y^3$ or $Y^4$ is methyl or trifluoromethyl, and $P^1$ and $P^2$ is a group represented by formula (P-2).

4. The compound according to claim 3, wherein at least one of $Z^1$ and $Z^2$ has an unsaturated bond.

5. The compound according to claim 3, wherein both $Z^1$ and $Z^2$ have an unsaturated bond.

6. The compound according to claim 4, wherein $P^1$ and $P^2$ are a group represented by formula (P-1), $M^1$ is hydrogen or methyl, and $M^2$ is hydrogen.

7. The compound according to claim 5, wherein $P^1$ and $P^2$ are a group represented by formula (P-1), $M^1$ is hydrogen or methyl, and $M^2$ is hydrogen.

8. The compound according to claim 1, wherein the compound is represented by formula (1-1-1), formula (1-2-1) or formula (1-3):

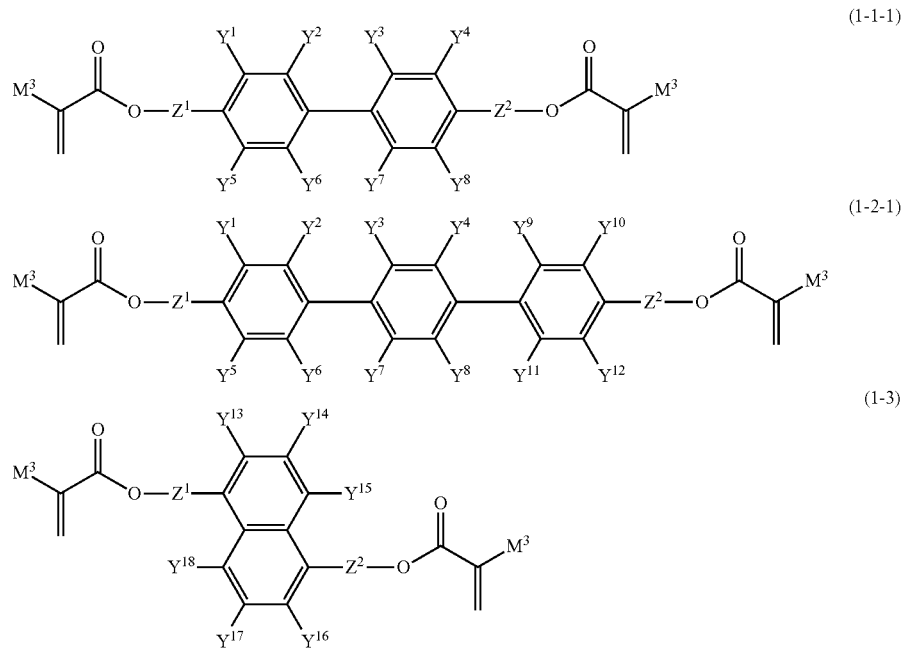

in formula (1-1-1), formula (1-2-1) and formula (1-3), $Z^1$ and $Z^2$ are independently alkylene having 1 to 10 carbons, and in the alkylene at least one —$CH_2$— may be replaced by —O—, —COO— or —OCOO—, and one —$CH_2$—$CH_2$— has been replaced by —CH=CH— or —C≡C—; $Y^1$ to $Y^{12}$ or $Y^{13}$ to $Y^{18}$ are independently hydrogen, fluorine, methyl or trifluoromethyl; and $M^3$ is hydrogen or methyl.

9. The compound according to claim 1, wherein the compound is represented by formula (1-1-2), formula (1-2-2) or formula (1-3-1):

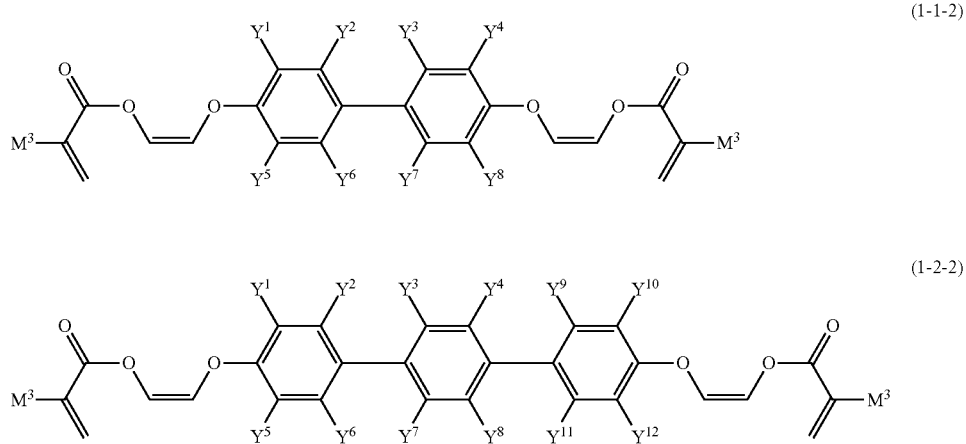

(1-3-1)

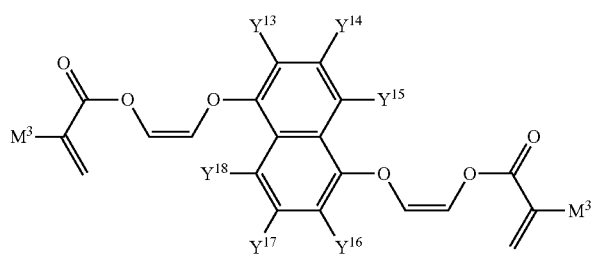

in formula (1-1-2), formula (1-2-2) and formula (1-3-1), $Y^1$ to $Y^{12}$ or $Y^{13}$ to $Y^{18}$ are independently hydrogen, fluorine, methyl or trifluoromethyl; and $M^3$ is hydrogen or methyl.

10. A polymer obtained by the polymerization of a compound according to claim 1.

11. A liquid crystal composition comprising at least one selected from the group of compounds according to claim 1.

12. A liquid crystal composition comprising at least two selected from the group of compounds according to claim 1.

13. A liquid crystal composition, wherein a first component is at least one compound selected from the group of compounds represented by formula (1) according to claim 1, and the composition further comprises a polymerizable compound excluding formula (1) according to claim 1.

14. The liquid crystal composition according to claim 11, further comprising at least one compound selected from the group of compounds represented by formulas (2), (3) and (4):

(2)

(3)

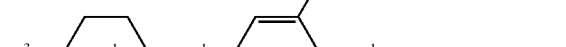

(4)

wherein
$R^3$ is alkyl having 1 to 10 carbons or alkenyl having 2 to 10 carbons, and in these groups at least one hydrogen may be replaced by fluorine and at least one —CH$_2$— may be replaced by —O—;
$X^1$ is fluorine, chlorine, —OCF$_3$, —OCHF$_2$, —CF$_3$, —CHF$_2$, —CH$_2$F, —OCF$_2$CHF$_2$ or —OCF$_2$CHFCF$_3$;
the ring $B^1$, the ring $B^2$ and the ring $B^3$ are independently 1,4-cyclohexenylene, 1,3-dioxane-2,5-diyl, pyrimidine-2,5-diyl, tetrahydropyran-2,5-diyl or 1,4-phenylene in which at least one hydrogen may be replaced by fluorine;

$W^1$ and $W^2$ are independently —(CH$_2$)$_2$—, —(CH$_2$)$_4$—, —COO—, —CF$_2$O—, —OCF$_2$—CH=CH—, —C≡C—, —CH$_2$O— or a single bond; and $Q^1$ and $Q^2$ are independently hydrogen or fluorine.

15. The liquid crystal composition according to claim 11, further comprising at least one compound selected from the group of compounds represented by formula (5):

(5)

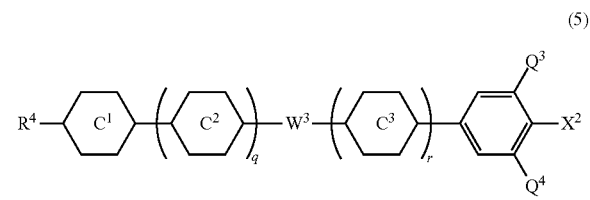

wherein $R^4$ is alkyl having 1 to 10 carbons or alkenyl having 2 to 10 carbons, and in these groups at least one hydrogen may be replaced by fluorine and at least one —CH$_2$— may be replaced by —O—;
$X^2$ is —C≡N or —C≡C—C≡N;
the ring $C^1$, the ring $C^2$ and the ring $C^3$ are independently 1,4-cyclohexenylene, 1,4-phenylene in which at least one hydrogen may be replaced by fluorine, 1,3-dioxane-2,5-diyl, tetrahydropyran-2,5-diyl or pyrimidine-2,5-diyl;
$W^3$ is —(CH$_2$)$_2$—, —COO—, —CF$_2$O—, —OCF$_2$—CH$_2$O— or a single bond;
$Q^3$ and $Q^4$ are independently hydrogen or fluorine; and
q is 0, 1 or 2, and r is 0 or 1.

16. The liquid crystal composition according to claim 11, further comprising at least one compound selected from the group of compounds represented by formulas (6), (7) and (8):

(6)

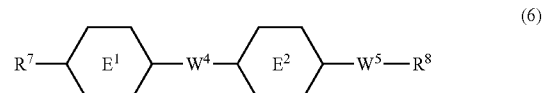

(7)

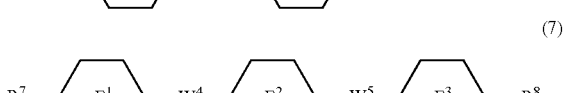

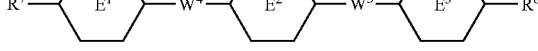

-continued

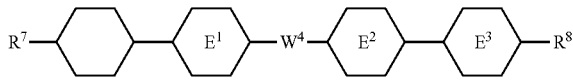
(8)

wherein $R^7$ and $R^8$ are independently alkyl having 1 to 10 carbons or alkenyl having 2 to 10 carbons, and in these groups at least one hydrogen may be replaced by fluorine and at least one —$CH_2$— may be replaced by —O—;

the ring $E^1$, the ring $E^2$ and the ring $E^3$ are independently 1,4-cyclohexenylene, pyrimidine-2,5-diyl, 1,4-phenylene, 2-fluoro-1,4-phenylene or 2,5-difluoro-1,4-phenylene; and $W^4$ and $W^5$ are independently —C≡C—, —COO—, —$(CH_2)_2$—, —CH=CH— or a single bond.

17. The liquid crystal composition according to claim 14, further comprising at least one compound selected from the group of compounds represented by formulas (6), (7) and (8):

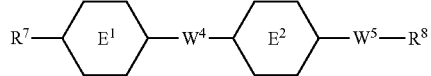
(6)

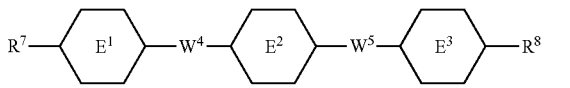
(7)

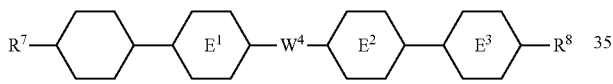
(8)

wherein $R^7$ and $R^8$ are independently alkyl having 1 to 10 carbons or alkenyl having 2 to 10 carbons, and in these groups at least one hydrogen may be replaced by fluorine and at least one —$CH_2$— may be replaced by —O—;

the ring $E^1$, the ring $E^2$ and the ring $E^3$ are independently 1,4-cyclohexenylene, pyrimidine-2,5-diyl, 1,4-phenylene, 2-fluoro-1,4-phenylene or 2,5-difluoro-1,4-phenylene; and $W^4$ and $W^5$ are independently —C≡C—, —COO—, —$(CH_2)_2$—, —CH=CH— or a single bond.

18. The liquid crystal composition according to claim 15, further comprising at least one compound selected from the group of compounds represented by formulas (6), (7) and (8):

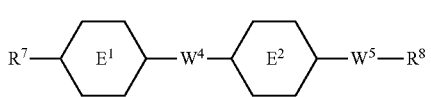
(6)

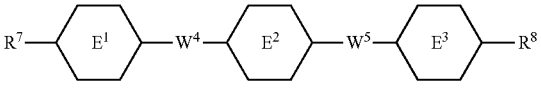
(7)

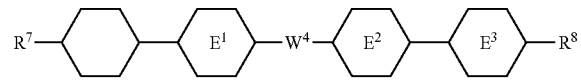
(8)

wherein $R^7$ and $R^8$ are independently alkyl having 1 to 10 carbons or alkenyl having 2 to 10 carbons, and in these groups at least one hydrogen may be replaced by fluorine and at least one —$CH_2$— may be replaced by —O—;

the ring $E^1$, the ring $E^2$ and the ring $E^3$ are independently 1,4-cyclohexenylene, pyrimidine-2,5-diyl, 1,4-phenylene, 2-fluoro-1,4-phenylene or 2,5-difluoro-1,4-phenylene; and $W^4$ and $W^5$ are independently —C≡C—, —COO—, —$(CH_2)_2$—, —CH=CH— or a single bond.

19. A liquid crystal display device containing at least one selected from the group of compounds according to claim 1.

20. A liquid crystal display device containing the liquid crystal composition according to claim 11.

* * * * *